(12) United States Patent
Sheedy et al.

(10) Patent No.: US 9,174,703 B2
(45) Date of Patent: *Nov. 3, 2015

(54) WAKE-MODIFYING DEVICE FOR A BOAT

(71) Applicant: MasterCraft Boat Company, LLC, Vonore, TN (US)

(72) Inventors: Darren S. Sheedy, Greenback, TN (US); Matthew J. Huyge, Wyoming, MI (US); Michael D. Myers, Knoxville, TN (US); Zane E. Schwenk, Winter Haven, FL (US)

(73) Assignee: MASTERCRAFT BOAT COMPANY, LLC, Vonore, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/626,249

(22) Filed: Feb. 19, 2015

(65) Prior Publication Data

US 2015/0158554 A1    Jun. 11, 2015

Related U.S. Application Data

(63) Continuation of application No. 14/458,427, filed on Aug. 13, 2014, now Pat. No. 9,067,644, which is a continuation of application No. 14/194,355, filed on Feb. 28, 2014, now Pat. No. 8,833,286.

(60) Provisional application No. 61/889,752, filed on Oct. 11, 2013.

(51) Int. Cl.
*B63B 1/26* (2006.01)
*B63B 1/28* (2006.01)
(Continued)

(52) U.S. Cl.
CPC . *B63B 1/286* (2013.01); *B63B 1/26* (2013.01); *B63B 35/85* (2013.01); *B63B 39/061* (2013.01); *B63B 2035/855* (2013.01)

(58) Field of Classification Search
CPC .................. B63B 2035/855; B63B 39/061
See application file for complete search history.

(56) References Cited

U.S. PATENT DOCUMENTS

| 667,482 A | 2/1901 | Albarda |
| 704,729 A | 7/1902 | Zerbe |

(Continued)

FOREIGN PATENT DOCUMENTS

| CA | 2 271 332 A1 | 2/2000 |
| EP | 1 058 645 B1 | 6/2004 |

(Continued)

OTHER PUBLICATIONS

Defendant Nautique Boat Company, Inc.'s Opposition to Malibu Boats, LLC's Motion for Preliminary Injunction, with all exhibits, filed on Dec. 16, 2013, in *Malibu Boats, LLC* v. *Nautique Boat Company*, Inc., E.D. Tenn. Case No. 3:13-cv-00656.

(Continued)

*Primary Examiner* — Edwin Swinehart
(74) *Attorney, Agent, or Firm* — Fitzpatrick, Cella, Harper & Scinto

(57) ABSTRACT

A recreational sport boat includes a hull, having starboard and port sides and a transom, and a pair of wake-modifying devices positioned aft of the transom. One of the wake-modifying devices is positioned on a port side of the boat's centerline and another of the wake-modifying devices is positioned on a starboard side of the boat's centerline. Each wake-modifying device includes a plate-like member and at least one downturned surface at a trailing portion of the plate-like member. Each wake-modifying device is pivotable between a non-deployed position and a deployed position about a pivot axis that is horizontal or inclined no more than about 35° from horizontal. When a wake-modifying device is in the deployed position, the downturned surface is lower than it is in the non-deployed position so as to be able to modify the boat's wake.

44 Claims, 55 Drawing Sheets

(51) Int. Cl.
*B63B 35/85* (2006.01)
*B63B 39/06* (2006.01)

(56) References Cited

U.S. PATENT DOCUMENTS

| | | | |
|---|---|---|---|
| 1,196,682 A | 8/1916 | Harriss | |
| 1,264,320 A | 4/1918 | Metzler | |
| 2,199,333 A | 4/1940 | Dunklin | |
| 2,663,276 A | 12/1953 | Ouellet | |
| 2,807,228 A | 9/1957 | Vandre | |
| 2,832,304 A | 4/1958 | Elyosius et al. | |
| 2,890,673 A | 6/1959 | Chadwick, Jr. | |
| 2,994,290 A | 8/1961 | Merchant, Sr. | |
| 3,046,928 A | 7/1962 | Sherrill | |
| 3,062,167 A | 11/1962 | Bennett | |
| 3,106,178 A | 10/1963 | Cale | |
| 3,111,103 A | 11/1963 | Bennett | |
| 3,159,134 A | 12/1964 | Winnen | |
| 3,200,782 A | 8/1965 | Walden et al. | |
| 3,247,820 A | 4/1966 | White | |
| 3,259,097 A | 7/1966 | Van Veldhuizen et al. | |
| 3,294,052 A | 12/1966 | Jones | |
| 3,327,671 A | 6/1967 | Comins | |
| 3,372,663 A | 3/1968 | Bue | |
| 3,391,667 A | 7/1968 | Bue | |
| 3,399,643 A | 9/1968 | Bennett | |
| 3,577,948 A | 5/1971 | Frey | |
| 3,628,484 A | 12/1971 | Banner | |
| 3,628,486 A | 12/1971 | Bennett | |
| 3,628,487 A * | 12/1971 | Bennett ................ B36B 39/061 114/287 | |
| 3,650,310 A * | 3/1972 | Childress ............. B63B 39/061 114/286 | |
| 3,695,204 A | 10/1972 | Bennett | |
| 3,698,343 A | 10/1972 | Boome | |
| 3,760,759 A | 9/1973 | Lang | |
| 3,763,812 A | 10/1973 | Rowe | |
| 4,232,626 A | 11/1980 | Kern | |
| 4,237,808 A | 12/1980 | Doerffer | |
| 4,261,278 A | 4/1981 | Gaudin | |
| 4,434,738 A | 3/1984 | Barkemeyer | |
| 4,577,580 A | 3/1986 | Diffely, Sr. | |
| 4,597,742 A | 7/1986 | Finkl | |
| 4,718,872 A | 1/1988 | Olson et al. | |
| 4,763,219 A | 8/1988 | Nakamura | |
| 4,776,295 A | 10/1988 | Kline et al. | |
| 4,854,259 A | 8/1989 | Cluett | |
| 4,895,093 A | 1/1990 | Dalsbo | |
| 4,910,419 A | 3/1990 | Hayashi et al. | |
| 4,967,682 A | 11/1990 | O'Donnell | |
| 5,058,520 A | 10/1991 | Fahrney | |
| 5,113,780 A | 5/1992 | Bennett et al. | |
| 5,142,473 A | 8/1992 | Davis | |
| 5,193,478 A | 3/1993 | Mardikian | |
| 5,263,432 A | 11/1993 | Davis | |
| 5,315,951 A | 5/1994 | Finkl | |
| 5,359,956 A | 11/1994 | Lee | |
| 5,377,610 A | 1/1995 | Goebel | |
| 5,385,110 A | 1/1995 | Bennett et al. | |
| 5,445,100 A | 8/1995 | Finkl | |
| 5,474,012 A | 12/1995 | Yamada et al. | |
| 5,474,013 A | 12/1995 | Wittmaier | |
| 5,549,071 A | 8/1996 | Pigeon et al. | |
| 5,572,944 A | 11/1996 | Slikkers et al. | |
| 5,628,272 A | 5/1997 | Thomas | |
| 5,664,910 A | 9/1997 | Lochtefeld et al. | |
| 5,694,337 A | 12/1997 | Macken | |
| 5,860,384 A | 1/1999 | Castillo | |
| 5,860,766 A | 1/1999 | Lochtefeld et al. | |
| 5,881,666 A | 3/1999 | Crews, Jr. | |
| 5,911,190 A | 6/1999 | Lochtefeld et al. | |
| 6,006,689 A | 12/1999 | Olofsson | |
| 6,012,408 A | 1/2000 | Castillo | |
| 6,026,759 A | 2/2000 | Hazelett et al. | |
| 6,044,788 A | 4/2000 | Larson et al. | |
| 6,047,657 A | 4/2000 | Cox | |
| 6,105,527 A | 8/2000 | Lochtefeld et al. | |
| 6,138,601 A | 10/2000 | Anderson et al. | |
| 6,148,756 A | 11/2000 | Pavlov et al. | |
| 6,158,375 A | 12/2000 | Stuart, Jr. | |
| 6,213,044 B1 | 4/2001 | Rodgers et al. | |
| 6,354,237 B1 | 3/2002 | Gaynor et al. | |
| 6,520,104 B1 | 2/2003 | Svensson | |
| 6,523,489 B2 | 2/2003 | Simard et al. | |
| 6,523,490 B1 | 2/2003 | Watkins | |
| 6,606,959 B1 | 8/2003 | Shen | |
| 6,827,031 B2 | 12/2004 | Aoyama | |
| 6,874,441 B2 | 4/2005 | Pigeon | |
| 6,923,136 B1 | 8/2005 | D'Alessandro | |
| 6,935,263 B1 | 8/2005 | Bandyopadhyay | |
| 6,941,884 B2 | 9/2005 | Moore | |
| 7,004,097 B2 | 2/2006 | Zeromski | |
| 7,007,621 B1 | 3/2006 | Bootes | |
| 7,018,252 B2 | 3/2006 | Simard et al. | |
| 7,063,031 B2 | 6/2006 | Earl, Jr. et al. | |
| 7,140,318 B1 | 11/2006 | Gasper | |
| 7,174,843 B1 | 2/2007 | Tossavainen | |
| 7,188,581 B1 | 3/2007 | Davis et al. | |
| 7,210,422 B1 | 5/2007 | Hickok et al. | |
| 7,216,601 B1 | 5/2007 | Mann | |
| 7,246,565 B2 | 7/2007 | Snook et al. | |
| 7,252,047 B1 | 8/2007 | Baucom, Jr. | |
| 7,311,058 B1 | 12/2007 | Brooks et al. | |
| 7,318,389 B2 | 1/2008 | Boning | |
| 7,380,514 B2 | 6/2008 | Loui et al. | |
| 7,381,108 B1 | 6/2008 | Salmon | |
| 7,434,531 B1 | 10/2008 | Zsido et al. | |
| 7,467,596 B2 | 12/2008 | Salmon | |
| 7,497,748 B2 | 3/2009 | Salmon | |
| 7,617,026 B2 | 11/2009 | Gee et al. | |
| 7,641,525 B2 | 1/2010 | Morvillo | |
| 7,707,956 B2 | 5/2010 | Moore | |
| 7,780,490 B2 | 8/2010 | Lundgren | |
| 7,905,193 B2 | 3/2011 | Beamer | |
| 7,958,837 B1 | 6/2011 | Fraleigh | |
| 8,100,079 B2 | 1/2012 | Buzzi | |
| 8,191,493 B2 | 6/2012 | Baywol | |
| 8,201,514 B2 | 6/2012 | Coles | |
| 8,216,007 B2 | 7/2012 | Moore | |
| 8,251,006 B2 | 8/2012 | Kalil | |
| 8,261,682 B1 | 9/2012 | Devito | |
| 8,387,551 B2 | 3/2013 | Muller | |
| 8,468,964 B2 | 6/2013 | Hoberman et al. | |
| 8,480,445 B2 | 7/2013 | Morvillo | |
| 8,522,706 B2 | 9/2013 | Larson et al. | |
| 8,534,214 B1 | 9/2013 | Gasper | |
| 8,539,897 B1 | 9/2013 | Gasper et al. | |
| 8,622,012 B2 | 1/2014 | Olofsson | |
| 8,631,753 B2 | 1/2014 | Morvillo | |
| 8,798,825 B1 | 8/2014 | Hartman | |
| 8,967,070 B2 | 3/2015 | Kalil | |
| 9,045,204 B1 | 6/2015 | Murphy | |
| 2004/0261684 A1 | 12/2004 | Pigeon | |
| 2005/0124234 A1 | 6/2005 | Sells et al. | |
| 2005/0155540 A1 | 7/2005 | Moore | |
| 2006/0054067 A1 | 3/2006 | Hoberman et al. | |
| 2006/0217011 A1 | 9/2006 | Morvillo | |
| 2007/0078575 A1 | 4/2007 | Wilson et al. | |
| 2007/0125287 A1 | 6/2007 | Walker | |
| 2007/0137550 A1 | 6/2007 | Davis et al. | |
| 2007/0202757 A1 | 8/2007 | Moore | |
| 2008/0271660 A1 | 11/2008 | Zsido et al. | |
| 2008/0281478 A1 | 11/2008 | Gee et al. | |
| 2009/0165694 A1 | 7/2009 | Beamer | |
| 2010/0101475 A1 | 4/2010 | Mueller | |
| 2010/0121493 A1 | 5/2010 | Christensen et al. | |
| 2010/0251952 A1 | 10/2010 | Baywol | |
| 2011/0017115 A1 | 1/2011 | Olofsson | |
| 2011/0320072 A1 | 12/2011 | Morvillo | |
| 2012/0079977 A1 | 4/2012 | Gai | |
| 2013/0000542 A1 | 1/2013 | Muller | |
| 2013/0213293 A1 | 8/2013 | Gasper et al. | |
| 2013/0228113 A1 | 9/2013 | Gasper et al. | |
| 2014/0026799 A1 | 1/2014 | Kalil | |

(56) References Cited

U.S. PATENT DOCUMENTS

| | | |
|---|---|---|
| 2014/0102348 A1 | 4/2014 | Gasper |
| 2014/0137786 A1 | 5/2014 | Gasper et al. |
| 2014/0137787 A1 | 5/2014 | Gasper et al. |
| 2014/0261135 A1 | 9/2014 | Gasper et al. |
| 2015/0197314 A1 | 7/2015 | Gasper et al. |

FOREIGN PATENT DOCUMENTS

| | | | |
|---|---|---|---|
| EP | 1 435 325 | A1 | 7/2004 |
| GB | 332315 | A | 7/1930 |
| SU | 975490 | A1 | 11/1982 |
| WO | 96/20105 | A1 | 7/1996 |
| WO | 99/44885 | A1 | 9/1999 |
| WO | 99/55577 | A1 | 11/1999 |
| WO | 2005/118384 | A1 | 12/2005 |
| WO | 2006/058232 | A1 | 6/2006 |
| WO | 2007/072185 | A2 | 6/2007 |
| WO | 2009/113923 | A1 | 9/2009 |
| WO | 2011/099931 | A1 | 8/2011 |
| WO | 2013/040576 | A1 | 3/2013 |
| WO | 2013/071148 | A1 | 5/2013 |

OTHER PUBLICATIONS

Mastercraft, 2013 Owner's Manual, pp. cover, ix, and 3-7 to 3-19.
Lenco Marine Inc., Electric Trim Tab Kits, Oct. 2007.
Bennett Marine, 2013 Catalog.
Mike Lewis, Tige Releases New Wakesurfing Specific Convex VX, Transworld Business, Dec. 17, 2012, available at http://business.transworld.net/117711/news/tige-releases-new-wakesurfing-specific-convex-vx/.
Bill Yeargin, Nautique Surf System, Nautique Insider, Jan. 3, 2013, available at http://www.nautique.com/blog/index/nautique-surf-system.
David Williams, First Look: Nautique Surf System, Wake World, Jan. 16, 2013, available at http://www.wakeworld.com/news/feature/first-look-nautique-surf-system.html.
Brandon Judd, Video: Supra Boats Swell Surf System, Wakeboarding, Nov. 21, 2013, available at http://www.wakeboardingmag.com/videos/2013/11/21/video-supra-boats-swell-surf-system/.
Brandon Judd, Video: Go With the Flow—Moomba Boats Flow Surf, Wakeboarding, Dec. 20, 2013, available at http://www.wakeboardingmag.com/features/2013/12/20/video-go-with-the-flow-moomba-boats-flow-surf/.
Alliance Wakeboard, Pavati Wake Boats New Website, Feb. 21, 2014, available at http://www.alliancewake.com/wake/pavati-wake-boats-new-website/.
Centurion Boats, Adjustable Wake Plate, http://wwww.centurionboats.com/features-and-options/adjustable-wake-plate.html, 2011.
Declaration of David Kennedy in Support of Nautique Boat Company, Inc.'s Opposition to Malibu Boats, LLC's Motion for Preliminary Injunction, Dec. 13, 2013, including Exhibit A: Volvo QL User and Installation Instructions; and Exhibit B: Volvo QL Boat Trim System brochure.
Humphree Installation Manual, dated 2009.
Humphree Operator's Manual, dated 2009.
Prweb, Malibu Makes Boating Easier and More Fun With MaliView, http://www.prweb.com/releases/Malibu/Boats/prweb 1285684.htm, Sep. 4, 2008.
Wakeboarding Magazine, Wakeboard Boat Review, Sanger Boats V237, Jan. 1, 2008.
Images of a Model Year 2008 MasterCraft CSX 265 equipped with a Volvo QL Boat Trim System.
Malibu Boats, 2009 Owner's Manual.
Tige Boats, 2012 Tige Touch User Manual.
MasterCraft's Answer, Affirmative Defenses, and Counterclaims, dated Aug. 5, 2015, in *Malibu Boats, LLC*, v. *MasterCraft Boat Company, LLC*, Case No. 3:15-CV-276-TAV-HBG, in the United States District Court for the Eastern District of Tennessee.
Declaration of Michael D. Myers in Support of MasterCraft's Motion for Summary Judgement of Noninfringement (including Exhibits 1-24), dated Aug. 13, 2015, in *Malibu Boats, LLC*, v. *MasterCraft Boat Company, LLC*, Case No. 3:15-CV-276-TAV-HBG, in the United States District Court for the Eastern District of Tennessee.

\* cited by examiner

WAKE-MODIFYING DEVICE FOR A BOAT

CROSS-REFERENCE TO RELATED APPLICATION

This application is a continuation of U.S. patent application Ser. No. 14/458,427 filed Aug. 13, 2014. U.S. patent application Ser. No. 14/458,427 is a continuation of U.S. patent application Ser. No. 14/194,355 filed Feb. 28, 2014, now U.S. Pat. No. 8,833,286. U.S. patent application Ser. No. 14/194,355 claims the benefit under 35 U.S.C. §119(e) of U.S. Provisional Patent Application No. 61/889,752, filed Oct. 11, 2013, and titled "Wake-Modifying Device for a Boat." The foregoing applications are hereby incorporated by reference in their entireties and are made a part of this specification for all that they disclose.

FIELD OF THE INVENTION

The invention relates to a device for modifying the wake of a boat, as well as a boat equipped with one or more such devices.

BACKGROUND OF THE INVENTION

Recreational sport boats are often used to tow water sports performers such as water skiers, wakeboarders, wake surfers, and the like. The optimal wake depends on which of these water sports a boat is used for, as well as the preferences and skill level of the performer. Water skiers generally prefer a relatively smooth water surface, while wake-boarders and wake surfers desire bigger wakes and wakes with more defined shapes. In recent years, boats have been equipped with various means for modifying the wake of the boat depending on how the boat is being used.

One example of a conventional means used to modify a boat's wake is a trim tab. Trim tabs originally were designed to adjust the trim of a boat. For example, when a boat is overloaded on the port side causing the boat to list to port, a turn tab may be deployed on the port side to cause the boat to return to an even keel. More recently, trim tabs have been used to purposefully modify the wake of a boat. One way to do so is to use one or more trim tabs to lift the stem of the boat. Lifting the stern minimizes the wake of a boat, resulting in a relatively smooth water surface, which is desirable for water skiing. Another way that trim tabs have been used is to increase the displacement of one side of the boat, which increases the size of the wake on the side of the boat with the increased displacement.

FIG. 1 shows the transom 122 of a boat used to tow a water sports performer. Three trim tabs 10, 20, 30 known in the art are mounted on the transom 122: one on the port side, one at the centerline, and one on the starboard side. Each tab is pivotably attached to the transom 122 of the boat by a hinge 11, 21, 31. The port and starboard trim tabs 10, 30 axe flat plates, with inboard and outboard edges bent upwards at a 90° angle. The upwardly-extending portion of each tab extends approximately ¼ inch above the upper surface of the flat portion of the tabs. The center trim tab 20 also is a flat plate, with inboard and outboard edges bent downwards at a 90° angle and a trailing edge bent upwards at a 90° angle. The downwardly-extending portions of the center tab extend approximately ⅛ inch below she lower surface of the flat portion of the tab, and the upwardly-extending portion extends approximately ¼ inch above the upper surface of the flat portion. The edges of the trim tabs 10, 20, 30 are bent upwards or downwards to aid in the manufacturing process and the extent to which the edges extend upwards or downwards is preferably minimized.

Each of the aforementioned trim labs 10, 20, 30 is pivotable between a non-deployed position and a deployed position. In FIG. 1, the port trim tab 10 is shown in a deployed position and the starboard trim tab 30 is shown in a non-deployed position. A linear actuator 510 moves each tab between the non-deployed position and the deployed position. As the boat moves through the water, the water flowing under the boat impinges on the deployed trim tab, creating an upward force on the tab. As a result, the portion of the bout where the trim tab is attached is raised. When used for water skiing, the center tab 20 may be deployed to raise the entire stern of the boat and minimize the wake. To increase the wake of the boat for wake surfing, either one of the port or starboard trim tabs may be deployed. When the port trim tab 10 is deployed, for example, the port side of the boat is raised, causing an increase in displacement on the starboard side of the boat, which increases the size of the starboard wake. The side of the boat with the increased wake is the surf side, which, in this example, is the starboard side. To further increase the size of the wake, ballast may also be added to the surf side of the boat.

In the embodiment shown in FIGS. 1 and 2, the port and starboard trim tabs 10, 30 are not perfectly rectangular, but rather have an angled contour along their outboard edges. This is so that the trim tabs do not extend beyond the outer perimeter of a swim platform (not shown) mounted to the transom 122 of the boat, above the trim tabs 10, 20, 30. Alternatively, all of the trim tabs may-have a rectangular shape.

Even with the trim tabs described above, wakeboarders and wake surfers desire larger wakes with improved shapes. For surfing in particular, wake surfers desire a wake with a large surfable area. The surfable area is the portion of the wake that pushes the surfer forward. This area generally extends from the curl of the wake to the swim platform.

SUMMARY OF THE INVENTION

In one aspect, the invention relates to a wake-modifying device adapted to be attached to a boat, aft of the boat's transom, on either a port or starboard side of the boat's centerline.

In another aspect, the invention relates to a recreational sport boat including a hull, having starboard and port sides and a transom, and a pair of wake-modifying devices positioned aft of the transom. One of the wake-modifying devices is positioned on a port side of the boat's centerline and another of the wake-modifying devices is positioned on a starboard side of the boat's centerline. Preferably, each wake-modifying device is pivotably attached directly to the transom. Alternatively, one or both of the wake-modifying devices may be attached to other portions of the boat, such as the bottom or sides of the hull or a swim platform.

Each wake-modifying device includes a plate-like member and at least one downturned surface at a trailing portion of the plate-like member. Each wake-modifying device is pivotable between a non-deployed position and a deployed position about a pivot axis that is horizontal or inclined no more than about 35° from horizontal. In the deployed position, the downturned surface is lower than it is in the non-deployed position so as to be able to modify the boat's wake.

The plate-like member and the downturned surface of each wake-modifying device may be an integral piece or separate pieces joined together. The downturned surface may be at a trailing edge of the plate-like member, for example, when they are an integral piece. Or the downturned surface may be inward of the trailing edge, for example, when the downturned surface is a separate piece attached to a lower surface of the plate-like member.

Preferably, an angle between the downturned surface of each wake-modifying device and a lower surface of a central portion of the plate-like member is between about 120° to about 135°, and the downturned surface extends between about 1 inch to about 2¼ inches below the lower surface of the plate-like member. The downturned surface may be oriented such that it intersects the plate-like member along a line that is generally parallel to the pivot axis, or along a line that is at an oblique angle relative to the pivot axis. The downturned surface and the plate-like member need not intersect along a straight line, and may instead intersect along a curved line.

Preferably, each wake-modifying device includes not one but two (or more) downturned surfaces at a trailing portion of the plate-like member. A first one of the downturned surfaces may intersect the plate-like member along a line that is generally parallel to the pivot axis, and a second one of the downturned surfaces may intersect the plate-like member along a line that is at an obtuse angle relative to the line along which the first downturned surface and the plate-like member intersect. Preferably, the obtuse angle is between about 135° to about 150°, and the first downturned surface is outboard of the second downturned surface.

Each wake-modifying device may also include at least one upturned surface at an outboard portion or the plate-like member, between the downturned surface and the pivot axis. The plate-like member and the upturned surface may be an integral piece or separate pieces joined together, and the upturned surface may be at an outboard edge of the plate-like member or inward of the outboard edge. An angle between the upturned surface and an upper surface of a central portion of the plate-like member preferably is between about 30° to about 150°, and more preferably is about 90°. The upturned surface preferably extends at least about 1 inch above an upper surface of the plate-like member.

At least one of the wake-modifying devices may include another downturned surface at an inboard portion of the plate-like member, between the first downturned surface and the pivot axis. An angle between this downturned surface and the lower surface of a central portion of the plate-like member preferably is between about 30° to about 150°, and more preferably is about 90°. The plate-like member and this downturned surface may be an integral piece or separate pieces joined together, and the downturned surface may be at an inboard edge of the plate-like member or inward of the inboard edge.

At least one of the wake-modifying devices may also include at least one fin attached to the lower surface of the plate-like member. An angle between the fin and the lower surface of the plate-like member preferably is between about 30° to about 150°, and more preferably is about 90°. The fin preferably extends at least about 1 inch below the lower surface of the plate-like member. The fin and the plate-like member preferably intersect along a line that is at an angle between about 15° and about 75° relative to the pivot axis, and more preferably between about 30° and about 60° relative to the pivot axis, and extends in a direction aft and outboard from the pivot axis. In some cases, it may be desirable to have at least two fins, which preferably are parallel to each other.

Each wake-modifying device preferably is capable of assuming multiple deployed positions. In each different deployed position the wake-modifying device is pivoted downwardly at a different angle relative to the non-deployed position. The boat may include a pair of linear actuators, each operable to move a respective one of the wake-modifying devices between its non-deployed position and its deployed position. The boat also preferably includes an operator station with a controller configured to control the operation of each linear actuator.

BRIEF DESCRIPTION OF THE DRAWINGS

FIG. 5B shows an alternate orientation of a wake-modifying device.

FIG. 59 is a detailed view of the port wake-modifying device shown in FIG. 58.

DETAILED DESCRIPTION OF THE PREFERRED EMBODIMENTS

Figure 1:
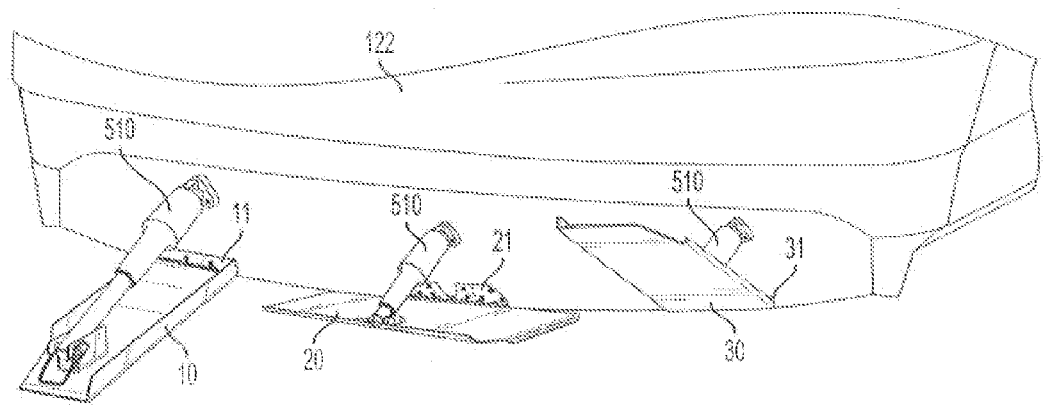
FIG. 1 shows a transom of a boat equipped with prior art trim tabs.

Exemplary preferred embodiments of the invention will now be described with reference to the accompanying figures. Like reference numerals refer to the same or similar elements throughout the figures and description.

First Embodiment

Figure 3:
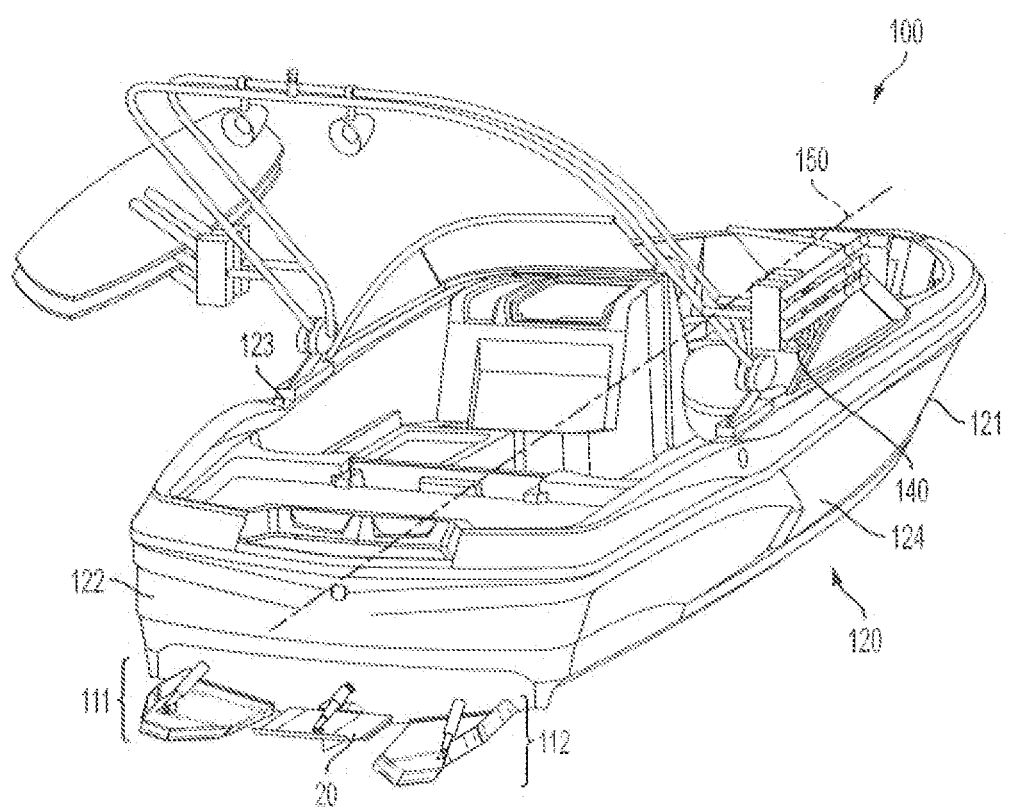
FIG. 3 shows a boat including a pair of wake-modifying devices according to a first preferred embodiment of the invention.
Figure 4:
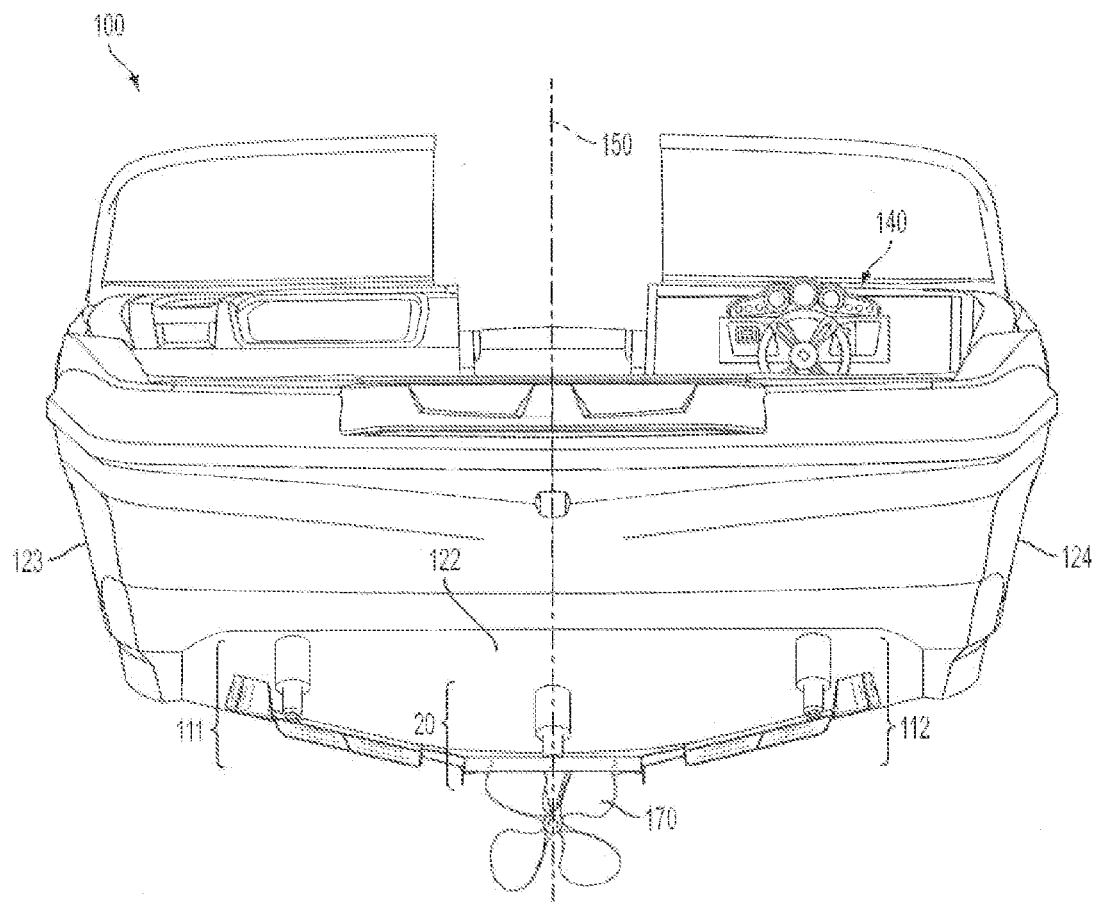
FIG. 4 is a stem view of the boat shown in FIG. 3.
Figure 5A:
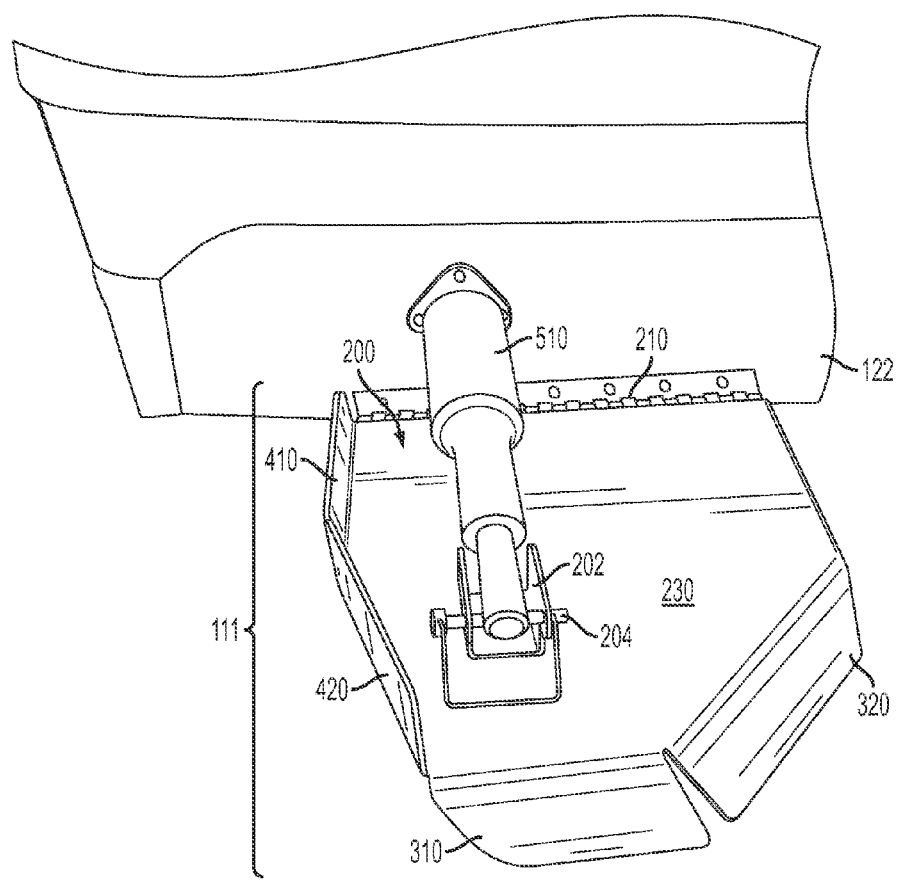
FIG. 5A is a detailed view of the port wake-modifying device shown in FIG. 3.
Figure 5B:
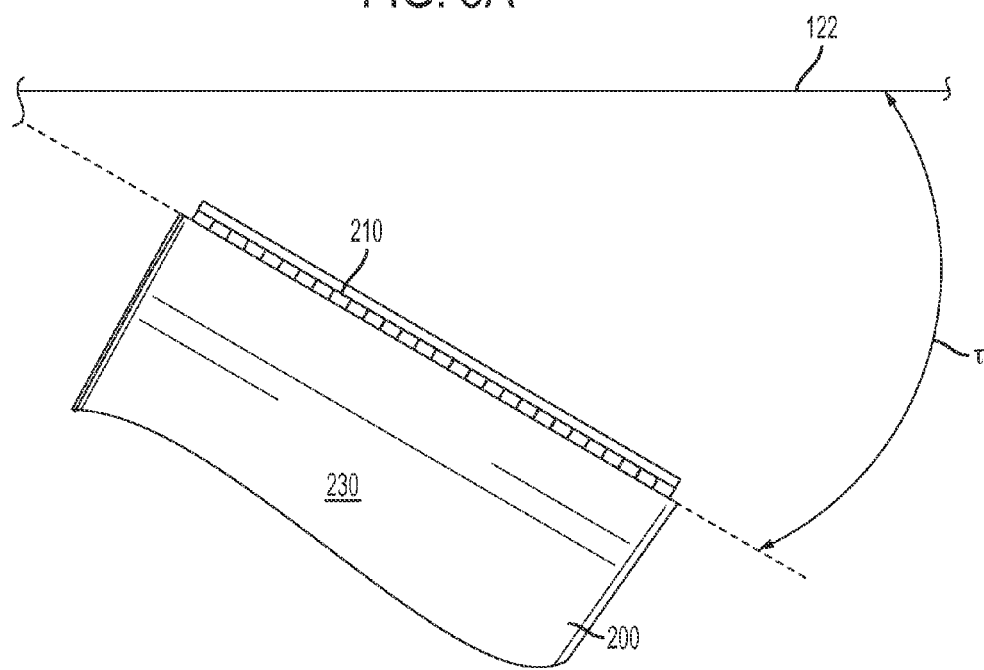
FIG. 5B shows an alternate configuration to the one shown in FIG. 5A.
Figure 6:
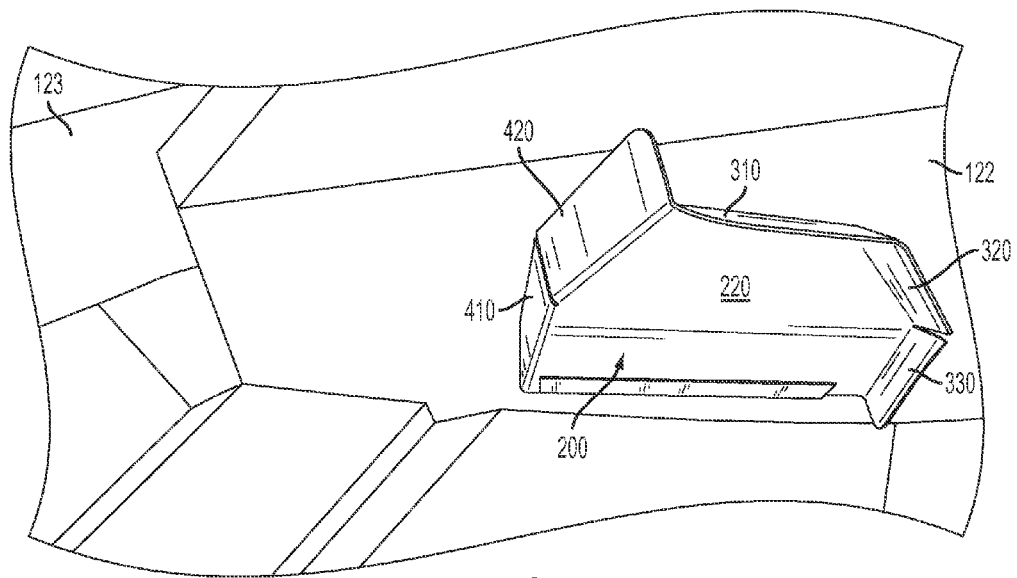
FIG. 6A is a detailed view of the bottom of the port wake-modifying device shown in FIG. 3.
FIG. 6B shows an alternate configuration to the one shown in FIG. 6A.
Figure 7:
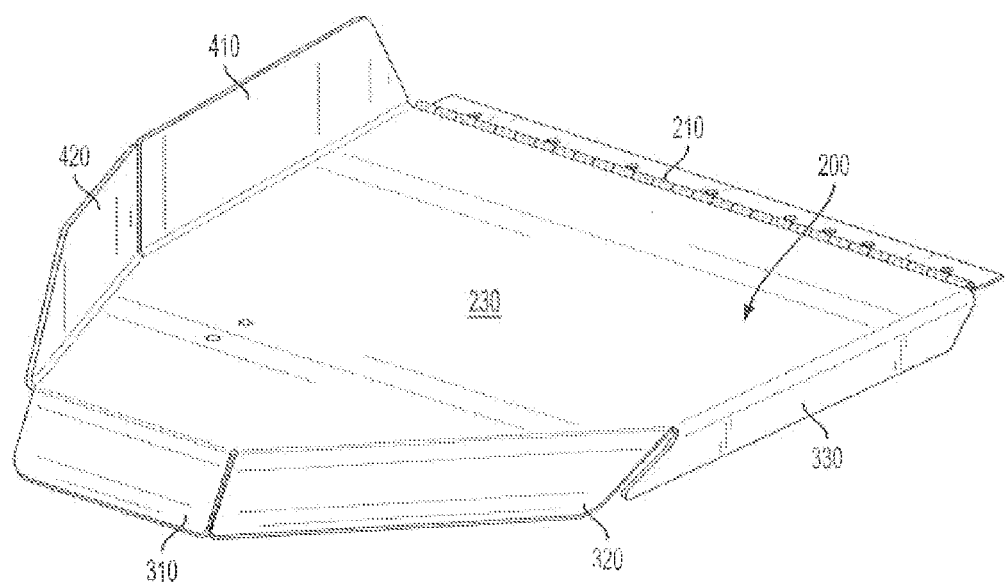
FIG. 7 is a perspective view of the port wake-modifying device shown in FIG. 3, detached from the boat and shown here from the inboard side.
Figure 8:
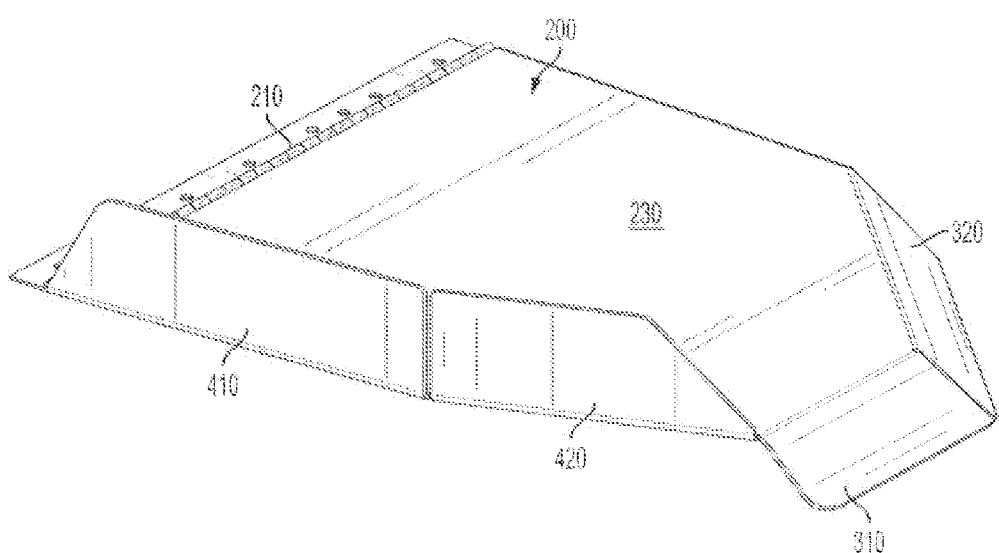
FIG. 8 is a perspective view of the port wake-modifying device shown in FIG. 7, shown here from the outboard side.
Figure 9:
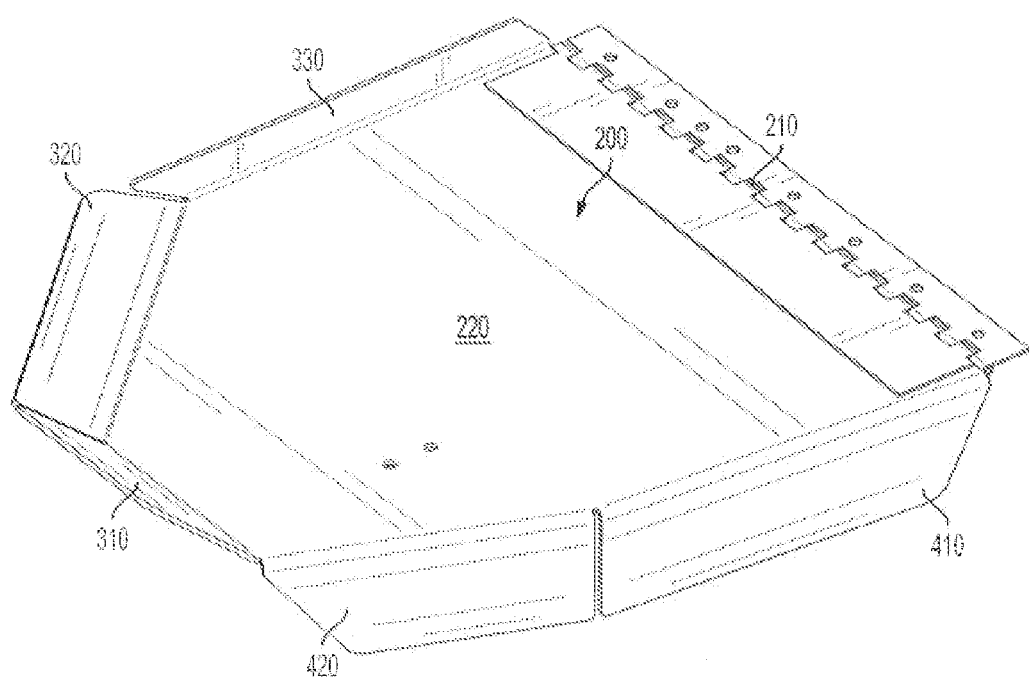
FIG. 9 is a perspective view of the port wake-modifying device shown in FIG. 7, turned upside down and shown here from the outboard side.
Figure 10:
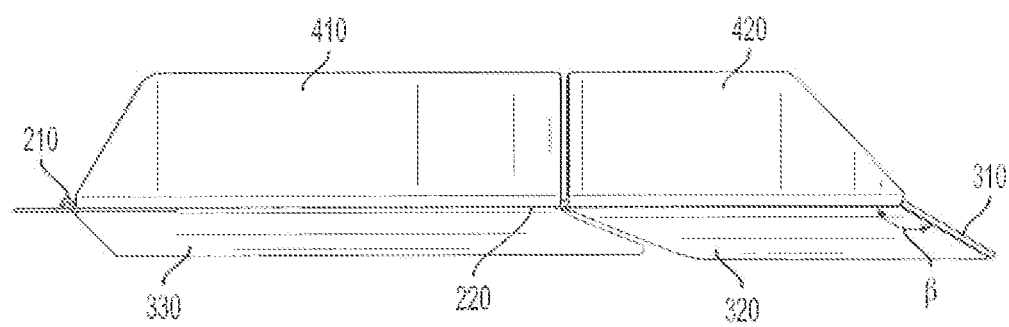
FIG. 10 is an outboard elevation view of the port wake-modifying device shown in FIG. 7.
Figure 11:
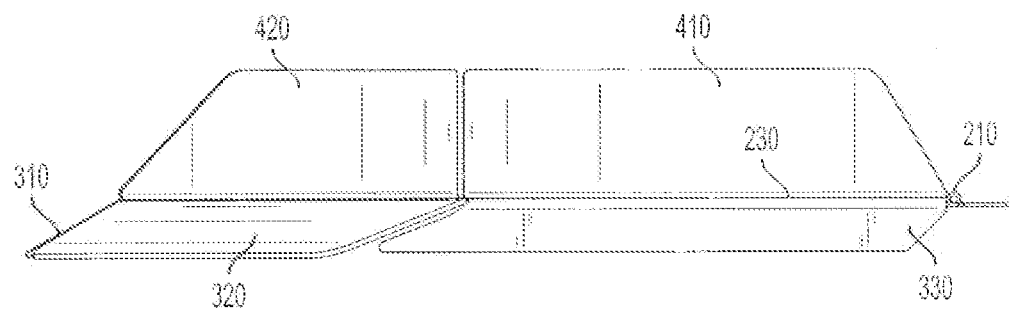
FIG. 11 is an inboard elevation view of the port wake-modifying device shown in FIG. 7.
Figure 12:
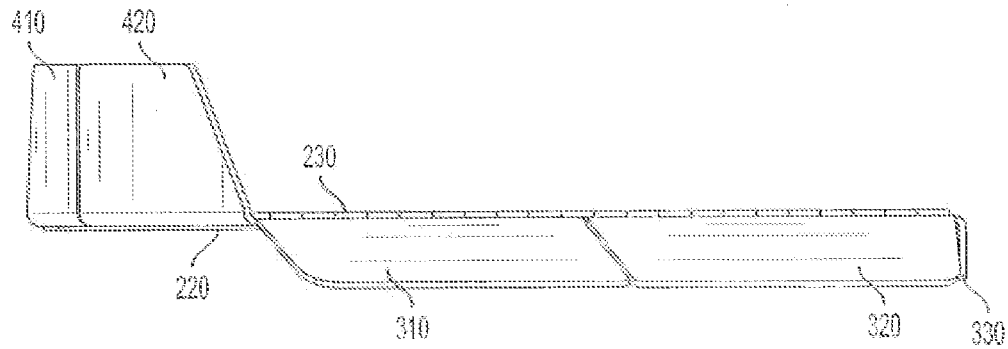
FIG. 12 is an aft elevation view of the port wake-modifying device shown in FIG. 7.

FIGS. 3 and 4 show a boat 100 equipped with a pair of wake-modifying devices 111, 112 in accordance with a first preferred embodiment of the invention. The boat hull 120 includes a bow 121, a transom 122, and port and starboard sides 123, 124. Within the boat's interior is a control console 140 for operating the boat 100. The boat 100 is driven by a single inboard motor (not shown) connected to a left-handed propeller 170. However, the wake-modifying devices 111, 112 can be utilized with other types of boats and propulsion systems, including but not limited to right-handed propellers, outboard motors, sterndrives, and the like.

The boat 100 has a centerline 150 running down the center of the boat, halfway between the port and starboard sides 123, 124. A conventional trim tab 20 is pivotably attached to the transom 122 along the centerline 150. The wake-modifying devices 111, 112 are pivotably attached to the transom 122 on port and starboard sides of the centerline 150, respectively.

FIGS. 5-18 are detailed views of the wake-modifying device 111 on the port side of the boat 100. Similarly, FIGS. 19-30 are detailed views of the wake-modifying device 112 on the starboard side of the boat 100. While the port and starboard wake modifying-devices 111, 112 have many similar features in this embodiment, the port and starboard wake-modifying devices 111, 112 differ with respect to one downturned surface 330, which the port wake-modifying device 111 includes and the starboard wake-modifying device 112 lacks, as will be discussed further below. Except where noted otherwise, the discussion of the wake-modifying devices applies equally to both the port and starboard wake-modifying devices 111, 112.

Each wake-modifying device 111, 112 includes a plate-like member 200 that is pivotably attached to the transom 122 of the boat 100. The plate-like member 200 pivots about a pivot axis 210 to move between a non-deployed position and a deployed position. In this embodiment, the pivot axis 210 is a hinge and is flush with the transom 122 of the boat 100. Here, the hinge is a piano hinge that is welded to a leading portion L of the plate-like member 200 and attached to the transom of the boat 100 using screws. However, any suitable pivotable connection may be used and it may be affixed to the wake-modifying device 111, 112 and transom 122 of the boat 100 using any suitable means, including but not limited to bolts, screws, rivets, welding, and epoxy. In addition, the wake-modifying device 111, 112 may be attached to the transom 122 such that the pivot axis 210 is not flush with the transom 122, for example, the pivot axis may be spaced further aft of the transom 122, as shown, for example, in FIG. 5B. The wake-modifying devices 111, 112 also may be attached to portions of the boat other than the transom 122. For example, the wake-modifying devices 111, 112 could be attached to the bottom of the hull 120, to the port and starboard sides 123, 124 of the hull 120, or to a swim platform (not shown). The pivot axis 210 preferably is parallel to the transom 122, but it may be oriented at an oblique angle τ relative to the transom 122, as shown, for example, in FIG. 5B, so long as the wake-modifying device 111, 112 provides an upward force on the boat 100 as the boat 100 travels forward through the water.

In the embodiment shown, the pivot axis 210 is parallel to the deadrise (the angle of the hull from the keel to the chine at the transom 122) of the boat 100. But the pivot axis 210 may instead be at an angle relative to the deadrise. Some boats, for example, have little or no deadrise. In such cases, it may be advantageous to orient the pivot axis 210 at an angle relative to the deadrise. Preferably, the pivot axis is inclined no more than about 35° from horizontal, more preferably no more than about 20° from horizontal, and most preferably no more than about 15° from horizontal. This inclination is preferably in the direction from the chine to the keel. Preferably, the pivot axis is inclined no more than about 15° more than the deadrise.

Figure 13:
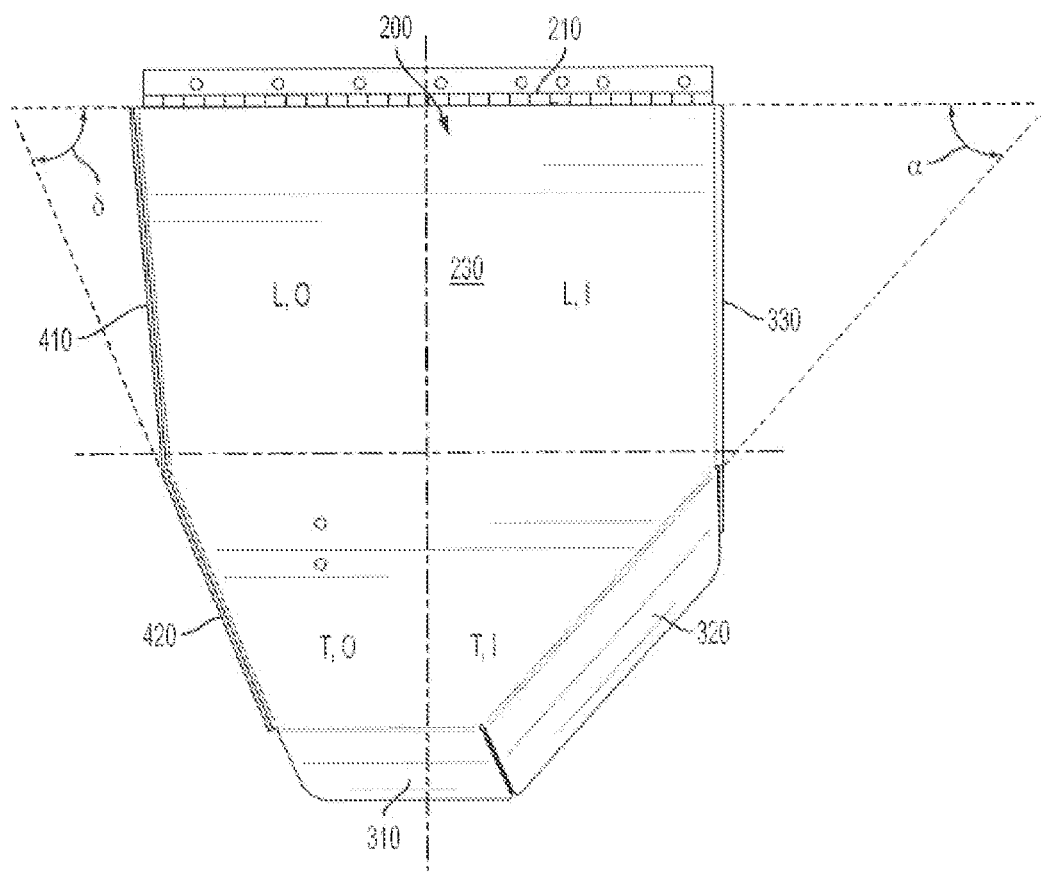
FIG. 13 is a top elevation view of the port wake-modifying device shown in FIG. 7.
Figure 14:
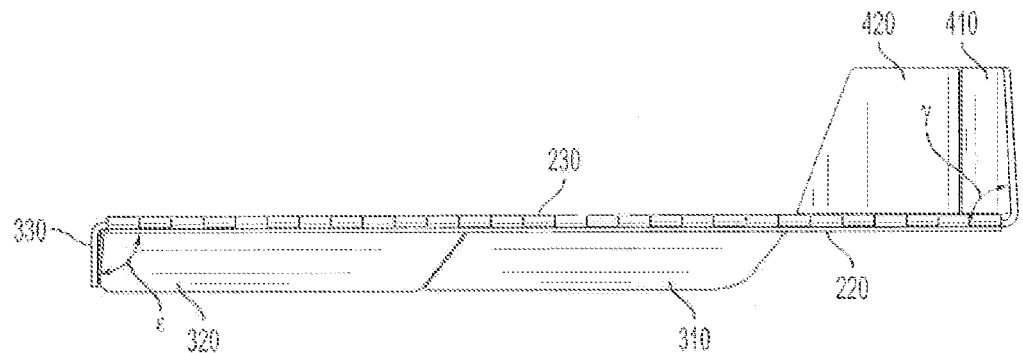
FIG. 14 is a foreside elevation view of the port wake-modifying device shown in FIG. 7.
Figure 15:
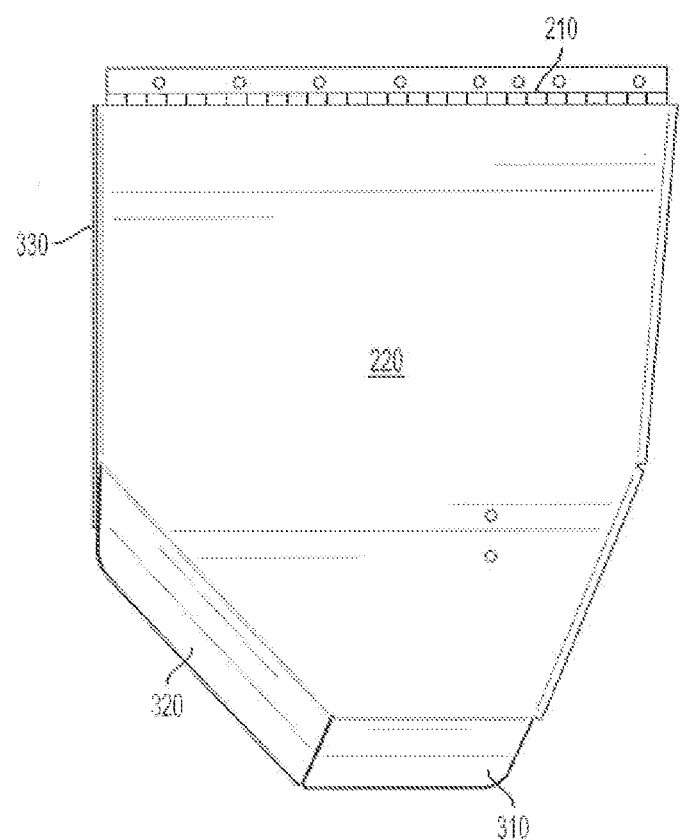
FIG. 15 is a bottom elevation view of the port wake-modifying device shown in FIG. 7.
Figure 25:
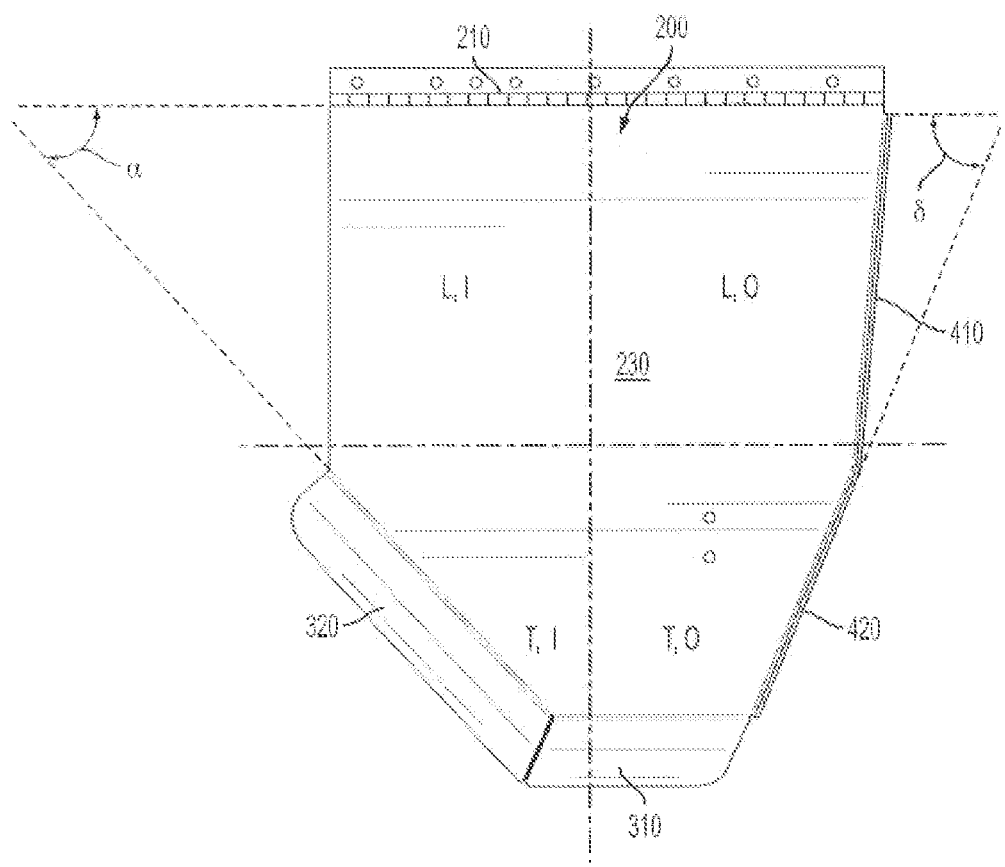
FIG. 25 is a top elevation view of the starboard wake-modifying device shown in FIG. 19.
Figure 26:
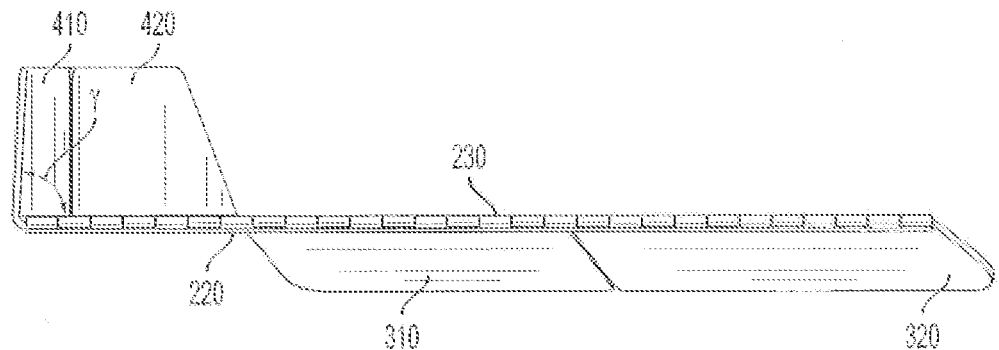
FIG. 26 is a foreside elevation view of the starboard wake-modifying device shown in FIG. 19.
Figure 27:
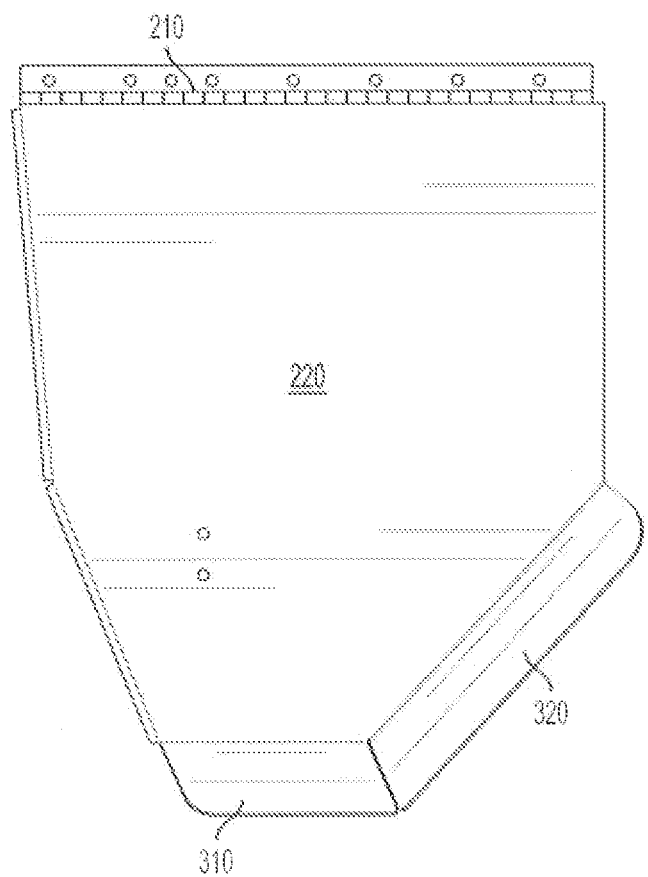
FIG. 27 is a bottom elevation view of the starboard wake-modifying device shown in FIG. 19.

The plate-like member 200 has a trailing portion T that is aft of the leading portion L. The trailing portion T is the aft half of the plate-like member 200, and the leading portion L is the forward half of the plate-like member 200. The plate-like member 200 also has an inboard portion I and an outboard portion O. The inboard portion I is the inboard half of the plate-like member, and the outboard portion O is the outboard half of the plate-like member. Thus, the plate-like member may be divided into quadrants as shown in FIGS. 13 and 25: a leading, inboard portion L, I; a leading, outboard portion L, O; a trailing, inboard portion T, I; and a trailing, outboard portion T, O.

In the embodiment shown, there are two downturned surfaces 310, 320 at the trailing portion T of the plate-like member 200. The first downturned surface 310 intersects the plate-like member 200 along a line that is generally parallel to the pivot axis 210. The second downturned surface 320 intersects the plate-like member 200 along a line that is oriented at an angle α relative to the pivot axis 210. In this embodiment, the first downturned surface 310 is outboard of the second downturned surface 320, which is at the trailing, inboard portion T, I of the plate-like member 200. The second downturned surface 320 may extend into adjacent quadrants without deviating from the scope of the invention. The first and second downturned surfaces 310, 320 preferably are at the edge of the plate-like member 200, but they may be inward of the edge.

The inventors believe that the combination of the plate-like member 200 and one or both of the downturned surfaces 310, 320 improves the size and shape of the wake. The side of the boat 100 with the desirable wake is referred to as the surf side. The surf side is the side of the boat 100 opposite a deployed wake-modifying device. The side with the deployed wake-modifying device is referred to as the non-surf side.

Figure 2:
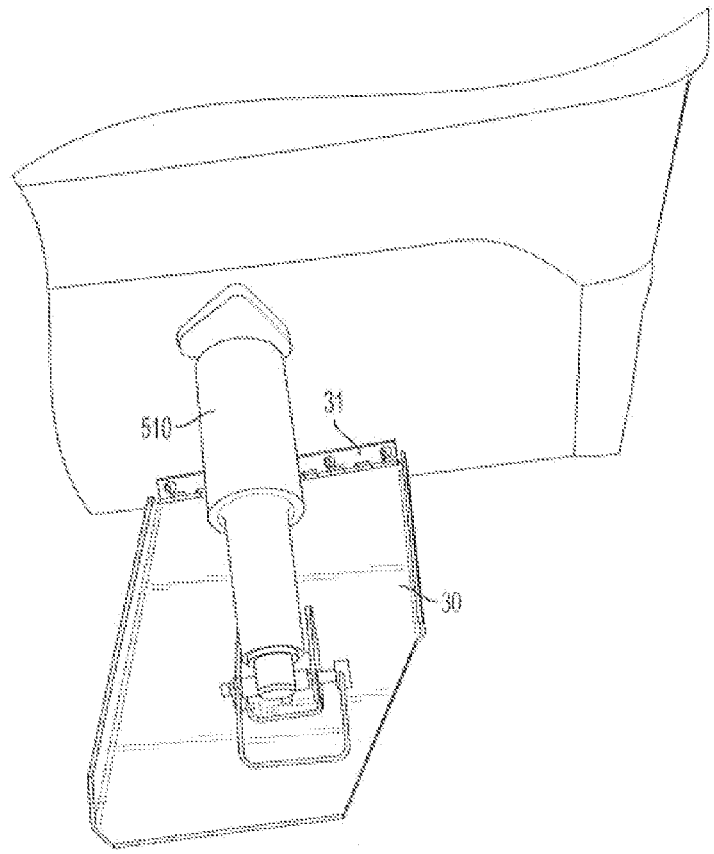
FIG. 2 is a detailed view the starboard trim tab shown in FIG. 1.

As the boat 100 moves through the water, the hull displaces water both downward under the hull 120 and outward of the sides 123, 124 of the hull 120. This creates a cavity immediately behind the boat 100. The displaced water recovers behind the boat 100 to fill the cavity. As the displaced water recover, the water converges from under the boat 100 and from the sides 123, 124 of the hull 120. When the convergence occurs with sufficient force, it creates a v-shaped wave crest or "rooster tail" at the point of convergence. This v-shaped crest then propagates outward behind the boat 100 creating a wake that is suitable for wakeboarding, wake surfing, and the life. When one of the wake-modifying devices 111, 112 is in the deployed position, the downturned surfaces 310, 320 direct the water sharply downward. This sharp redirection of water results in an additional upward force to roll the boat 100 toward the surf side to a greater degree than the prior art trim tabs discussed above and shown in FIGS. 1 and 2. As a result, the boat 100 displaces more water on the surf side creating a more desirable wake for surfing. The inventors have found that shifting the point of convergence aft of the transom 122 and toward the non-surf side will also improve the wake on the surf side. The inventors believe that creating a trough in the water behind the deployed wake-modifying device and delaying the water from recovering from the non-surf side shifts the convergence point aft of the transom 122 and toward the non-surf side. The downturned surfaces 310, 320 are believed to contribute to both of these actions. The angles of the downturned surfaces and the size of the plate contribute to the timing of water recovery to increase the size of the wake on the surf side as a result of wave superposition.

The downturned surface 310, 320 should extend far enough in a downward direction to cause redirection of the water. The downturned surface 310, 320 should also be short enough that the downturned surface does not interact with the water when in the non-deployed position. Preferably, the downturned surface 310, 320 extends from about 1 inch to about 2¼ inches below a lower surface 220 of the plate-like member 200, and more preferably about 1½ inches below the lower surface 220 of the plate-like member 200. The downturned surface 310, 320 forms an angle β with a lower surface 220 of a central portion of the plate-like member 200. The inventors have found that this angle β should be sufficient to redirect the water, but not so sharp as to result in excessive force on the wake-modifying device 111, 112. Preferably, the angle β between the downturned surface 310, 320 the lower surface 220 of the central portion of the plate-like member 200 is between about 120° and about 135°.

The water converging behind the boat 100 from the sides 123, 124 of the hull 120 forms an angle with the sides of the hull 123, 124. The inventors have found that orienting a downturned surface 320 to intersect this angle improves the wake on the surf side. Accordingly, the line where the second downturned surface 320 intersects the plate-like member 200 is oriented at an angle α relative to the pivot axis 210. This angle α preferably is perpendicular to the angle formed between the recovering water and the side 123, 124 of the hull 120. The angle α preferably is between about 30° to about 45°.

In the embodiment shown, the wake-modifying device 111, 112 has two upturned surfaces 410, 420 between the first downturned surface 310 and the pivot axis 210. These upturned surfaces 410, 420 are at the outboard portion O of the plate-like member 200, preferably at the edge of the plate-like member, but they may be inward of the edge. An angle γ between the upturned surfaces 410, 420 and an upper surface 230 of the central portion of the plate-like member 200 preferably is between about 30° to about 150°, and more preferably is about 90°. The inventors believe that these upturned surfaces 410, 420 delay the water on the non-surf side from converging behind the boat 100 and further shift the point of convergence aft of the transom 122 and toward the non-surf side. The upturned surfaces 410, 420 should extend far enough in an upward direction to delay the water. The upturned surfaces 410, 420 preferably extend at least about 1 inch above the upper surface 230 of the plate-like member 200, more preferably at least about 2 inches above the upper surface 230 of the plate-like member 200, and even more preferably at least about 2.5 inches above the upper surface 230 of the plate-like member 200. In this embodiment, the first upturned surface 410 intersects the plate-like member along a line that is generally parallel to either the port side 123 of the hull 120 or the starboard side 124 of the hull 120. The second upturned surface 420 is positioned between the first upturned surface 410 and the first downturned surface 310 and intersects the plate-like member along a line that is oriented at an oblique angle δ with respect to the pivot axis 210. The angle δ preferably is between about 60° to about 90°, and more preferably is about 75°.

A third downturned surface 330 between the second downturned surface 320 and the pivot axis 210 can further improve the wake on the surf-side. An angle ε between the third downturned surface 330 and the lower surface 220 of the central portion of the plate-like member 200 preferably is between about 30° to about 150°, and more preferably is about 90°. The inventors believe this third downturned surface 330 further delays the water on the non-surf side from converging with the water on the surf side. In the embodiment shown, the third downturned surface 330 is positioned along the inboard portion I of the plate-like member 200 and intersects the plate-like member 200 along a line that is generally perpendicular to the pivot axis 210. The third downturned surface 330 preferably is at an inboard edge of the plate-like member, but it may be inward of the edge. Similar to the other downturned surfaces 310, 320, the third downturned surface 330 should extend far enough in a downward direction to delay or redirect the water. As with the other downturned surfaces 310, 320, the third downturned surface 330 is preferably short enough that the third downturned surface 330 does not interact (or at least minimizes interaction) with the water when in the non-deployed position. The third downturned surface 330 preferably extends between about ½ inch to about 3 inches below the lower surface 220 of the plate-like member 200. and more preferably extends about 1 inch below the lower surface 220 of the plate-like member 200.

The boat 100 of this embodiment uses a left-handed propeller 170, which causes the prop wash to be offset towards the starboard side. To balance the desirability of the surf wakes on both sides of the boat 100, the port wake-modifying device 111 of this embodiment provides more delay of the water than does the starboard wake-modifying device 112. In this embodiment, the port wake-modifying device 111 has the third downturned surface 330 while the starboard wake-modifying device 112 does not. However, the third downturned surface 330 may be provided on either the port or starboard wake-modifying device 111, 112, both, or neither.

Figure 16:
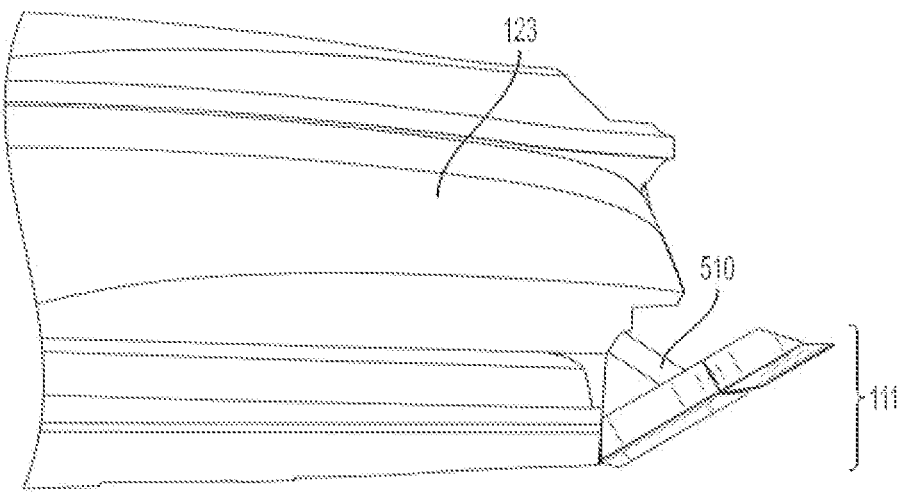
FIG. 16 is a port side view of the boat shown in FIG. 3, with the port wake-modifying device in a non-deployed position.
Figure 17:
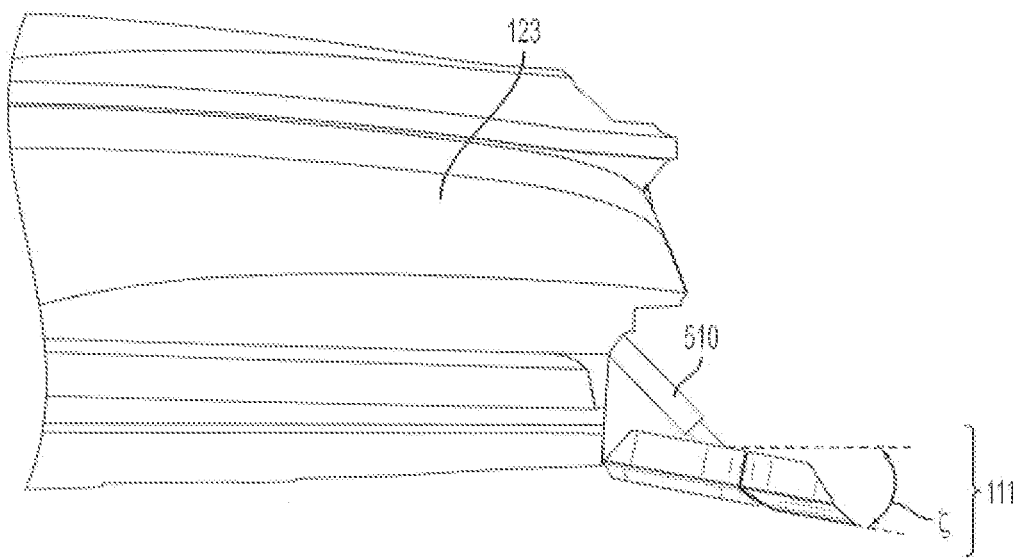
FIG. 17 is a port side view of the boat shown in FIG. 3, with the port wake-modifying device in a deployed position.
Figure 28:
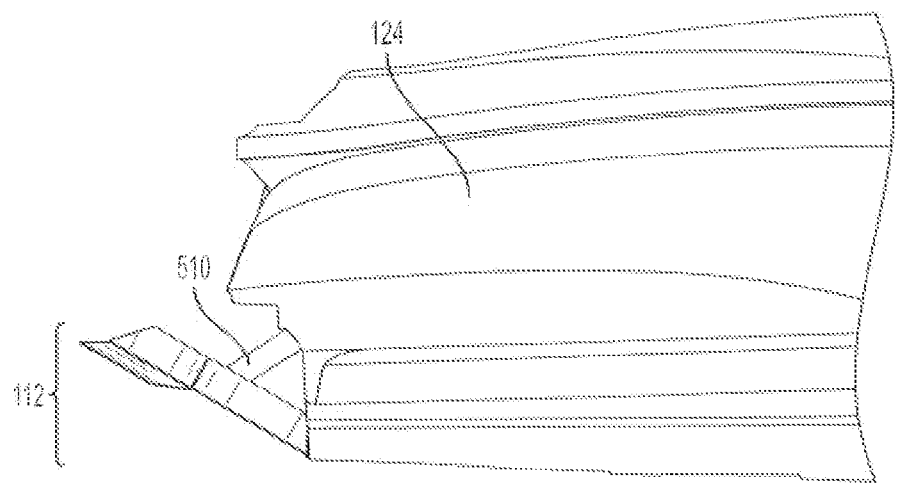
FIG. 28 is a starboard side view of the boat shown in FIG. 3, with the starboard wake-modifying device in a non-deployed position.
Figure 29:
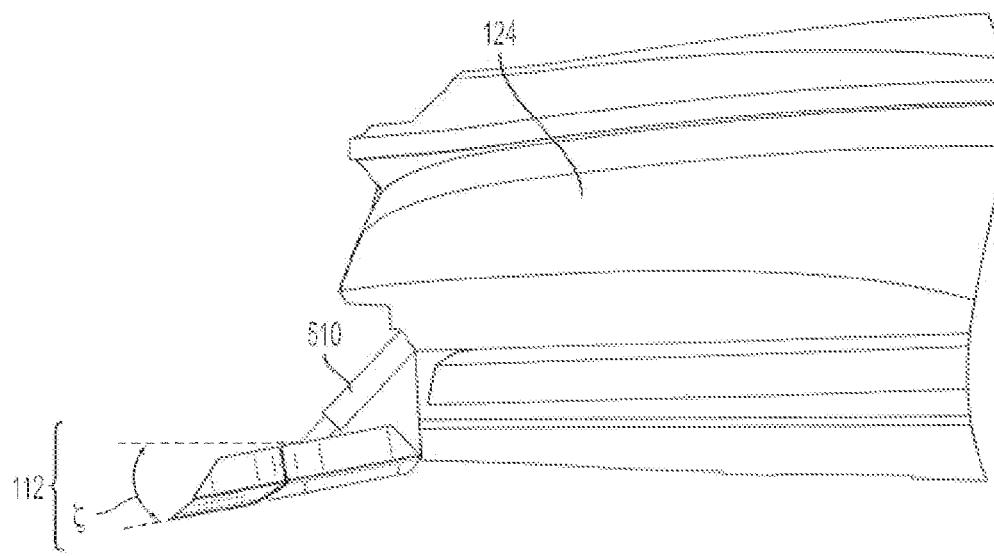
FIG. 29 is a starboard side view of the boat shown in FIG. 3, with the starboard wake-modifying device in a deployed position.

FIG. 16 shows the port wake-modifying device 111 in a non-deployed position, and FIG. 17 shows the port wake-modifying device 111 in a deployed position. Similarly, FIG. 28 shows the starboard wake-modifying device 112 in a non-deployed position, and FIG. 29 shows the starboard wake-modifying device 112 in a deployed position. As water recovers from under the boat, it travels at an upward angle. The angle of water recovery will depend on a number of factors including hull design and operational parameters, for example, speed. In the non-deployed position, the wake-modifying device 111, 112 preferably is at an upward angle so that it does not interact with the recovering water. The wake-modifying device 111, 112 is moved from the non-deployed position to a deployed position by pivoting about the pivot axis 210. In the deployed position, the trailing portion T of the wake-modifying device 111, 112 is lower than it is in the non-deployed position. The deployed position preferably is even with the bottom of the hull and more preferably extends at a downward angle ζ as shown in FIGS. 17 and 29. As discussed above, the wake-modifying device 111, 112 may be pivotable about an axis that is not horizontal, for example, it may be at an angle parallel to the deadrise. The deployed position is not limited to a single angle ζ, but rather may vary depending upon the preferences of the water sports performer. In this embodiment, the angle ζ is directly proportional to the size of the wake, but as the angle ζ gets larger, the wake begins to break (curl over) closer to the boat 100, reducing the area on the wake that is desirable for surfing. In this embodiment, the angle ζ preferably is between about 0° and about 12°.

In the embodiment shown, a linear actuator 510 is used to move the wake-modifying device 111, 112 between the deployed and non-deployed positions. The linear actuator 510 preferably is an electric linear actuator, such as one available from Leneo Marine. One end of the linear actuator 510 is screwed to the transom 122 of the boat 100. The other end of the linear actuator is connected to a u-shaped bracket 202 by a pin 204. The u-shaped bracket 202 is then bolted to the plate-like member 200. Any suitable means may be used to move the wake-modifying device 111, 112 between the deployed and non-deployed positions, including but not limited to hydraulic linear actuators and mechanical levers.

The size of the wake-modifying device 111, 112 may be varied depending upon the characteristics of the boat 100 and the desired wake. The lift provided by the wake-modifying device 111, 112 is generally proportional to the angles α, β, the surface area of the first and second downturned surfaces 310, 320. and the surface area of the plate-like member 200. In this embodiment, the wake-modifying device 111, 112 is about 17 inches long and about 14.5 inches wide. Preferably, the wake-modifying device 111, 112 is at least about 10 inches long and at least about 9 inches wide.

Because the wake-modifying device 111, 112 is used in a marine environment, it preferably is made of materials suitable for that environment. In this embodiment, these materials are primarily corrosion-resistant metal alloys such as stainless steel. The wake-modifying device 111, 112, including the plate-like member 200, preferably should not deform during operation. Preferably, the wake-modifying device 111, 112 will have sufficient rigidity to maintain its shape at all speeds and especially at speeds suitable for surfing (approximately 9 mph to 12 mph). In the preferred embodiment, the wake-modifying device 111, 112 is made from 12 gauge stainless steel plate. Other suitable materials may be used instead, such as wood, plastic, fiber reinforced composites, or other metals including aluminum.

Figure 18:
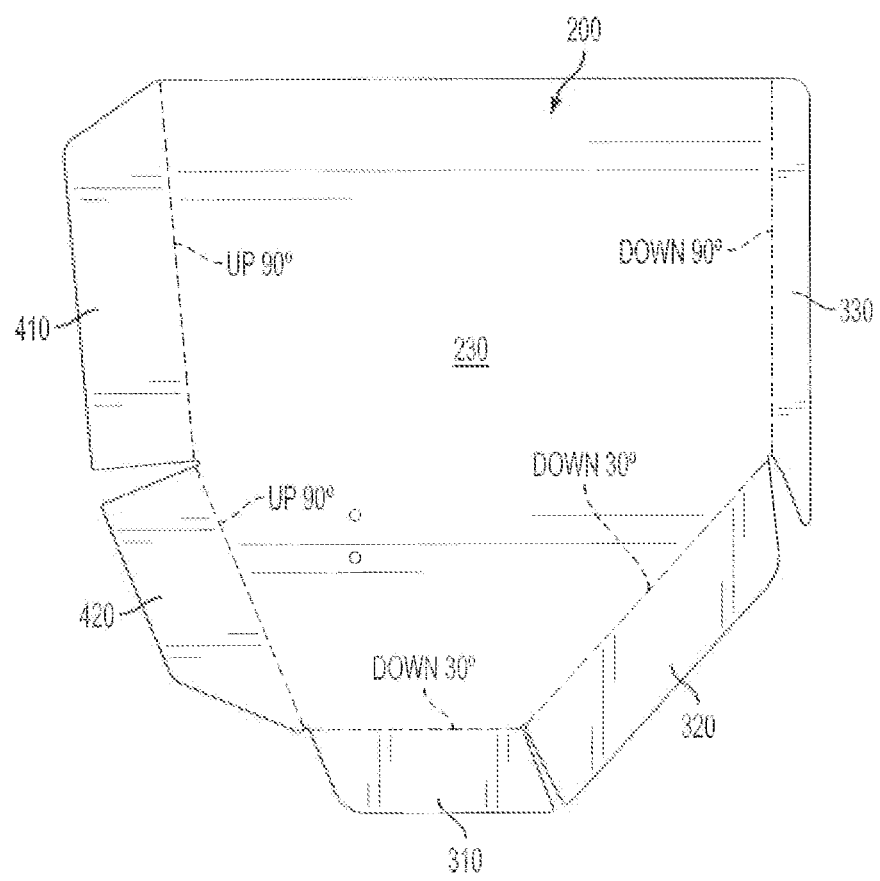
FIG. 18 is a manufacturing view of the port wake-modifying device shown in FIG. 7.
Figure 19:
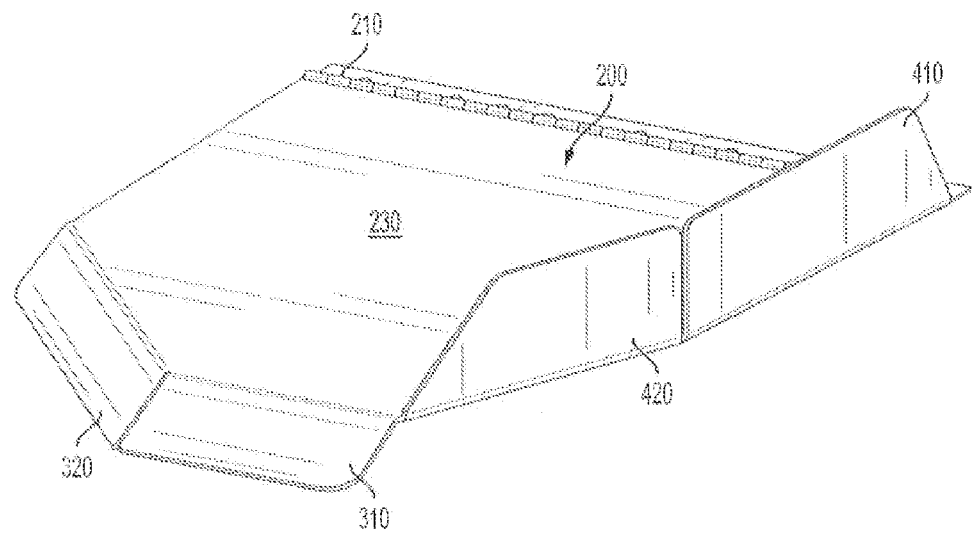
FIG. 19 is a perspective view of the starboard wake-modifying device shown in FIG. 3, detached from the boat and shown here from the outboard side.
Figure 20:
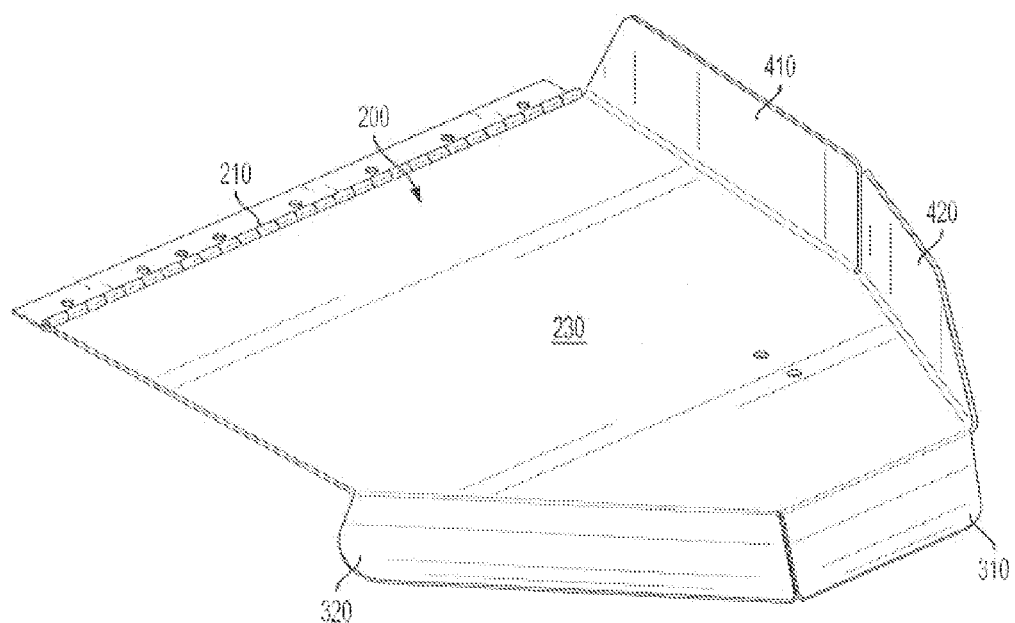
FIG. 20 is a perspective view of the starboard wake-modifying device shown in FIG. 19, shown here from the inboard side.
Figure 21:
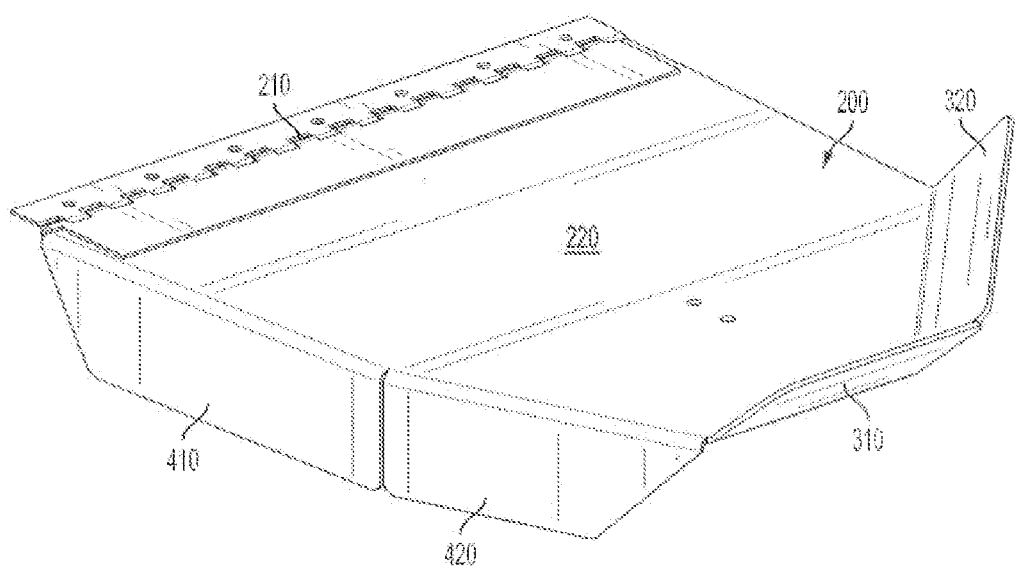
FIG. 21 is a perspective view of the starboard wake-modifying device shown in FIG. 19, turned upside down and shown here from the outboard side.
Figure 22:
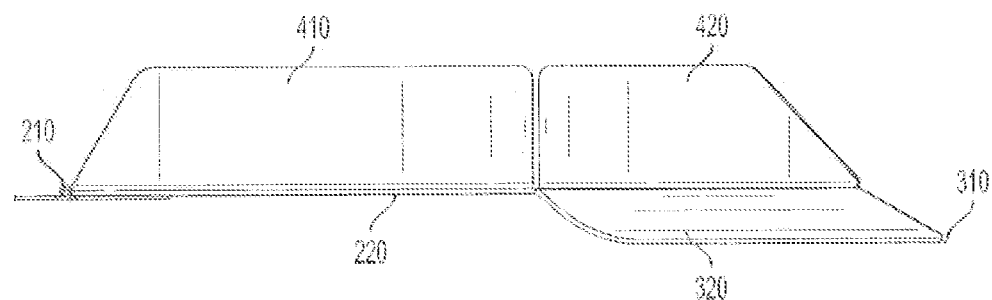
FIG. 22 is an inboard elevation view of the starboard wake-modifying device shown in FIG. 19.
Figure 23:
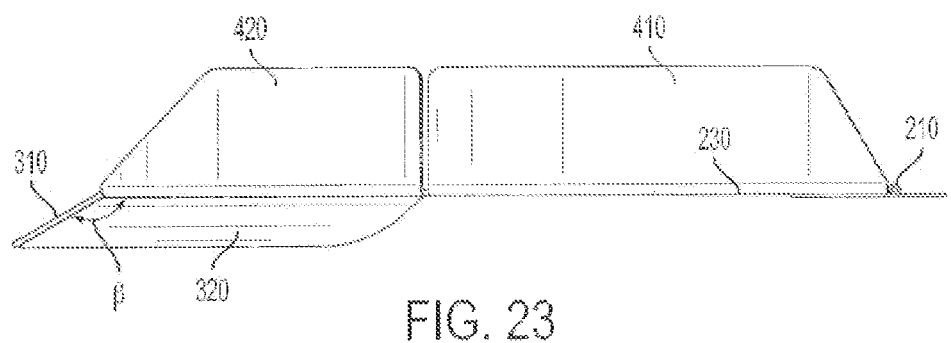
FIG. 23 is an outboard elevation view of the starboard wake-modifying device shown in FIG. 19.
Figure 24:
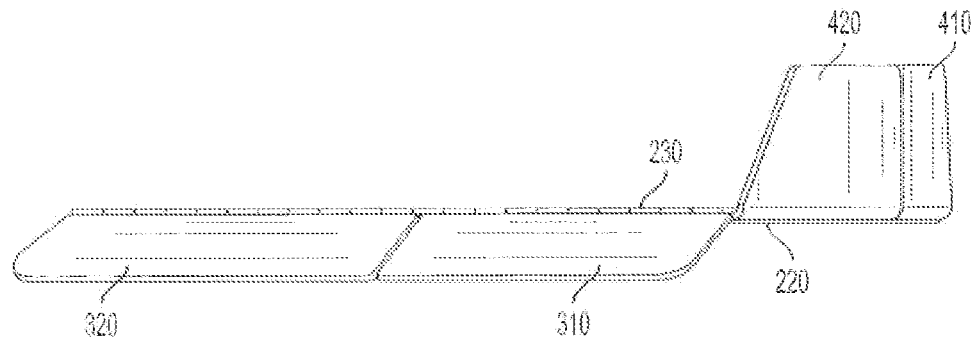
FIG. 24 is an aft elevation view of the starboard wake-modifying device shown in FIG. 19.
Figure 30:
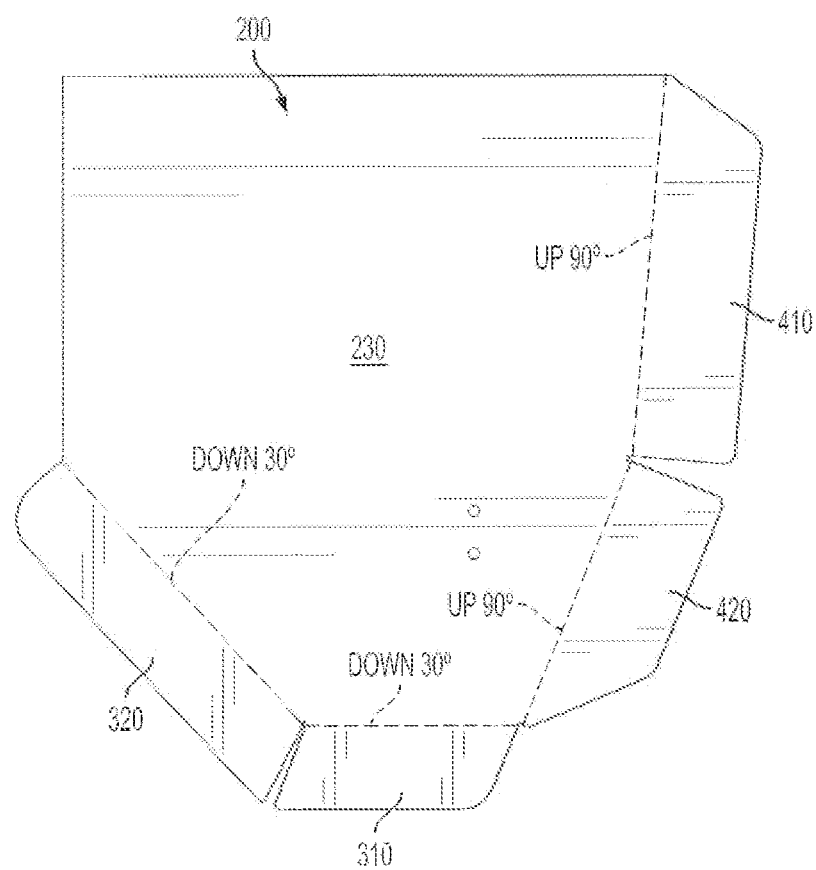
FIG. 30 is a manufacturing view of the starboard wake-modifying device shown in FIG. 19.

FIGS. 18 and 30 show manufacturing views of the port and starboard wake-modifying devices 111, 112, respectively. The wake-modifying device 111, 112 may be manufactured by cutting the device from a single plate stock to the desired shape and then bending the downturned and upturned surfaces to the desired angles. In this embodiment, the plate-like member 200, the downturned surfaces 310, 320, 330, and the upturned surfaces 410, 420 are an integral piece. Alternatively, some or all of the downturned and upturned surfaces may be formed as separate pieces and then attached to the plate-like member using any suitable joining method such as welding, bolting, riveting, or the like.

Second Embodiment

Boat design plays an important role in establishing the wake shape. Design factors include, for example, the hull design and the weight of the boat. The wake-modifying device 111, 112 preferably is customized based on the boat design in order to produce the desired wake.

As an example of how hull design affects the boat's wake, a first boat having a steeper deadrise than a second boat will typically allow the water to recover closer to the transom of the boat. The shape of the corners between the sides of the hull and the transom also impact the recovery of the water. A boat with smooth corners (e.g., having a radius) will allow the water to recover faster than will a boat with square corners. The wake-modifying devices 111, 112 of the second embodiment are designed to provide greater lift to the boat on the non-surf side and further delay and direct the water on the non-surf side.

Figure 31:
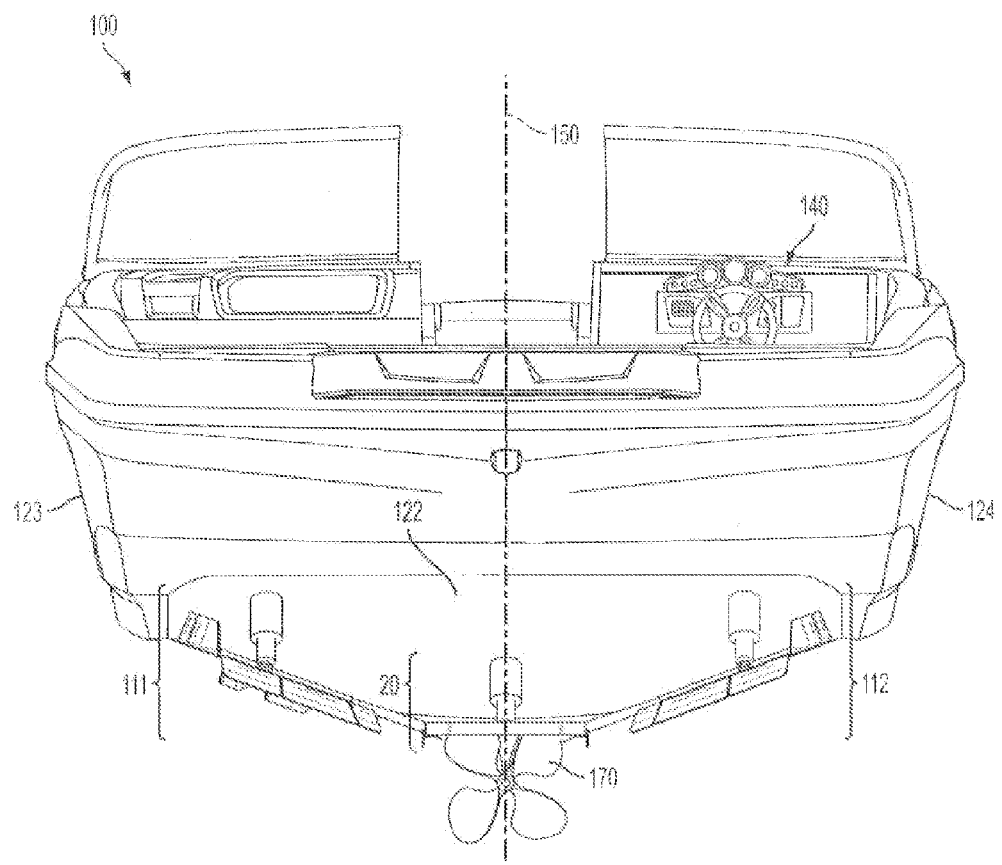
FIG. 31 is a stern view of a boat including a pair of wake-modifying devices according to a second preferred embodiment of the invention.
Figure 32:
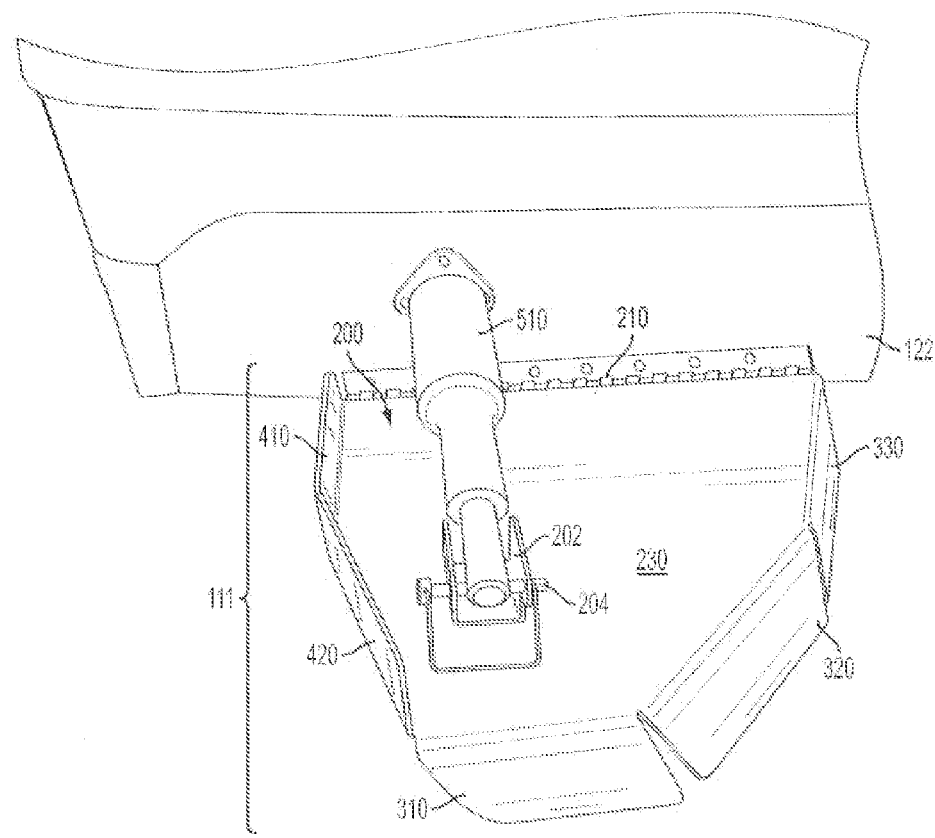
FIG. 32 is a detailed view of the port wake-modifying device shown in FIG. 31.
Figure 33:
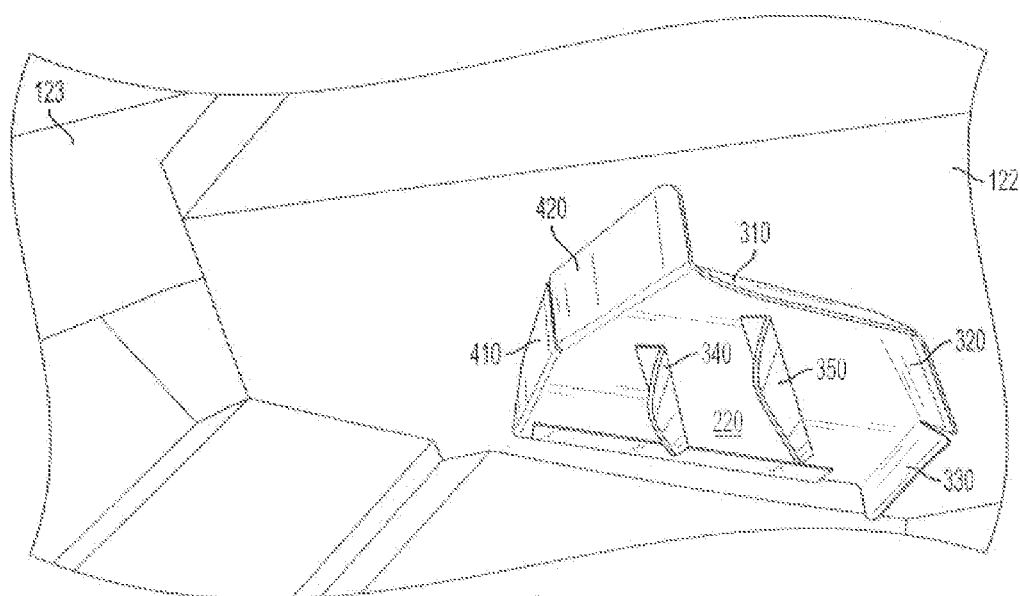
FIG. 33 is a detailed view of the bottom of the port wake-modifying device shown in FIG. 31.
Figure 34:
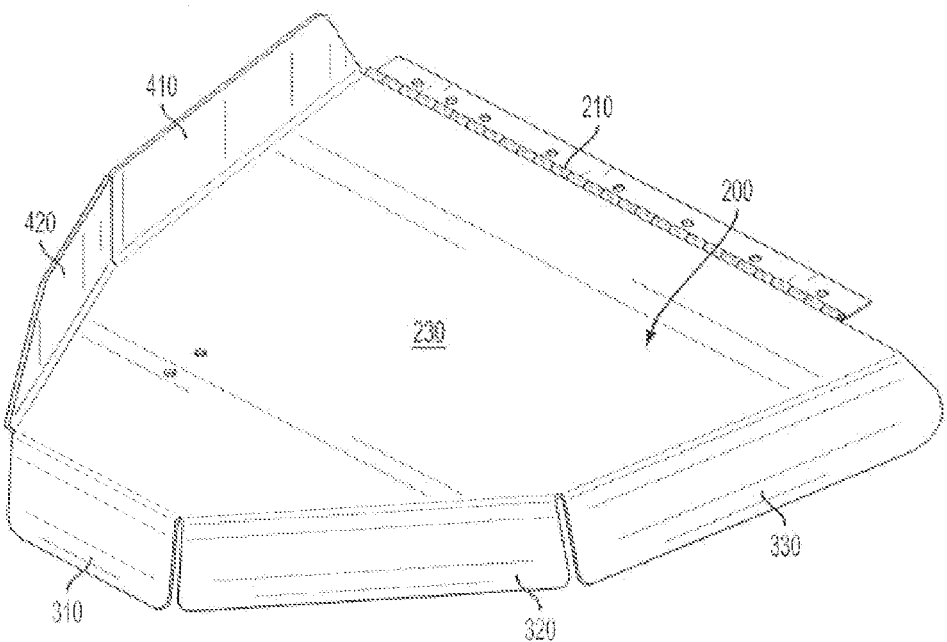
FIG. 34 is a perspective view of the port wake-modifying device shown in FIG. 31, detached from the boat and shown here from the inboard side.
Figure 35:
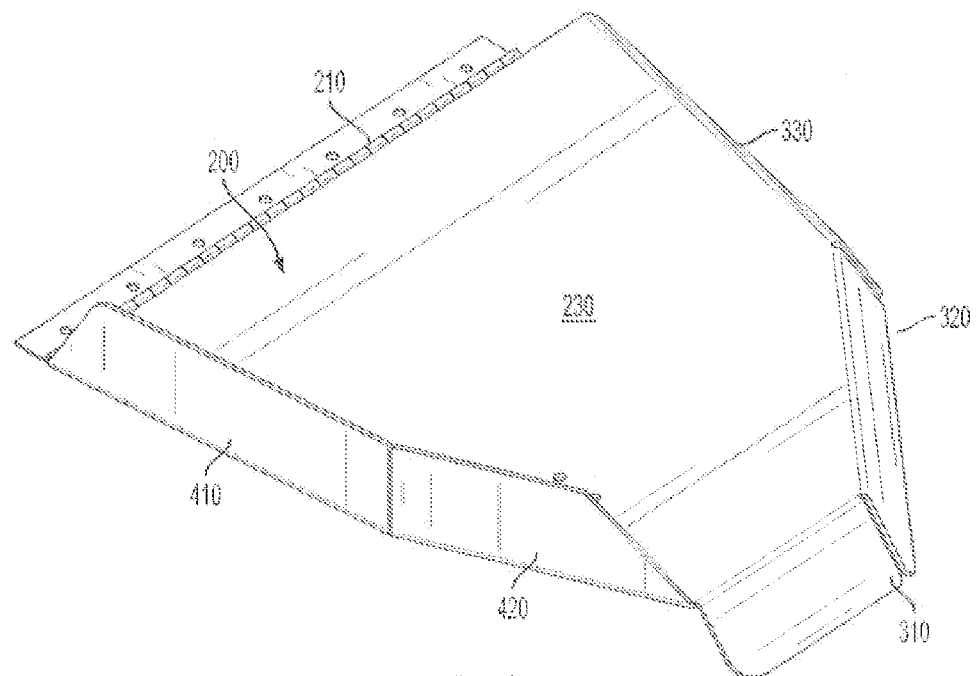
FIG. 35 is a perspective view of the port wake-modifying device shown in FIG. 34, shown here from the outboard side.
Figure 36:
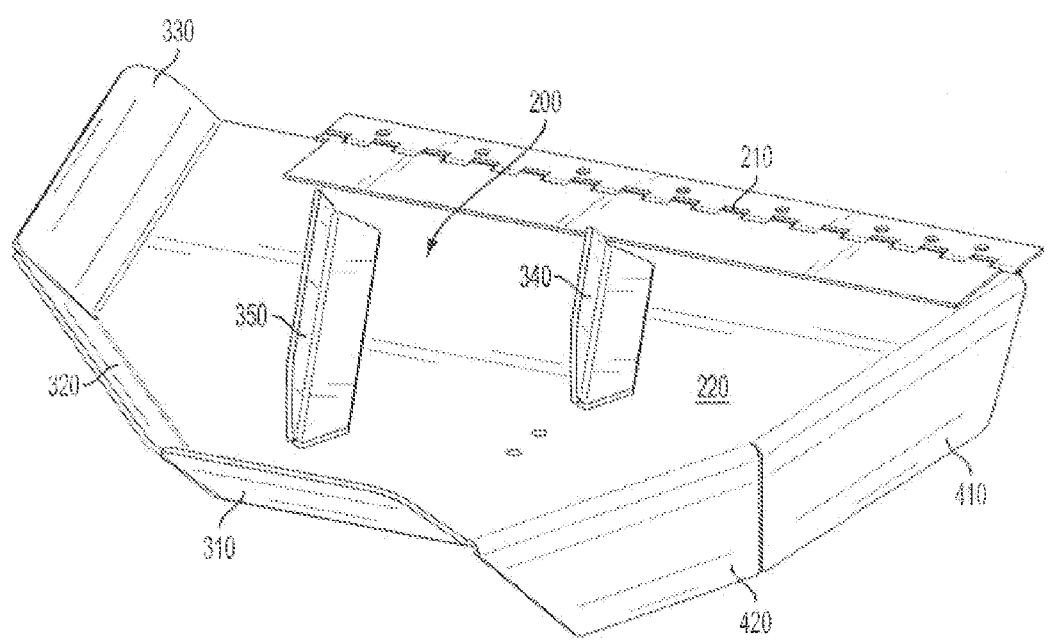
FIG. 36 is a perspective view of the port wake-modifying device shown in FIG. 34, turned upside down and shown here from the outboard side.
Figure 37:
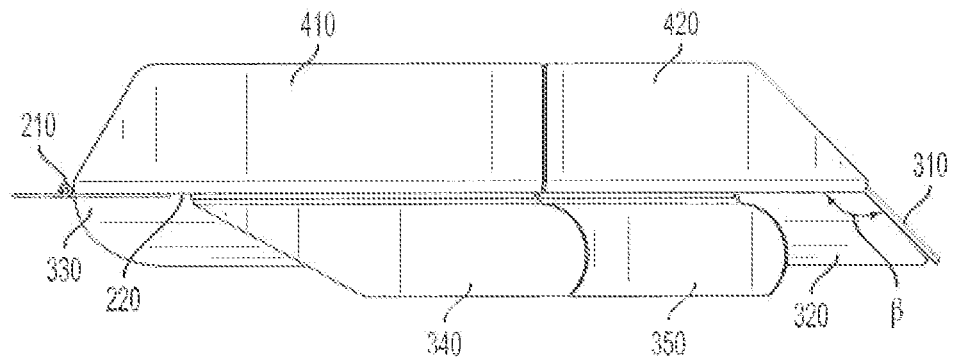
FIG. 37 is an outboard elevation view of the port wake-modifying device shown in FIG. 34.
Figure 38:
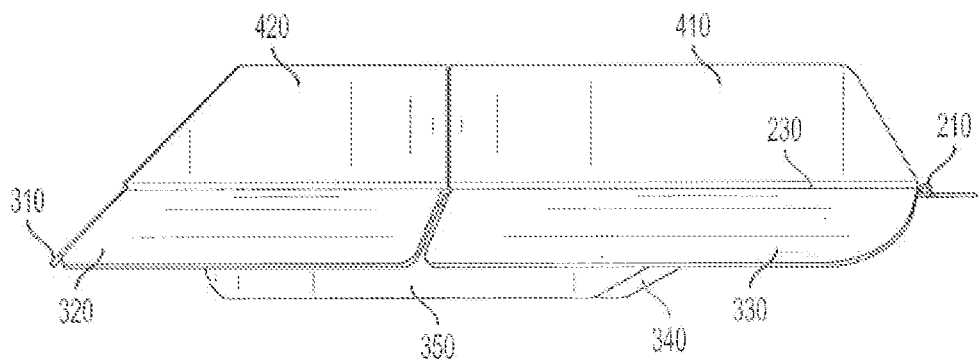
FIG. 38 is an inboard elevation view of the port wake-modifying device shown in FIG. 34.
Figure 39:
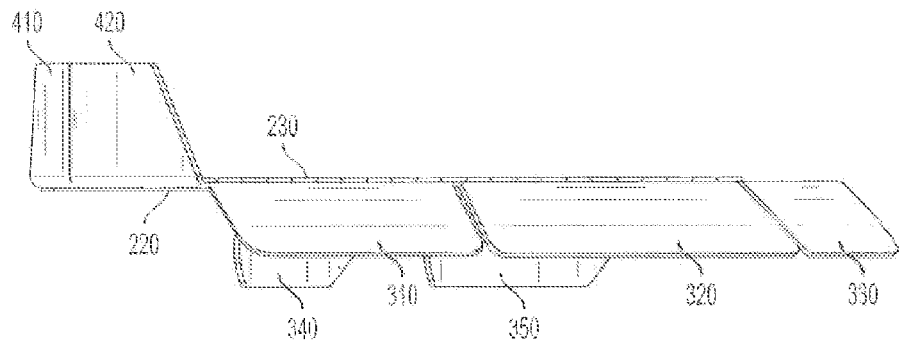
FIG. 39 is an aft elevation view of the port wake-modifying device shown in FIG. 34.
Figure 40:
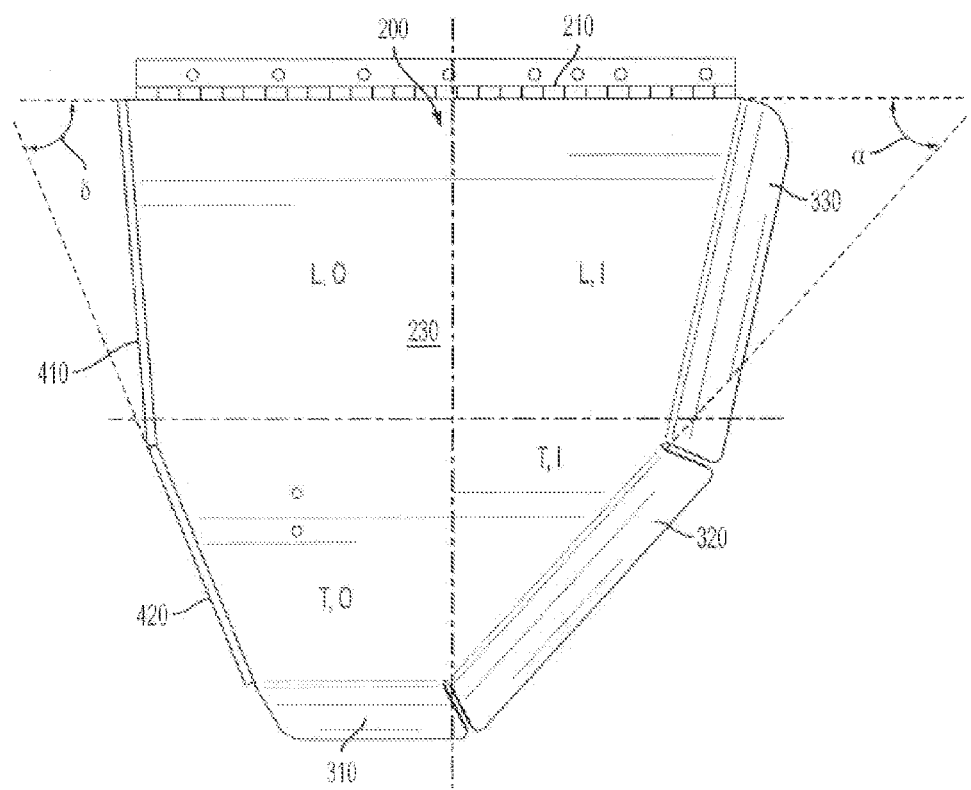
FIG. 40 is a top elevation view of the port wake-modifying device shown in FIG. 34.
Figure 41:
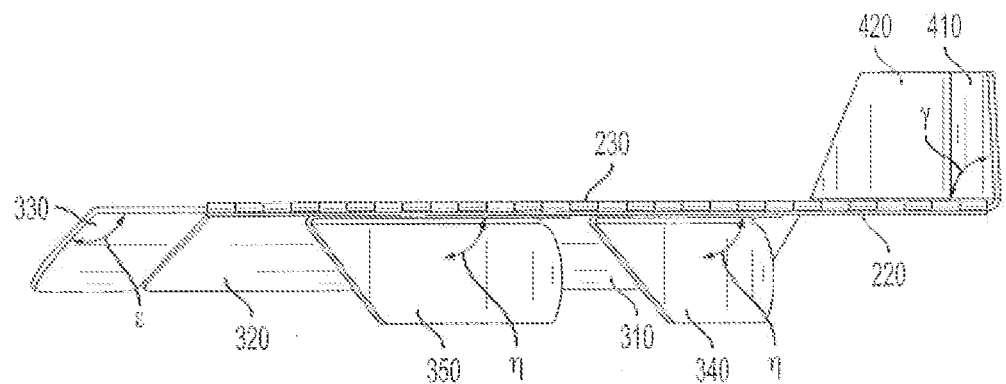
FIG. 41 is a foreside elevation view of the port wake-modifying device shown in FIG. 34.
Figure 42:
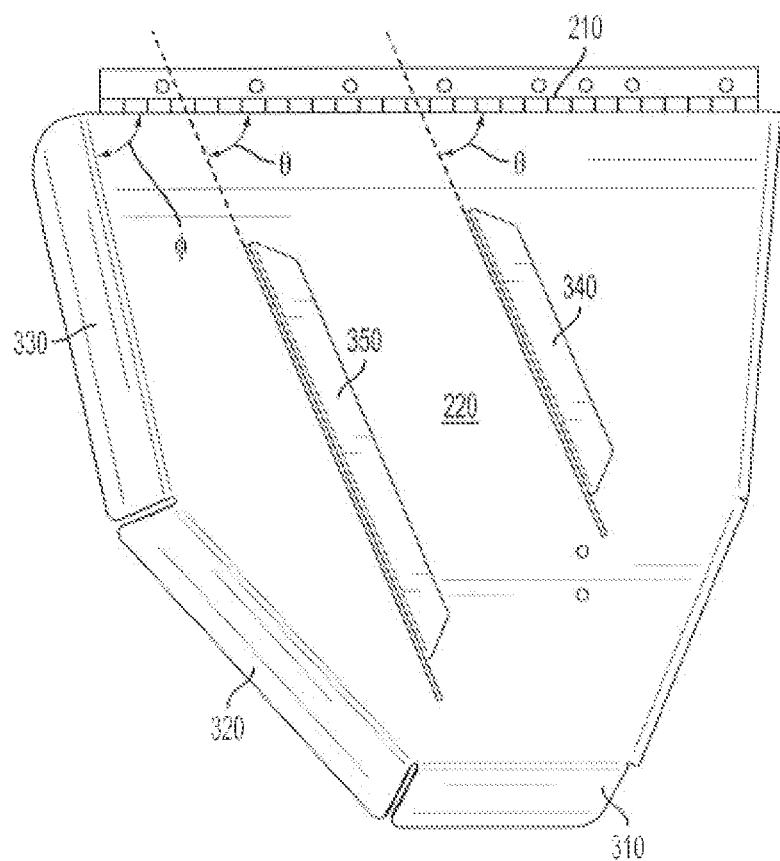
FIG. 42 is a bottom elevation view of the port wake-modifying device shown in FIG. 34.
Figure 43:
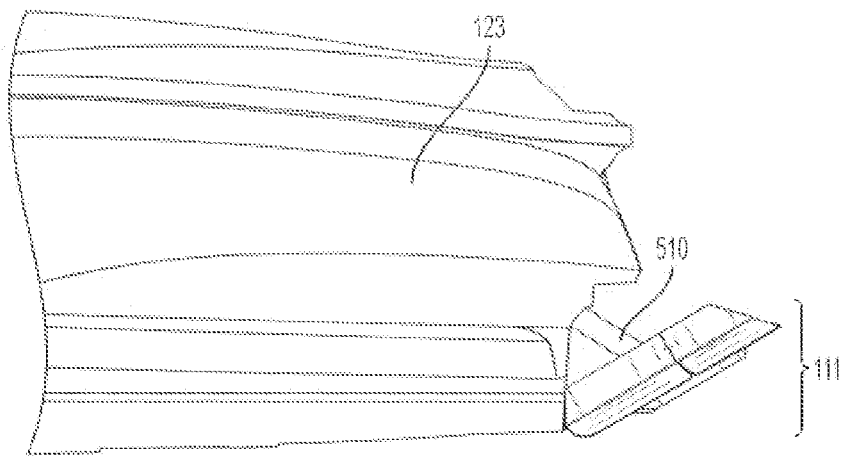
FIG. 43 is a port side view of the boat shown in FIG. 31, with the port wake-modifying device in a non-deployed position.
Figure 44:
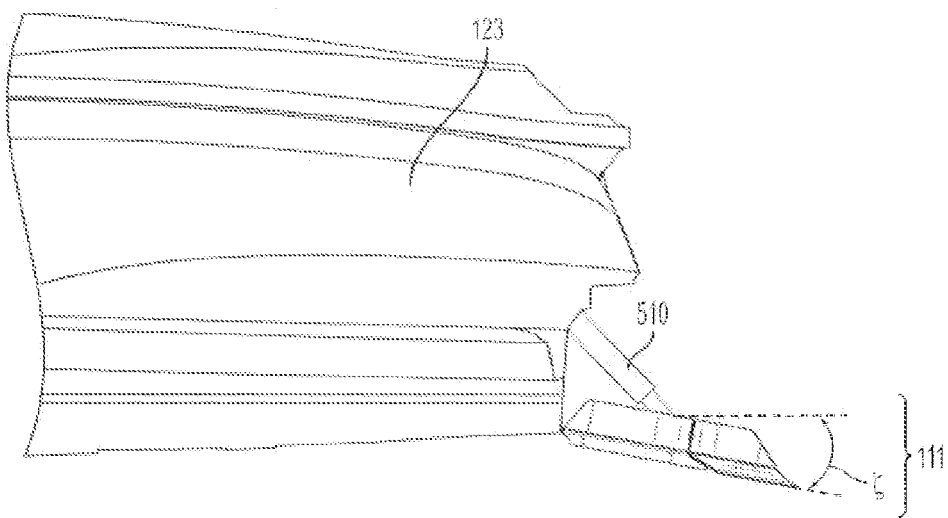
FIG. 44 is a port side view of the boat shown in FIG. 31, with the port wake-modifying device in a deployed position.
Figure 45:
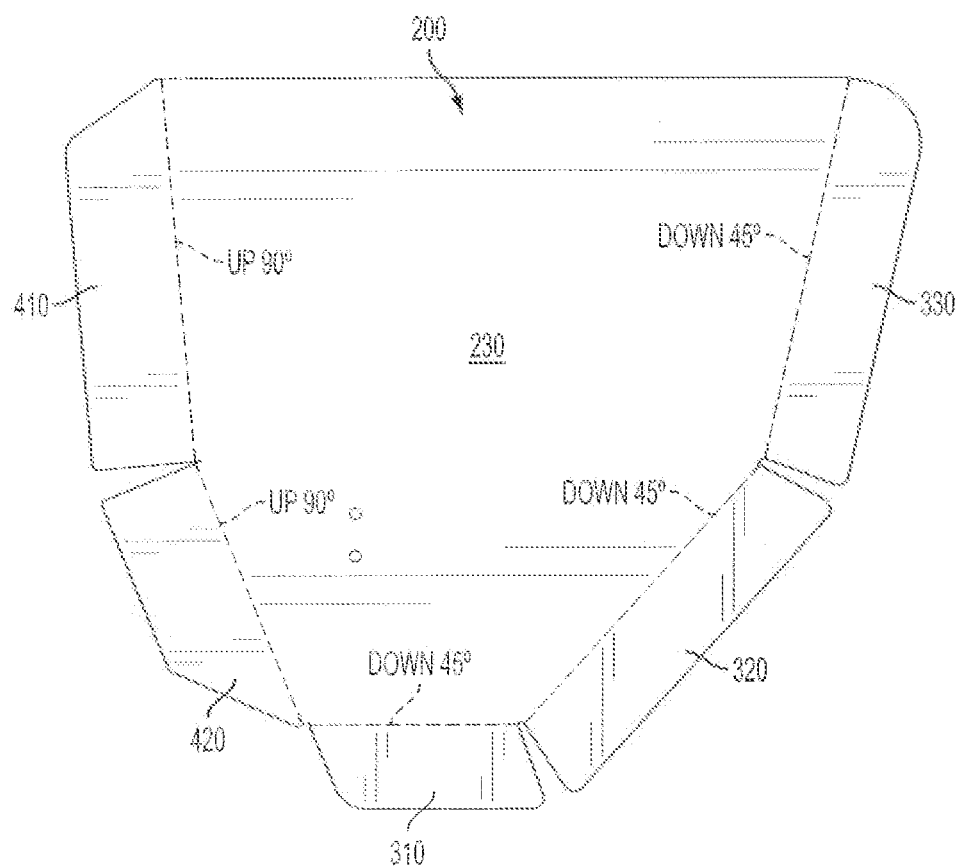
FIG. 45 is a manufacturing view of the port wake-modifying device shown in FIG. 34.
Figure 46:
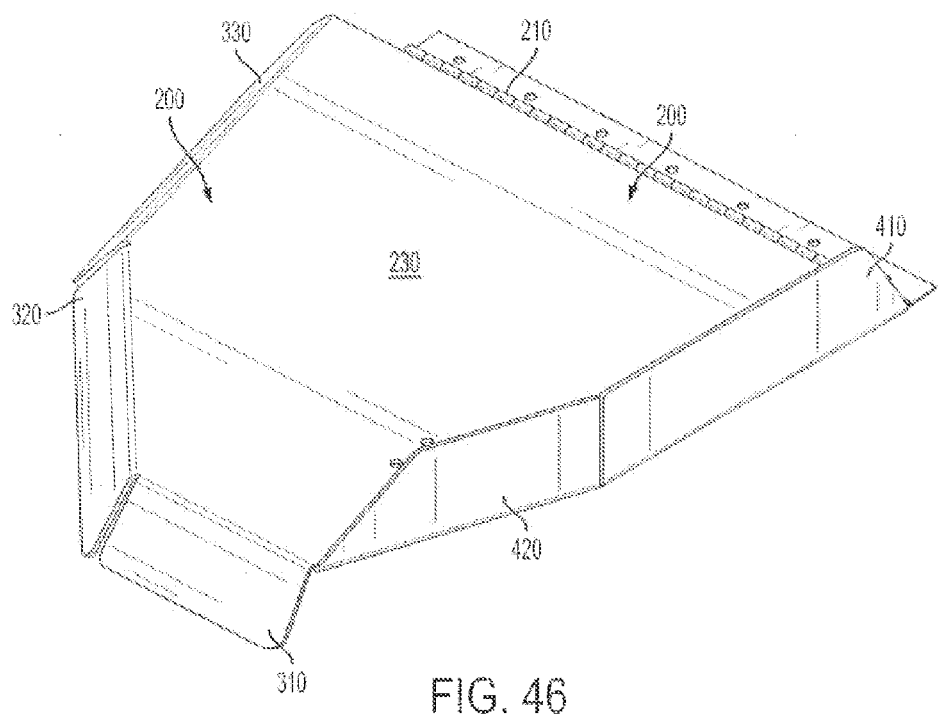
FIG. 46 is a perspective view of the starboard wake-modifying device shown in FIG. 31, detached from the boat and shown here from the outboard side.
Figure 47:
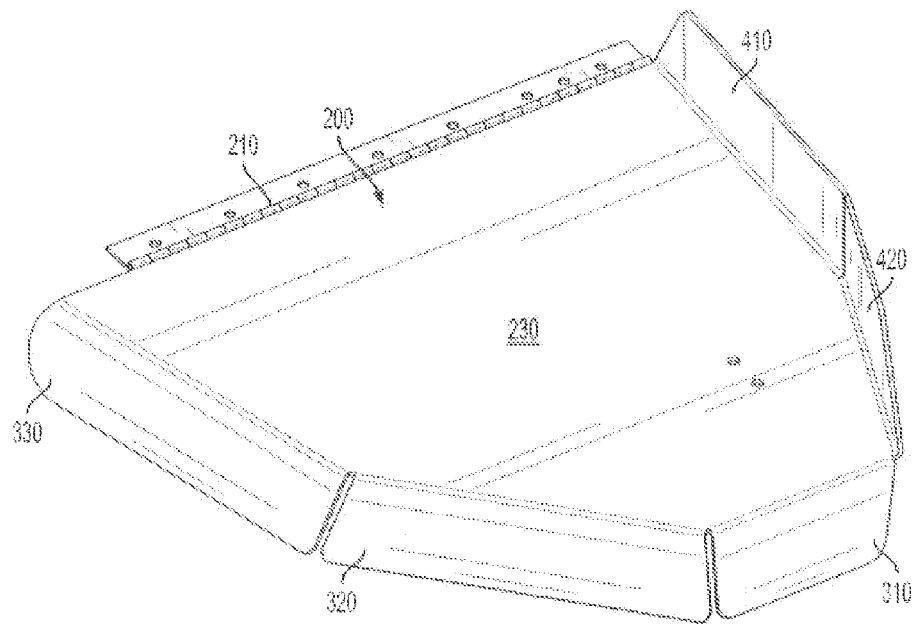
FIG. 47 is a perspective view of the starboard wake-modifying device shown in FIG. 46, shown here from the inboard side.
Figure 48:
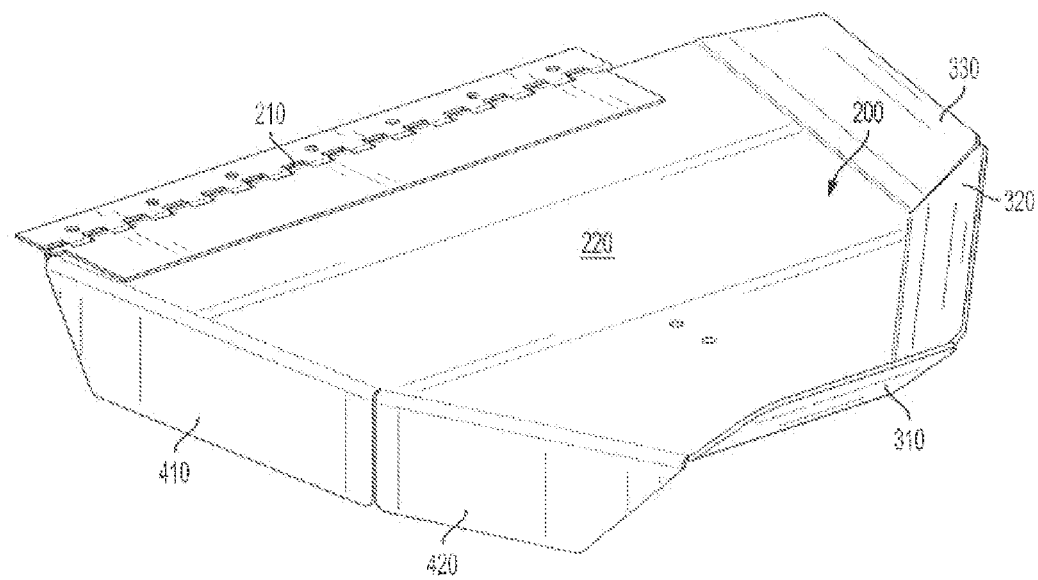
FIG. 48 is a perspective view of the starboard wake-modifying device shown in FIG. 46, turned upside down and shown here from the outboard side.
Figure 49:
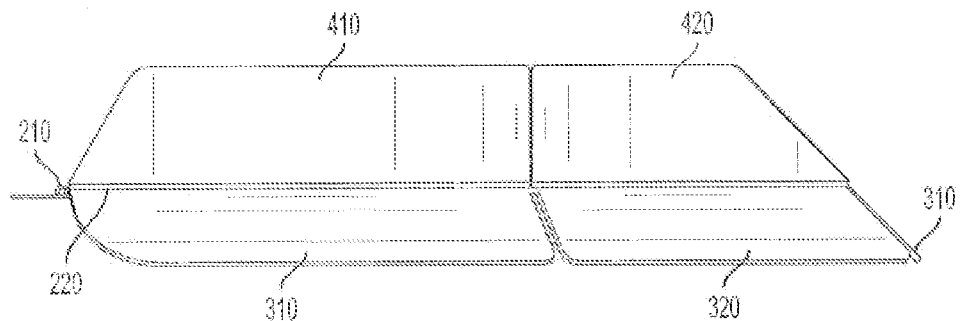
FIG. 49 is an inboard elevation view of the starboard wake-modifying device shown in FIG. 46.
Figure 50:
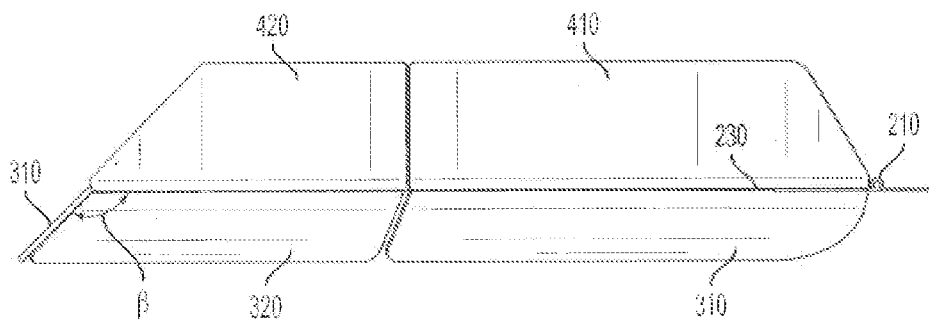
Figure 51:
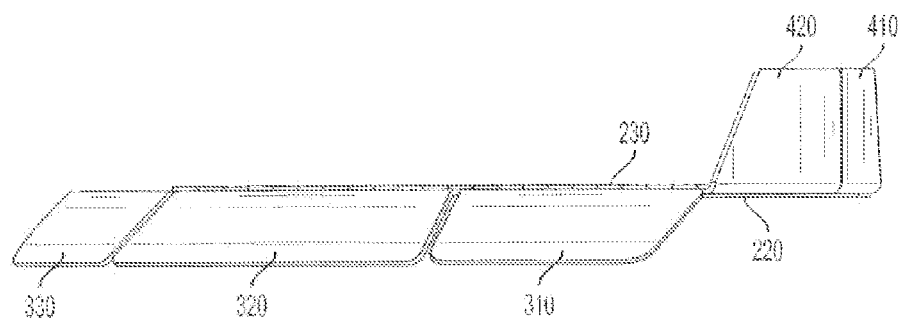
FIG. 51 is an aft elevation view of the starboard wake-modifying device shown in FIG. 46.
Figure 52:
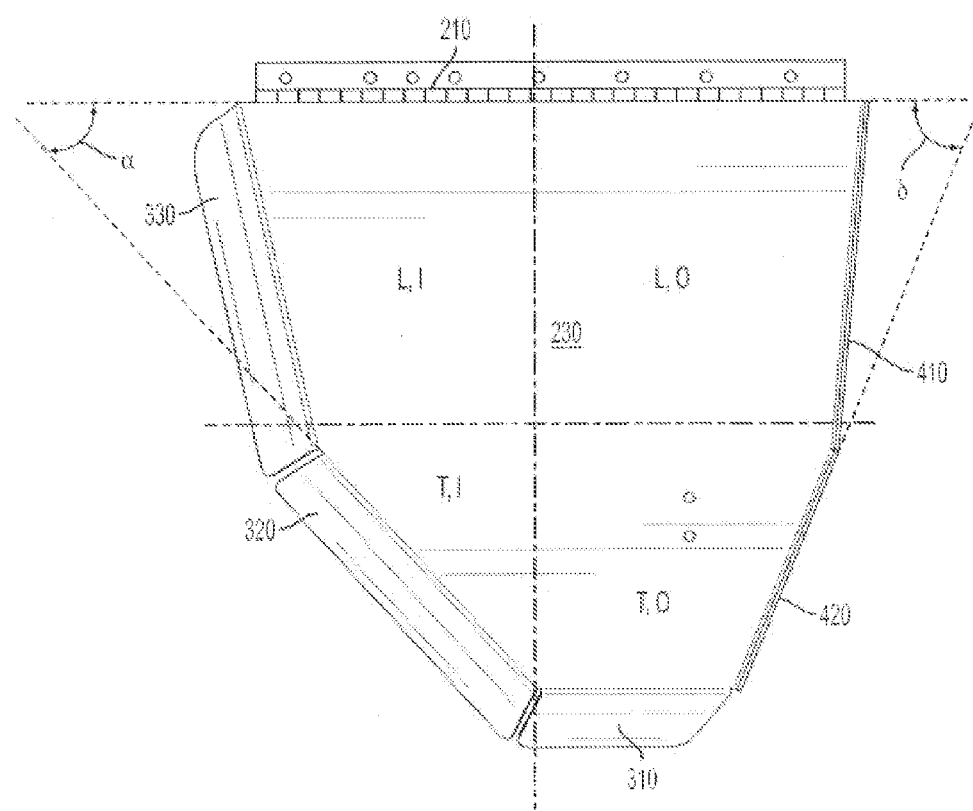
FIG. 52 is a top elevation view of the starboard wake-modifying device shown in FIG. 46.
Figure 53:
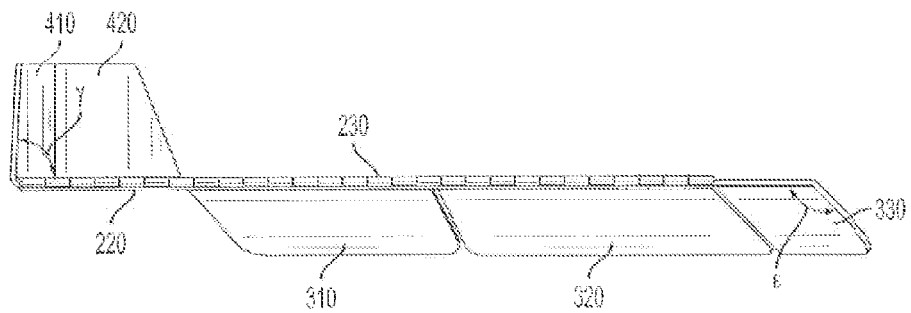
FIG. 53 is a foreside elevation view of the starboard wake-modifying device shown in FIG. 46.
Figure 54:
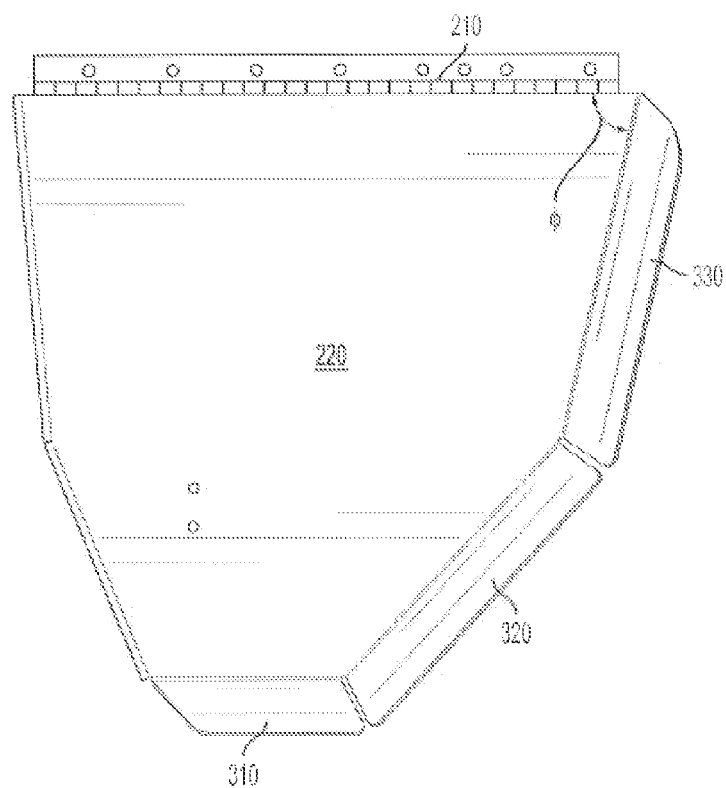
FIG. 54 is a bottom elevation view of the starboard wake-modifying device shown in FIG. 46.
Figure 55:
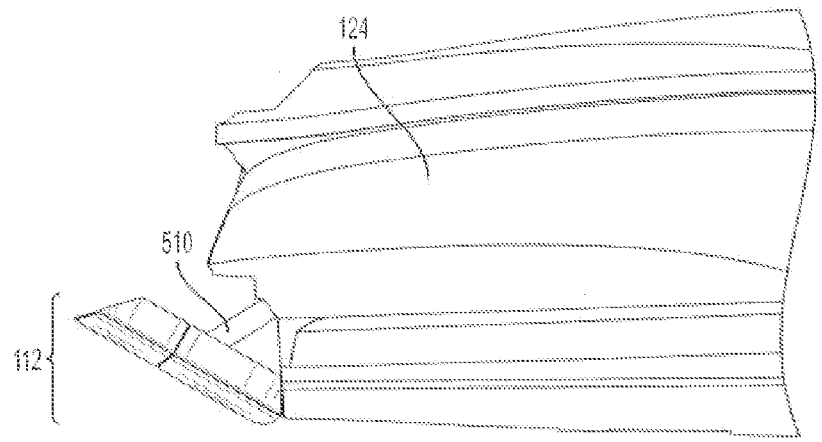
FIG. 55 is a starboard side view of the boat shown in FIG. 31, with the starboard wake-modifying device in a non-deployed position.
Figure 56:
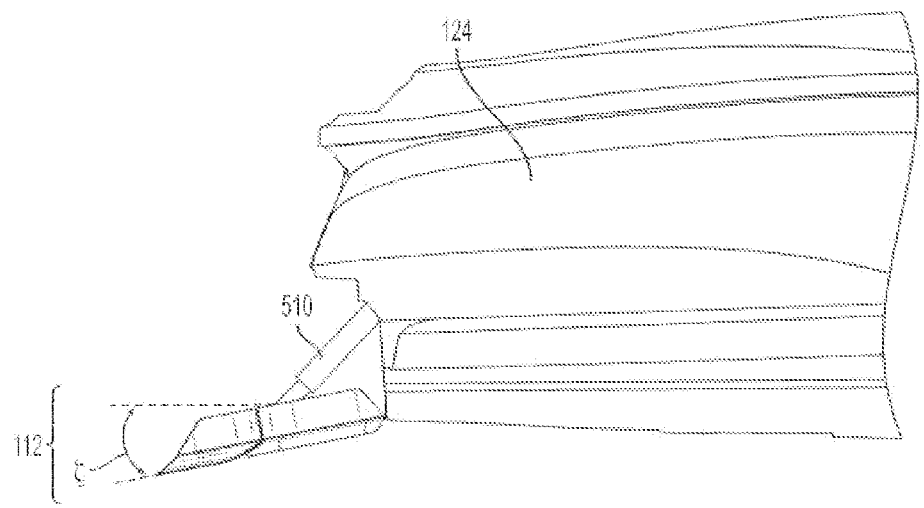
FIG. 56 is a starboard side view of the boat shown in FIG. 31, with the starboard wake-modifying device in a deployed position.
Figure 57:
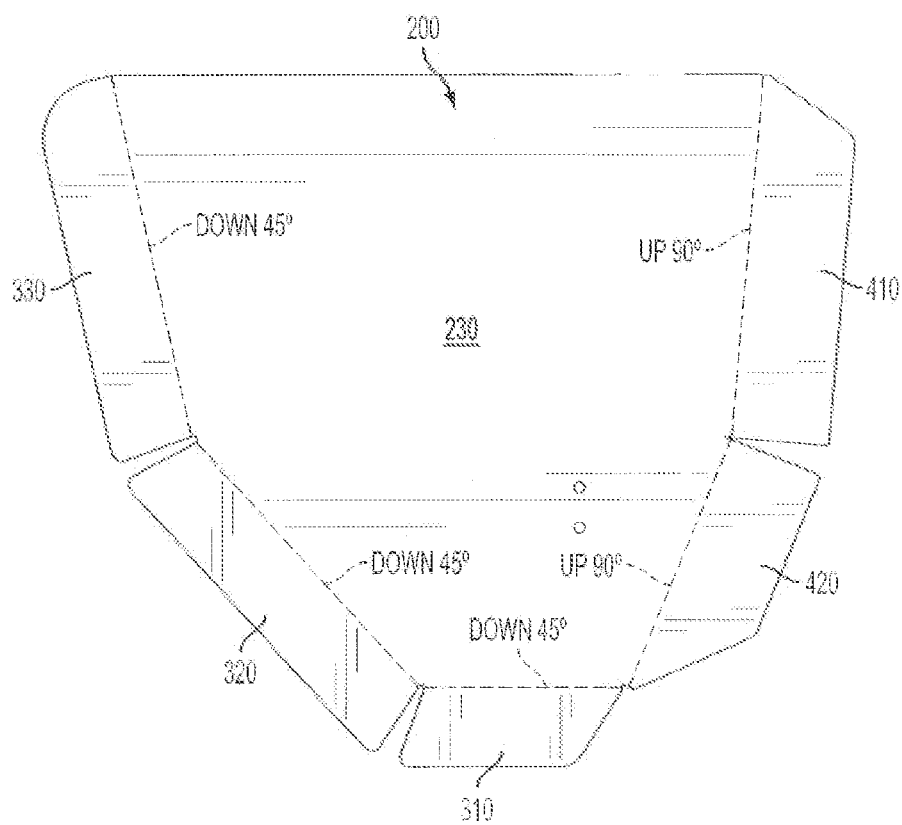
FIG. 57 is a manufacturing view of the starboard wake-modifying device shown in FIG. 46.
Figure 58:
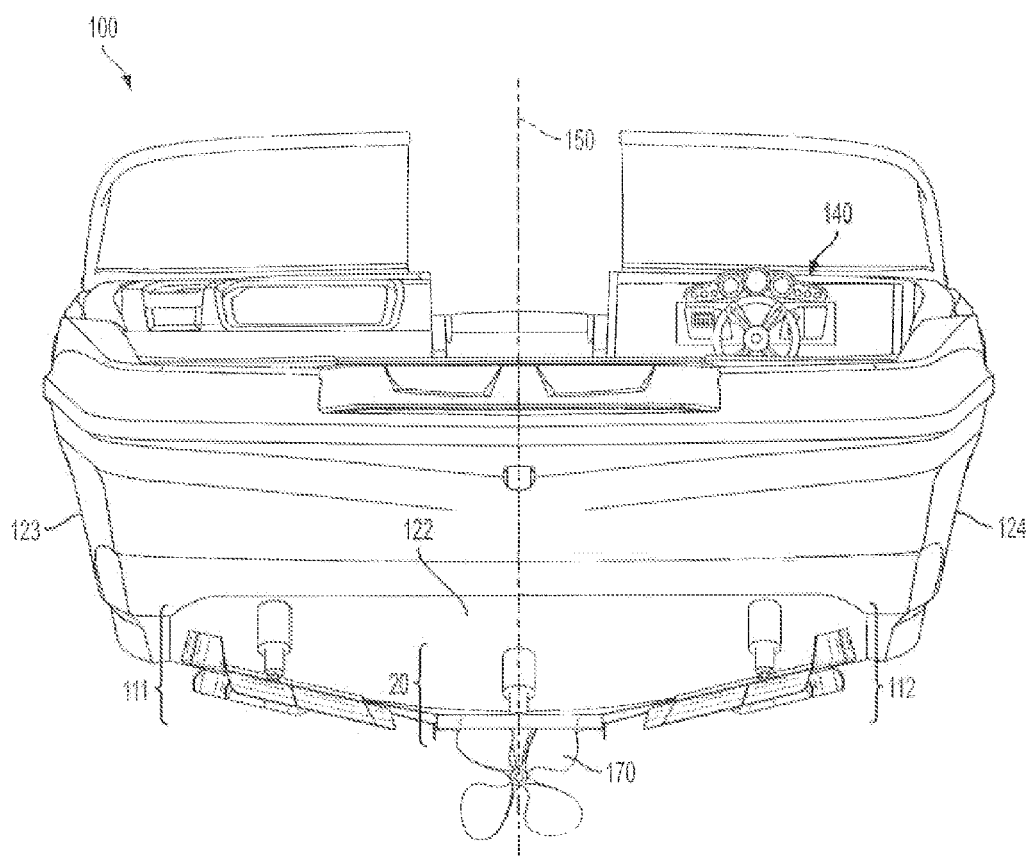
FIG. 58 is a stern view of a boat including a pair of wake-modifying devices according to a third preferred embodiment of the invention.
Figure 59:
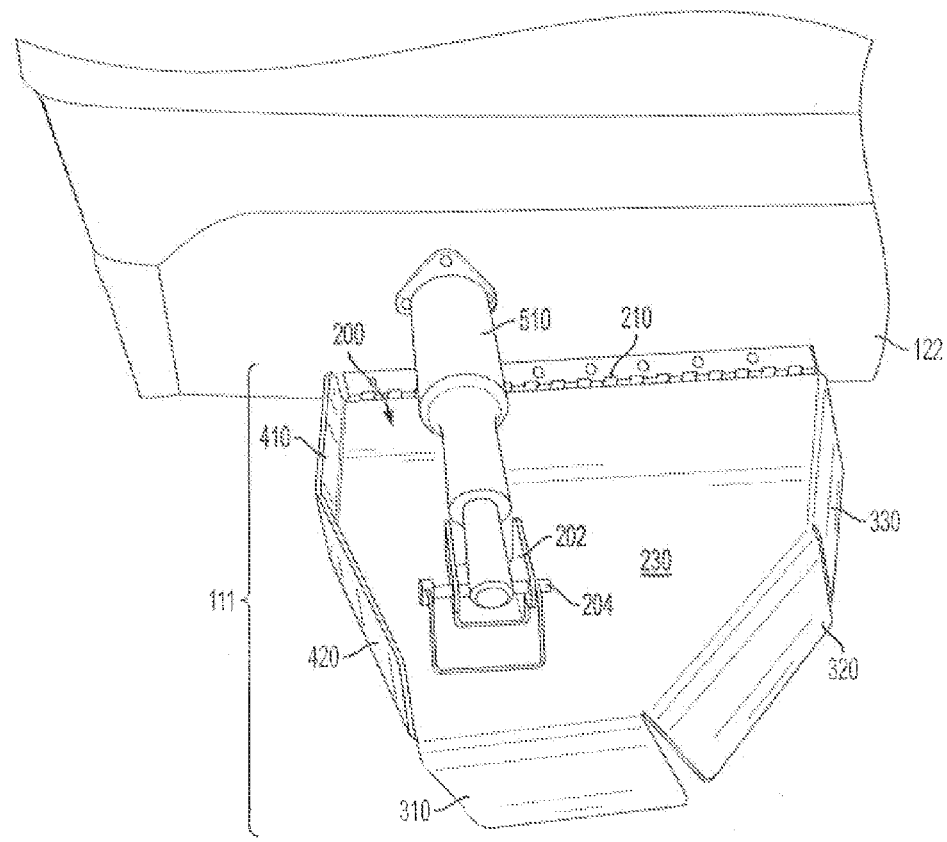
FIG. 59 is an outboard elevation view of the starboard wake-modifying device shown in FIG. 46.
Figure 60:
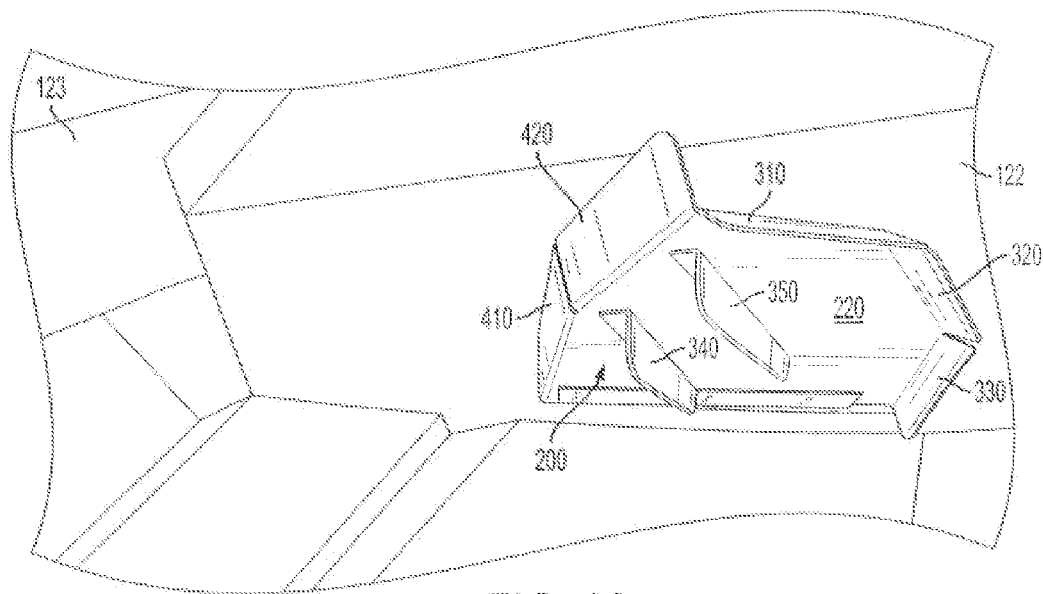
FIG. 60 is a detailed view of the bottom of the port wake-modifying device shown in FIG. 58.
Figure 61:
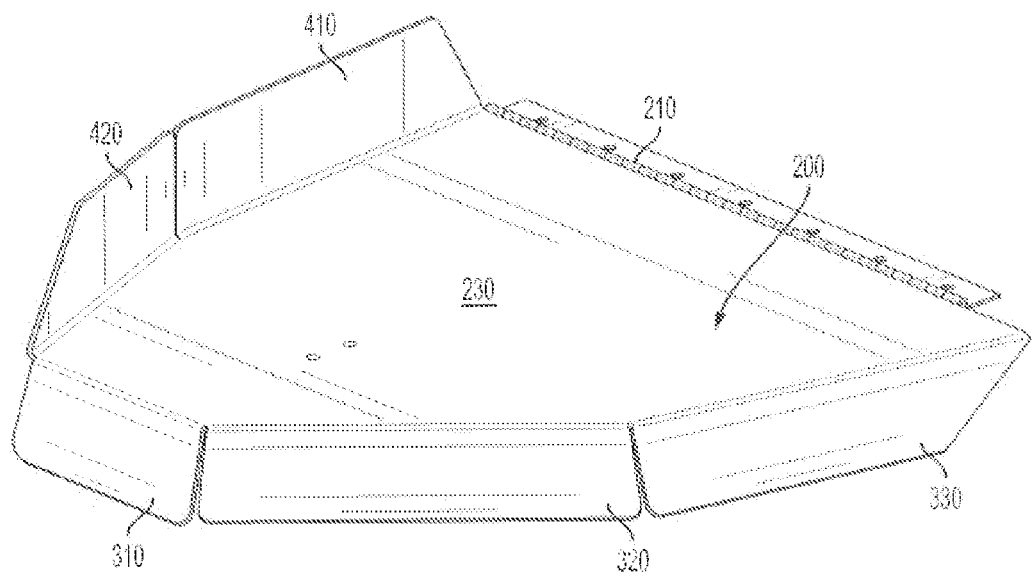
FIG. 61 is a perspective view of the port wake-modifying device shown in FIG. 58, detached from the boat and shown here from the inboard side.
Figure 62:
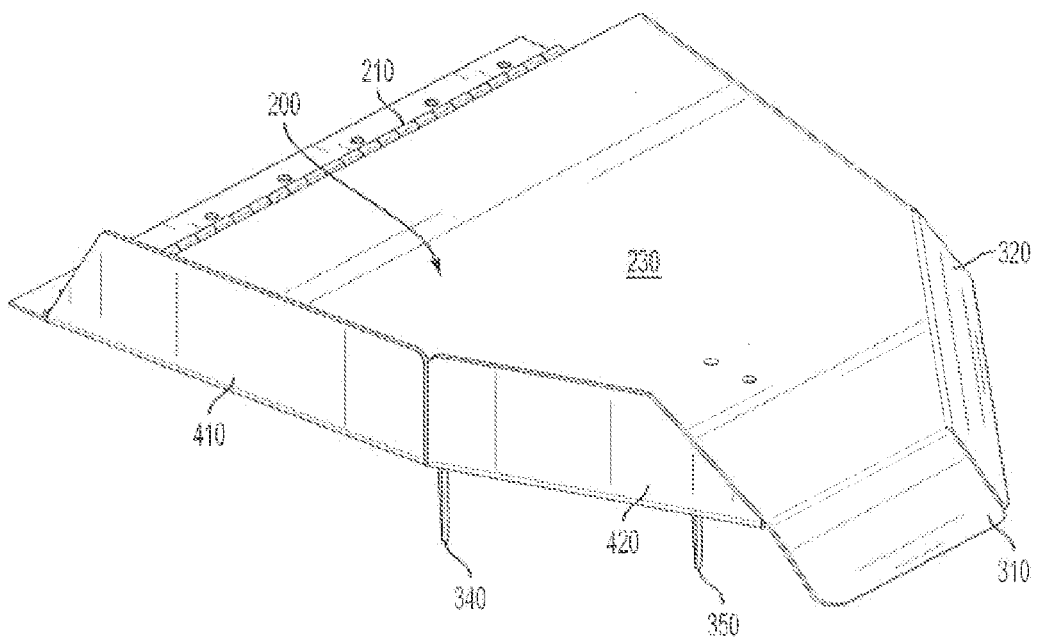
FIG. 62 is a perspective view of the port wake-modifying device shown in FIG. 61, shown here from the outboard side.
Figure 63:
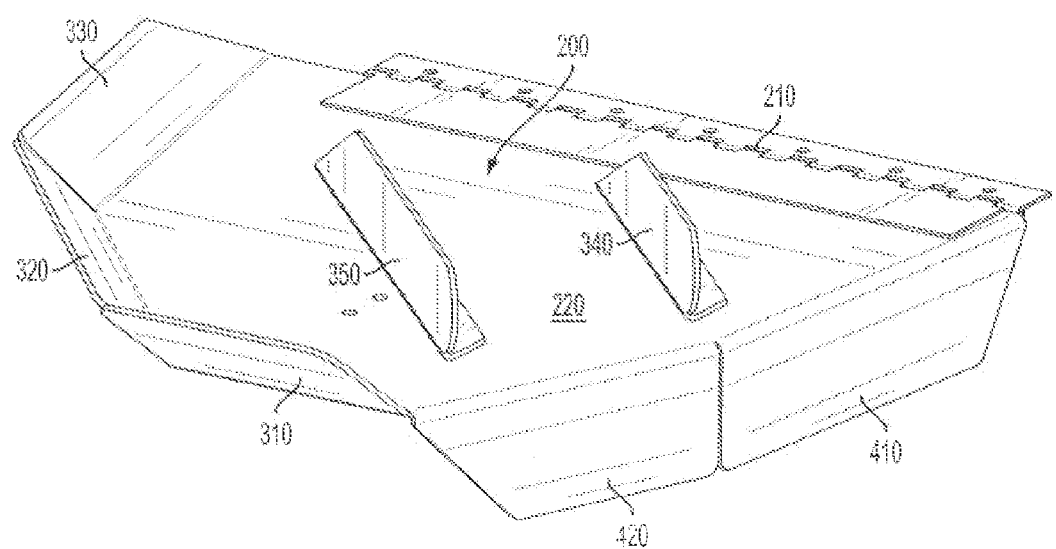
FIG. 63 is a perspective view of the port wake-modifying device shown in FIG, 61, turned upside down and shown here from the outboard side.
Figure 64:
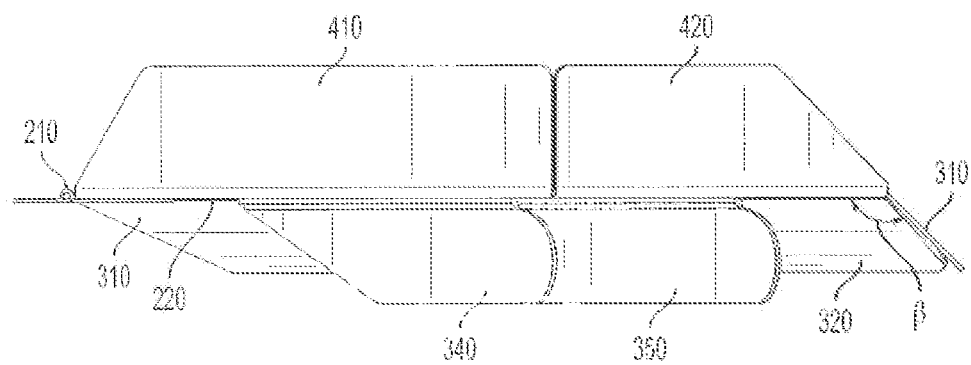
FIG 64 is an outboard elevation view of the port wake-modifying device shown in FIG. 61.
Figure 65:
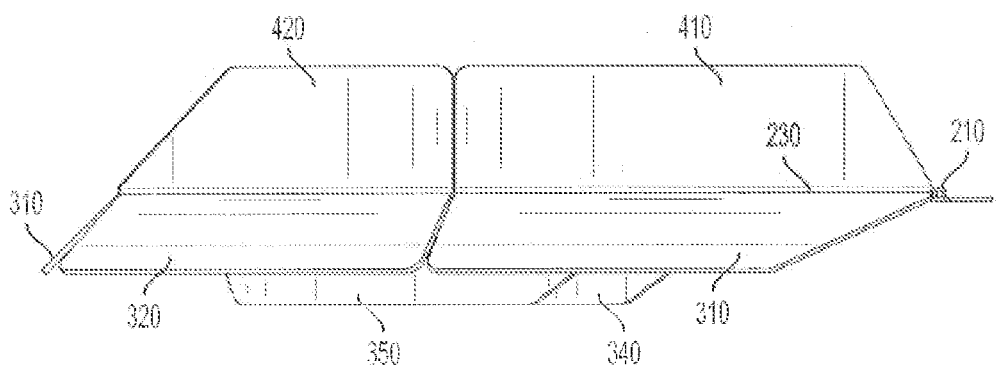
FIG. 65 is an inboard elevation view of the port wake-modifying device shown in FIG. 61.
Figure 66:
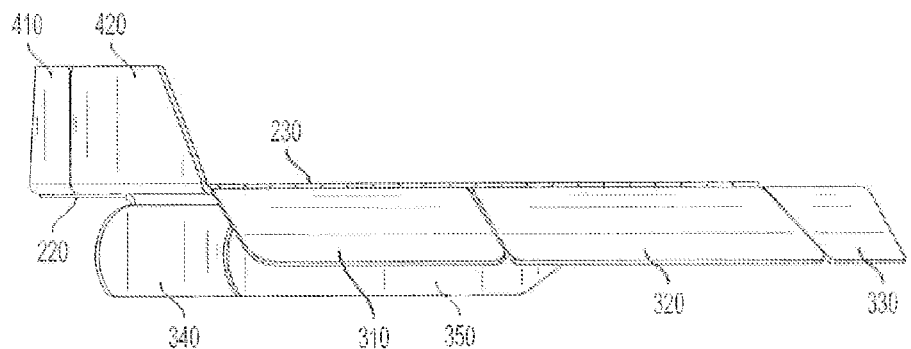
FIG. 66 is an aft elevation view of the port wake-modifying device shown in FIG. 61.
Figure 67:
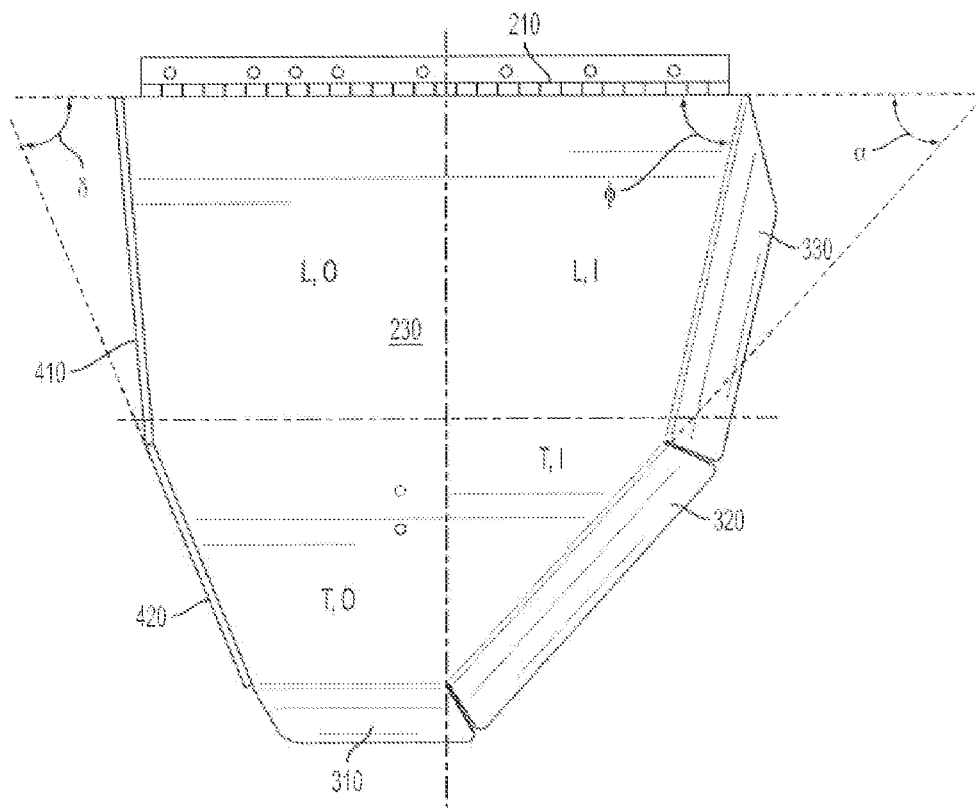
FIG. 67 is a top elevation view of the port wake-modifying device shown in FIG. 61.
Figure 68:
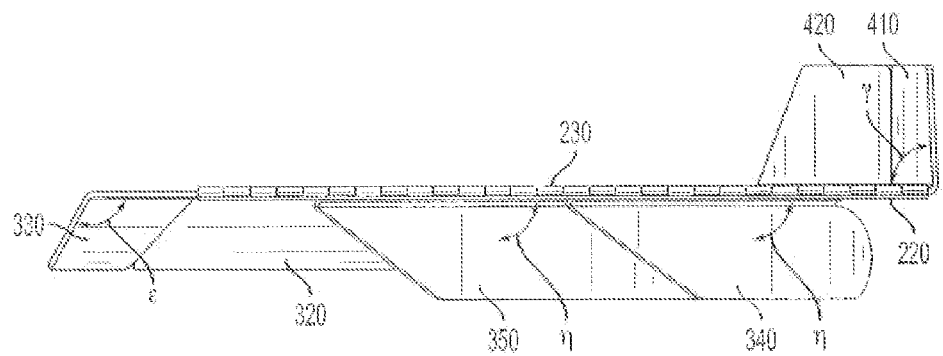
FIG. 68 is a foreside elevation view of the port wake-modifying device shown in FIG. 61.
Figure 69:
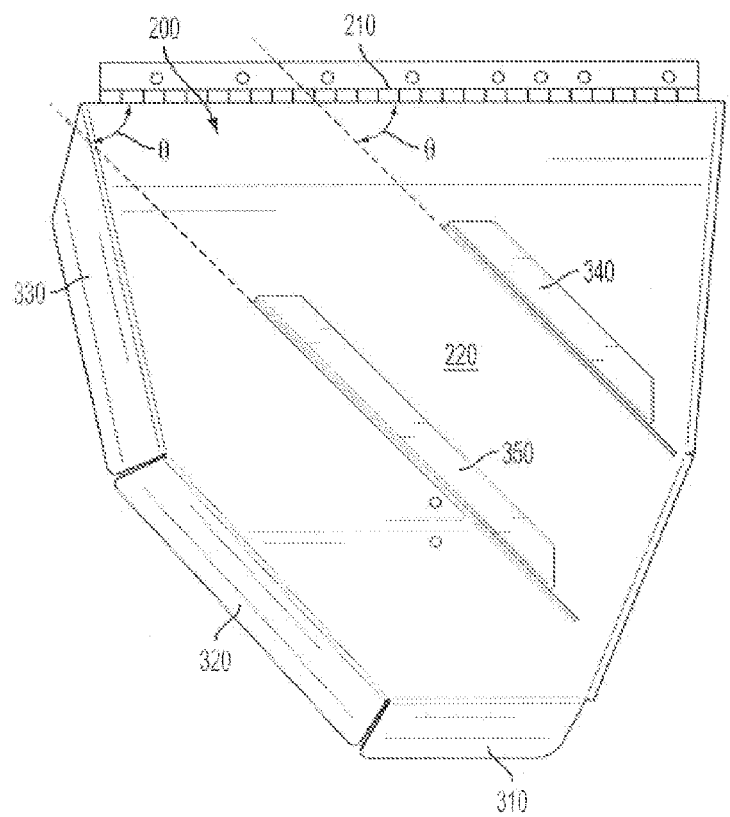
FIG. 69 is a bottom elevation view of the port wake-modifying device shown in FIG. 61.
Figure 70:
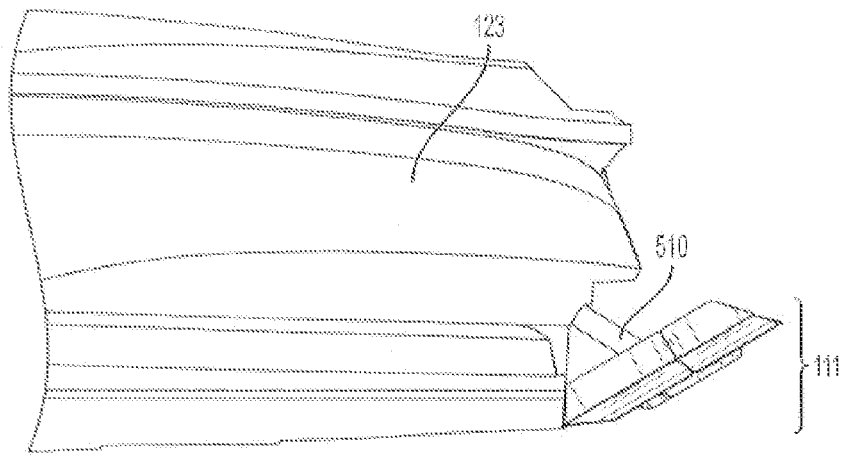
FIG. 70 is a port side view of the boat shown in FIG. 58, with the port wake-modifying device in a non-deployed position.
Figure 71:
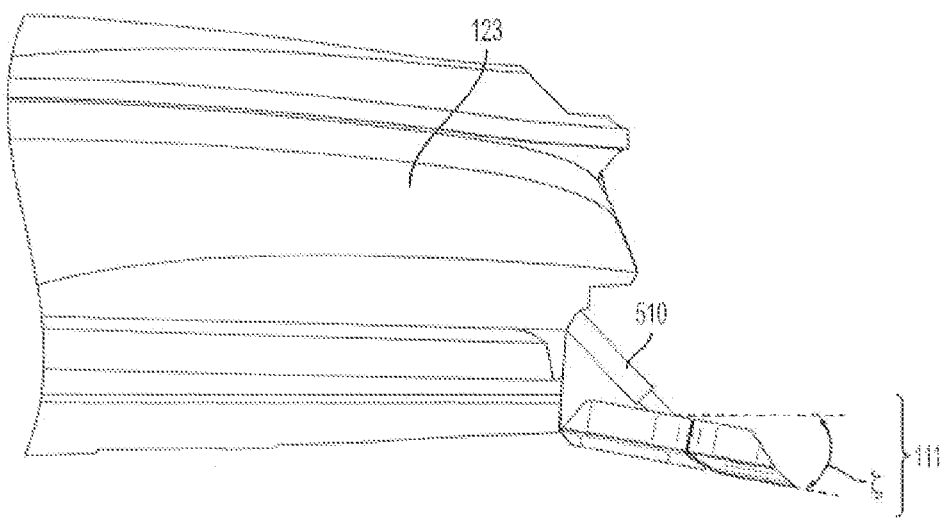
FIG. 71 is a port side view of the boat shown in FIG. 58, with the port wake-modifying device in a deployed position.
Figure 72:
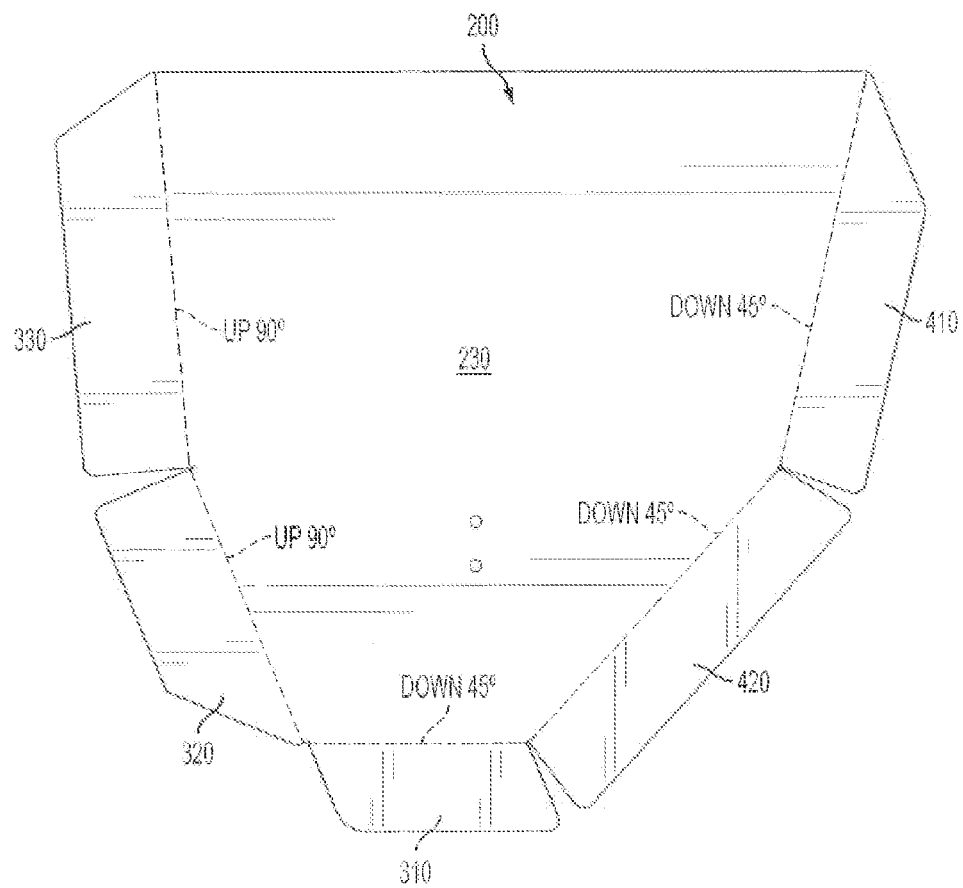
FIG. 72 is a manufacturing view of the port wake-modifying device shown in FIG. 61.
Figure 73:
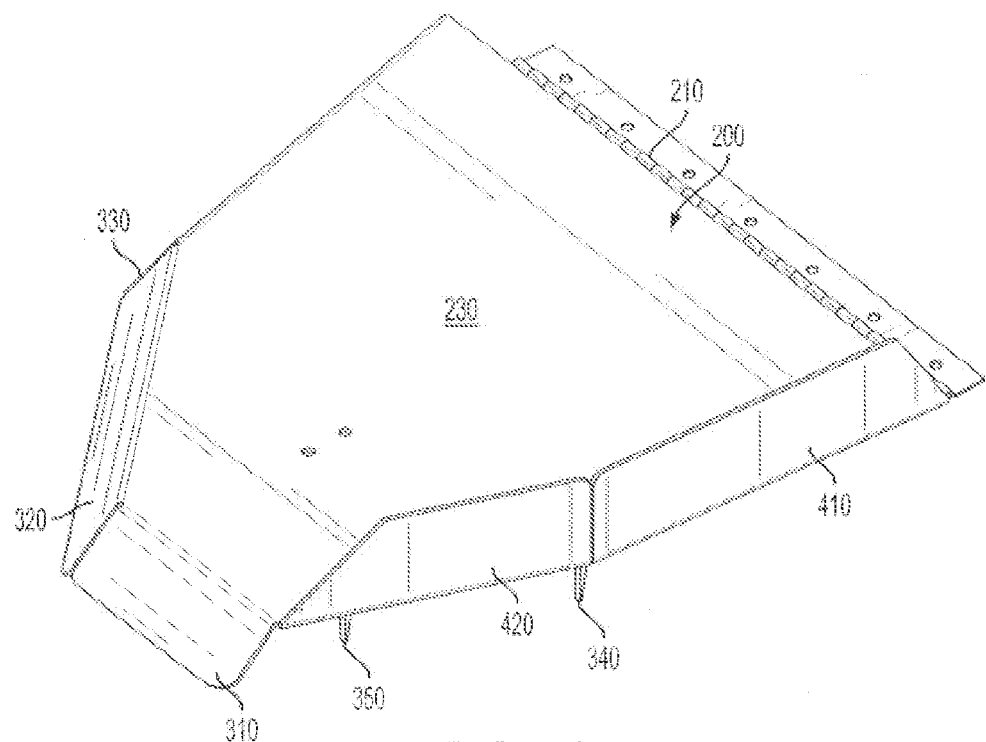
FIG. 73 is a perspective view of the starboard wake-modifying device shown in FIG. 58, detached from the boat and shown here from the outboard side.
Figure 74:
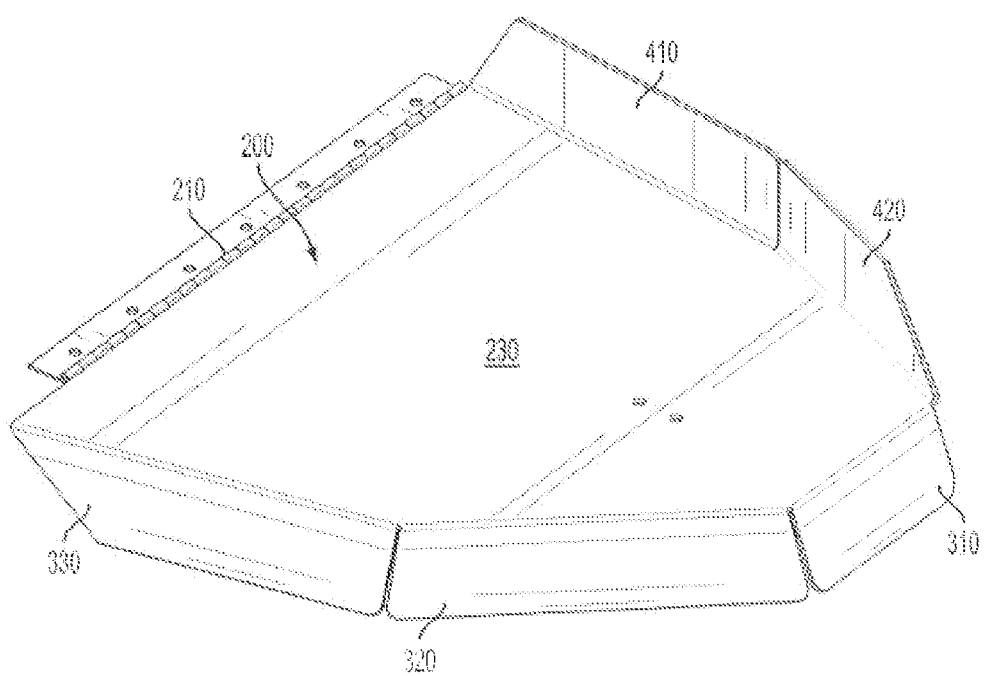
FIG. 74 is a perspective view of the starboard wake-modifying device shown in FIG. 73, shown here from the inboard side.
Figure 75:
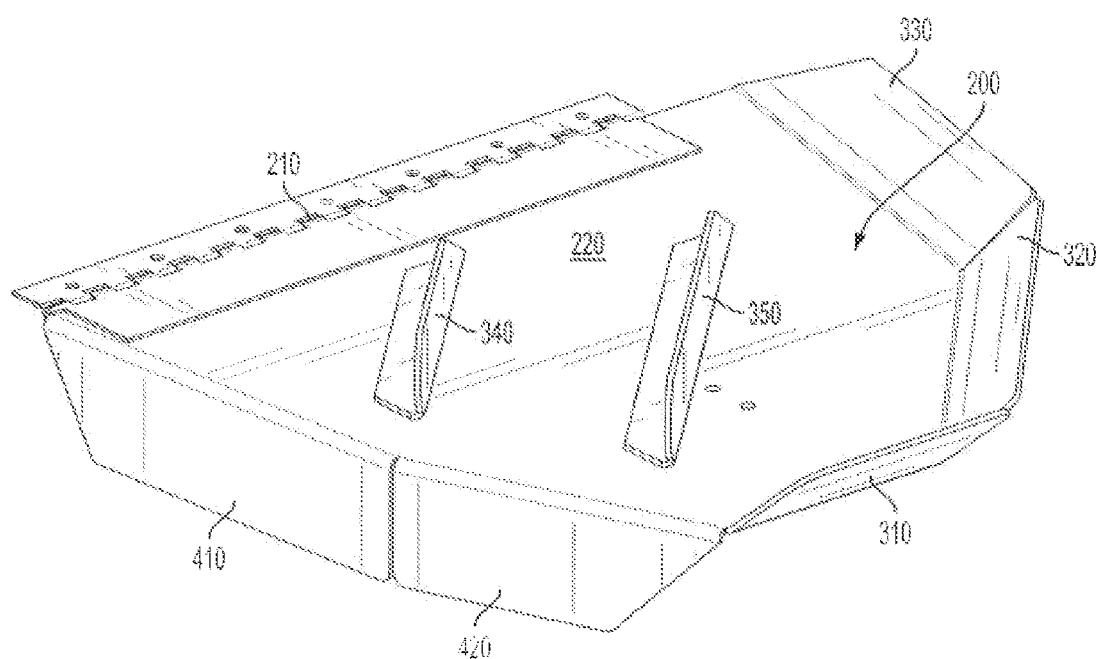
FIG. 75 is a perspective view of the starboard wake-modifying device shown in FIG. 73, turned upside down and shown here from the outboard side.
Figure 76:
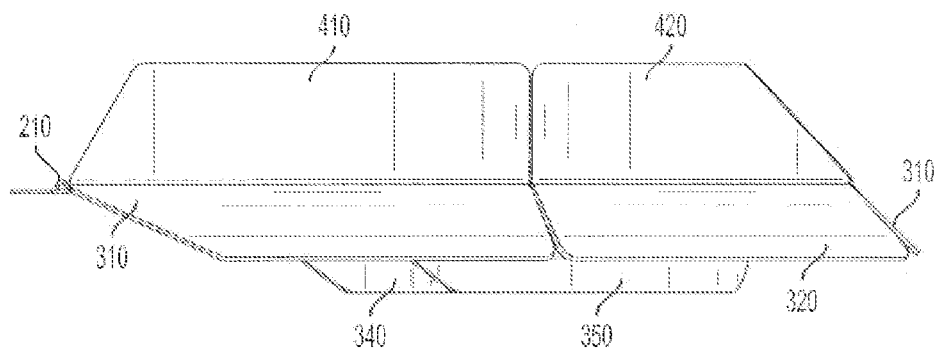
FIG. 76 is an inboard elevation view of the starboard wake-modifying device shown in FIG. 73.
Figure 77:
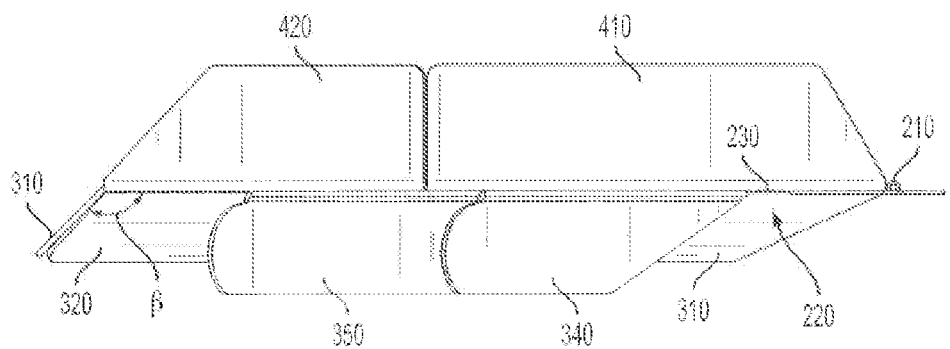
FIG. 77 is an outboard elevation view of the starboard wake-modifying device shown in FIG. 73.
Figure 78:
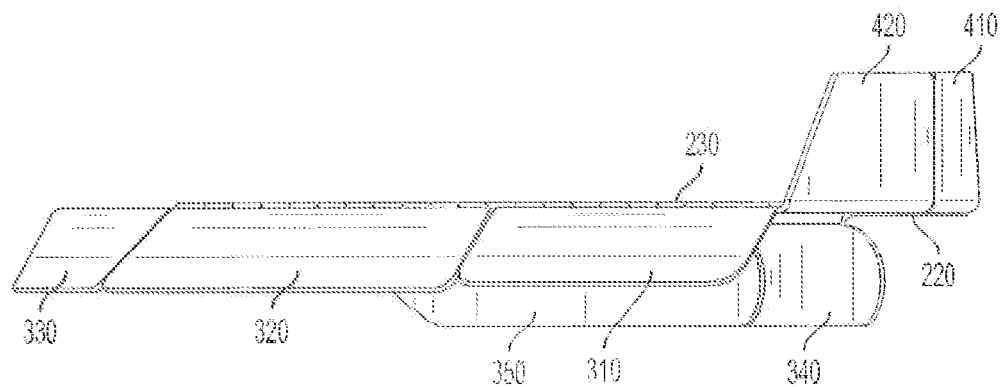
FIG. 78 is an aft elevation view of the starboard wake-modifying device shown in FIG. 73.
Figure 79:
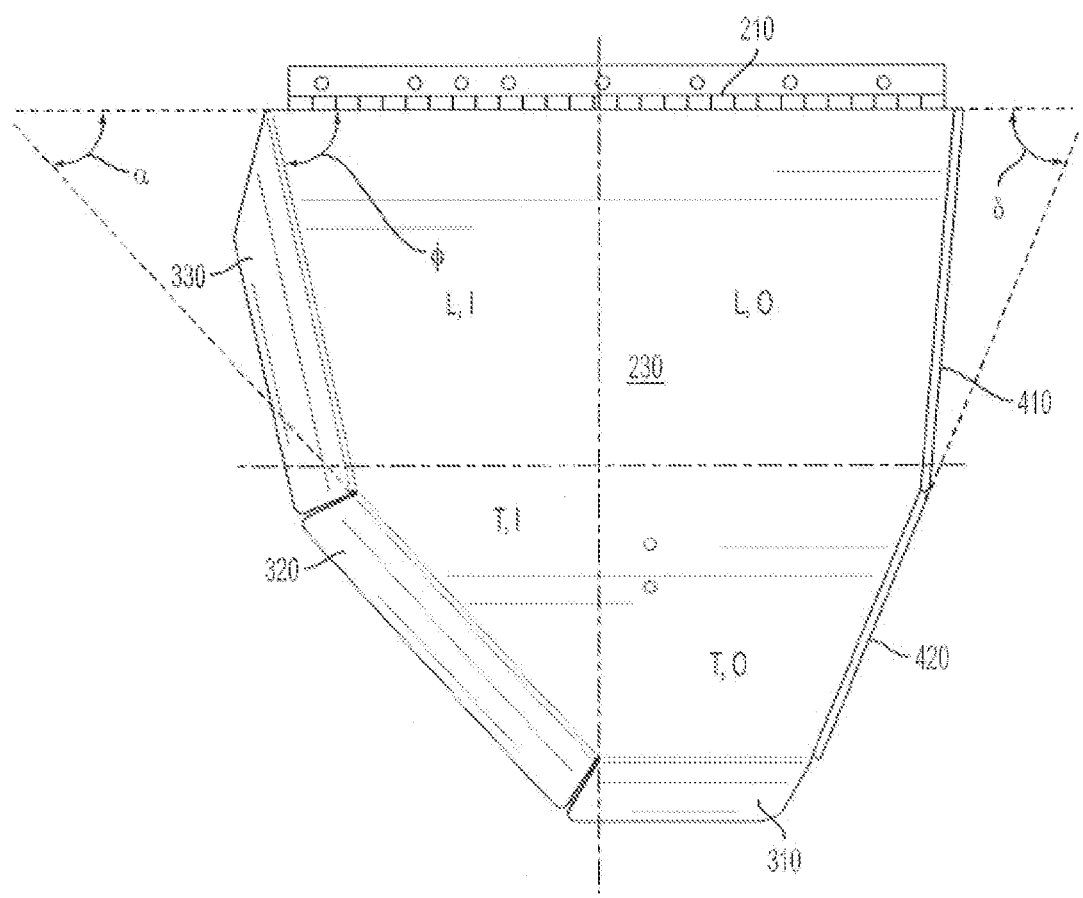
FIG. 79 is a top elevation view of the starboard wake-modifying device shown in FIG. 73.
Figure 80:
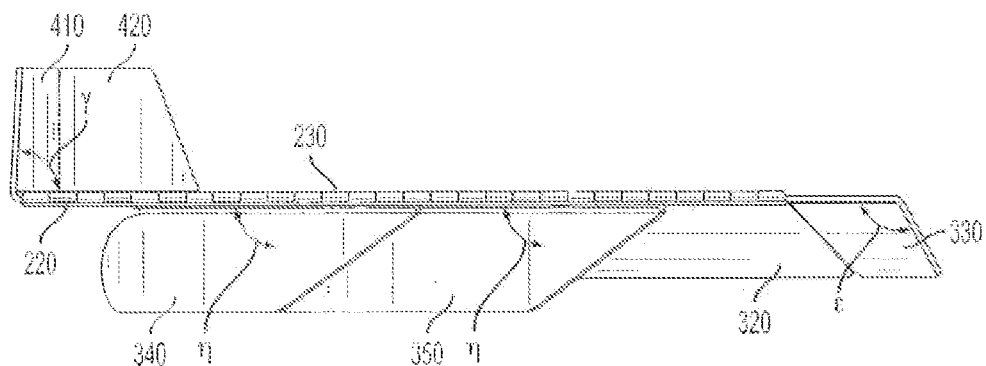
FIG. 80 is a foreside elevation view of the starboard wake-modifying device shown in FIG. 73.
Figure 81:
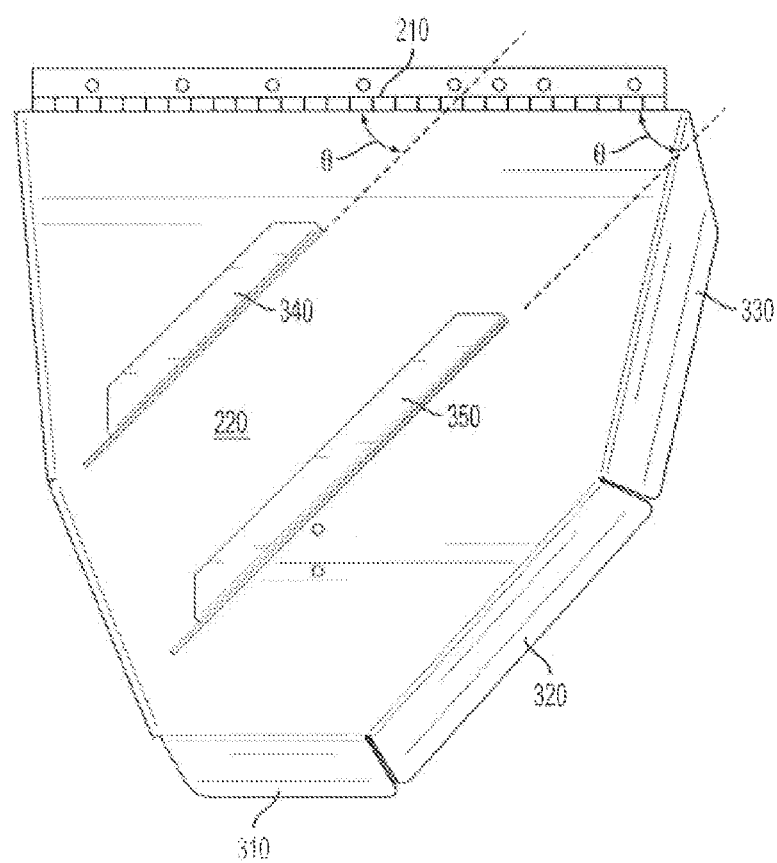
FIG. 81 is a bottom elevation view of the starboard wake-modifying device shown in FIG. 73.
Figure 82:
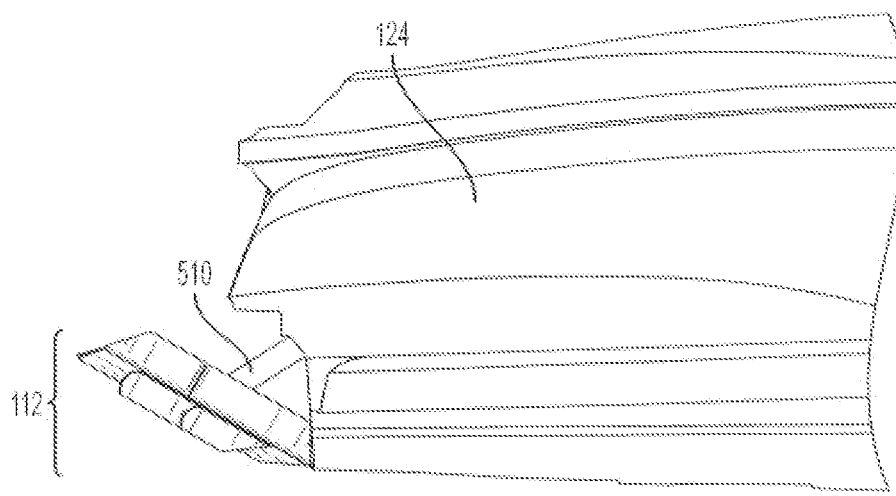
FIG. 82 is a starboard side view of the boat shown in FIG. 58, with the starboard wake-modifying device in a non-deployed position.
Figure 83:
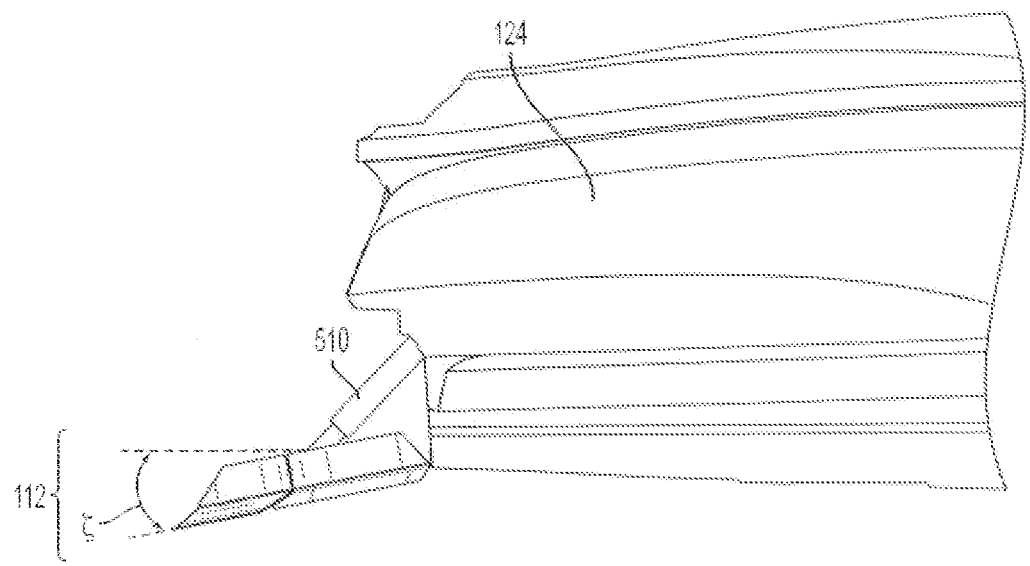
FIG. 83 is a starboard side view of the boat shown in FIG. 58, with the starboard wake-modifying device in a deployed position.
Figure 84:
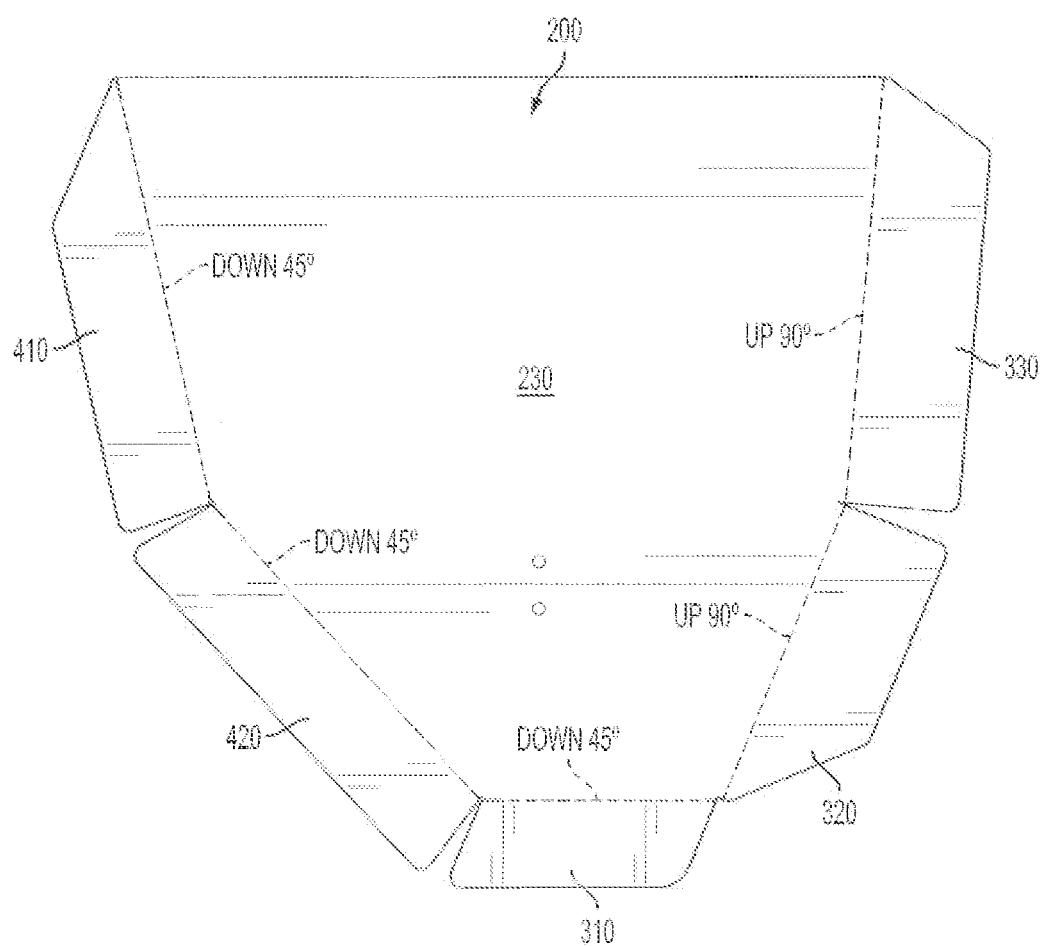
FIG. 84 is a manufacturing view of the starboard wake-modifying device shown in FIG. 73.

FIG. 31 shows a stern view of a boat 100 equipped with wake-modifying devices 111, 112 according to a second preferred embodiment of the invention. The port wake-modifying device 111 of the second embodiment is shown in FIGS. 32-45. The starboard wake-modifying device 112 of the second embodiment is shown in FIGS. 46-52.

As with the first embodiment, the port and starboard wake-modifying devices 111, 112 of the second embodiment are not symmetrical with one another. Here, the port wake-modifying device 111 includes two fins 340, 350 attached to the lower surface 220 of the plate-like member 200. These fins 340, 350 extend at a downward angle η relative to the lower surface 220 of the plate-like member 200. The downward angle η preferably is between about 30° and about 150°, and more preferably is about 90°. The fins 340, 350 intersect the plate-like member 200 along lines that are oriented at an angle θ relative to the pivot axis 210. This angle θ preferably is between about 15° and about 75°, and more preferably is between about 30° and about 60°. In the embodiment shown, the fins 340, 350 are parallel to each other and at an angle θ of 60° relative to the pivot axis 210. The inventors believe these fins 340, 350 redirect the water outboard, further shifting the point of convergence aft from the transom 122 and toward the non-surf side. As with the downturned surfaces 310, 320, 330 and the upturned surfaces 410, 420, the fins 340, 350 should extend far enough away from the plate-like member 200 to redirect the water flow. The fins 340, 350 preferably should extend at least about 1 inch below the lower surface 220 of the plate-like member 200, and more preferably should extend at least about 2 inches below the lower surface 220 of the plate-like member 200. In the embodiment shown, the fins 340, 350 have different lengths. The fins preferably are about 4 inches to about 16 inches long, and more preferably are about 8 inches to about 12 inches long. The fins preferably do not extend beyond the edges of the plate-like member.

In the second embodiment, the third downturned surface 330 intersects the plate-like member along a line that is oriented at. an oblique angle φ relative to the pivot axis 210. The angle φ preferably is between about 45° to about 90°, and more preferably is about 70°. All three of the downturned surfaces 310, 320, 330 form an angle α, ε with respect to the lower surface 220 of the central portion of the plate-like member 200 of about 135°. The wake-modifying devices 111, 112 of this embodiment preferably are about 17 inches wide and about 16 and ½ inches long.

Third Embodiment

The port and starboard wake-modifying devices 111, 112 in the previous two embodiments are asymmetrical with each other, but the wake-modifying devices 111, 112 can be symmetrical. Symmetrical wake-modifying devices 111, 112 may be used, for example, with heavy boats where the propeller 170 has less of an impact on the boat's wake. The third preferred embodiment shown in FIGS. 58-84 is an example of a symmetrical pair of wake-modifying devices 111, 112. FIG.

58 shows a stern view of a boat 100 equipped with wake-modifying devices 111, 112 according to a third embodiment of the invention. The port wake-modifying device 111 of the third embodiment is shown in FIGS. 59-72. The starboard wake-modifying device 112 of the third embodiment is shown in FIGS. 73-84. In this embodiment, both the port and starboard wake-modifying devices 111, 112 have two fins 340, 350. In the embodiment shown, the fins 340, 350 are parallel to each other and oriented at an angle θ of 45° relative to the pivot axis 210.

Control System

Those skilled in the art understand that the weight and displacement of the boat has a significant impact on the size and shape of the wake. As a result, many recreational sport boats that are used for wakeboarding and wake surfing accommodate additional weight or ballast. In particular, many boats are designed to have ballast added to the surf side of the boat to increase the displacement of that side of the boat. This weight may be added by any number of ways known to those skilled in the art. One way is to position more people on the surf side of the boat than on the non-surf side. Another way is to add ballast through the use of ballast bags or ballast sacks. Yet another way to add weight is through ballast tanks installed in the boat. Preferably, two ballast tanks are positioned in the stern of the boat near the bottom of the hull, one on each side of the boat, and a third ballast tank is positioned along the boat's centerline near the bottom of the hulls forward of the two rear ballast tanks. If ballast bags are used in addition to ballast tanks, the ballast bags may be plumbed into the ballast system of the boat. Both the ballast tanks and the ballast bags operate similarly in that water may be pumped into the tank or bag by ballast pumps to add weight. In some boats, both ballast tanks and ballast bags may be used simultaneously. For example, all three ballast tanks may be filled to increase the displacement of the stern of the boat, and a ballast bag on the surf side of the boat may be filled to further increase the displacement on the surf side.

A control system is used to operate the wake-modifying devices 111, 112. When the wake-modifying devices 111, 112 are used with plumbed-in ballast, the control system preferably controls both the ballast and the wake-modifying devices 111, 112. This control system preferably includes a controller that controls the linear actuators 510 and the ballast pumps. The controller may be any suitable controller known in the art including a controller comprising a CPU, ROM, and RAM. The control system also includes an input device. In the preferred embodiment, the input device is a touch screen located at the control console 140 of the boat 100. Also in this embodiment, the controller is co-located with the touch screen. Those skilled in the art will recognize that any suitable input device including buttons, switches, dials, or the like may be used.

Figure 85:
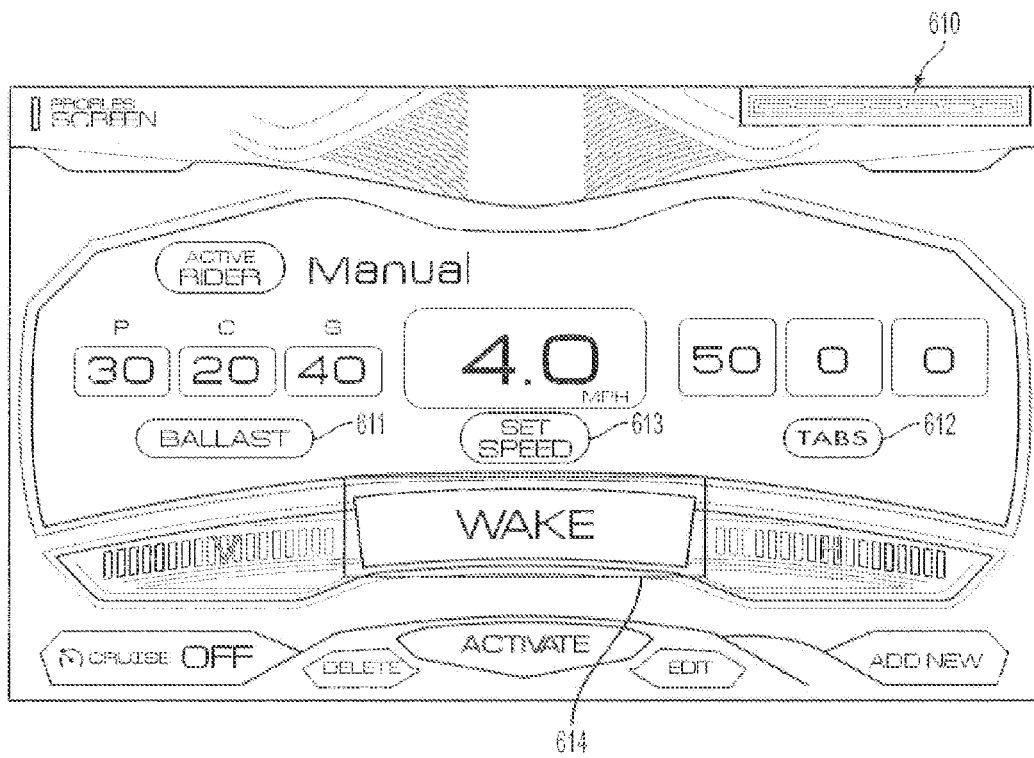
FIG. 85 shows an control screen for operating the wake-modifying devices shown in the previous figures.
Figure 86:
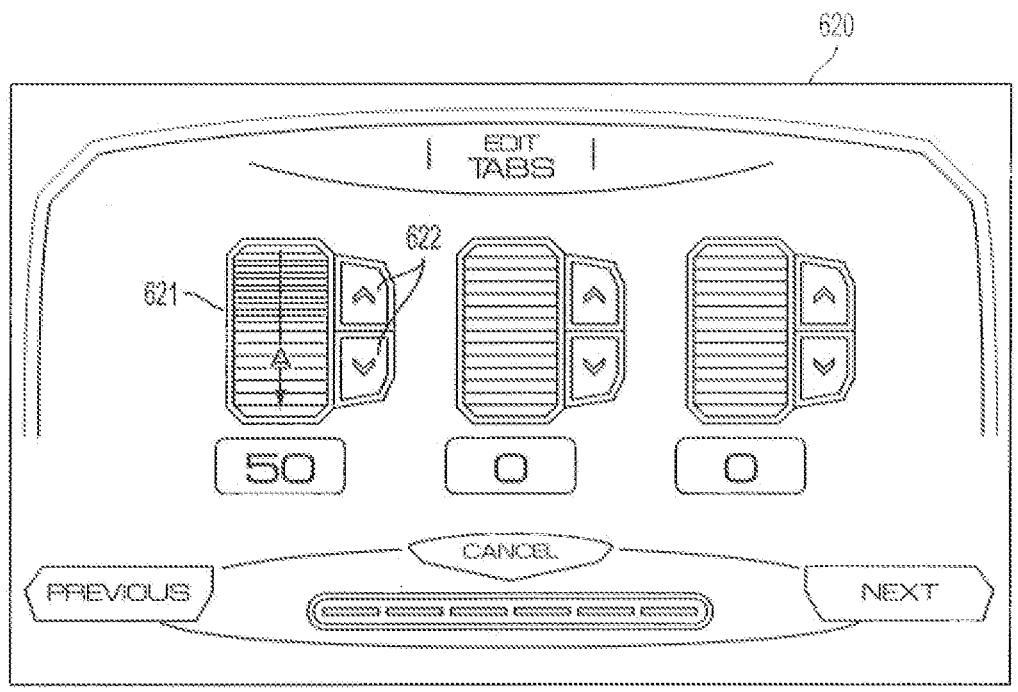
FIG. 86 shows an edit screen accessed from the control screen shown in FIG. 85.

An exemplary touch screen 610 is shown in FIG. 85. This touch screen 610 is shown in a manual mode. In this mode, a user can manually adjust the amount of water in the ballast tanks and manually adjust the percentage of deployment of the wake-modifying devices 111, 112. To adjust ballast, the user selects the "BALLAST" button 611. To adjust the deployment of the wake-modifying devices or center trim tab, the user selects the "TABS" button 612. to adjust the speed of the boat, the user selects the "SET SPEED" button 613. When one of these buttons is selected, a new screen is displayed that allows the user to adjust the selected parameter. When the user selects the "TABS" button 612, for example, AN "EDIT TABS" screen 620 is displayed as shown in FIG. 86. On this screen 620, the user may adjust the percentage deployment of the wake-modifying devices 111, 112 and/or the center trim tab 20. To deploy the port wake-modifying device 111, for example, a user swipes his or her finger in direction A in the area 621 until the desired percentage deployment (50 percent in the example shown) is reached. Alternatively, the user may use adjustment arrows 622 to incrementally change the percentage deployment. When the percentage deployment of the port wake-modifying device 111 is changed, the controller drives the linear actuator 510 of the port wake-modifying device 111 to move the port wake-modifying device 111 to the set position. The starboard wake-modifying device 112 and the center trim tab 20 are adjusted in the same manner.

As another option, the wake-modifying devices, ballast, and boat speed may be controlled using user-defined programmed settings. A user can manually set each of the parameters in the manual mode as described above and then save these settings as a user-defined profile. In operation, a touch location 610, shown in FIG. 85, may be used to toggle between these user-defined programmed settings. In this embodiment, a user toggles between settings by swiping touch position 614 to the left or right.

Figure 87:
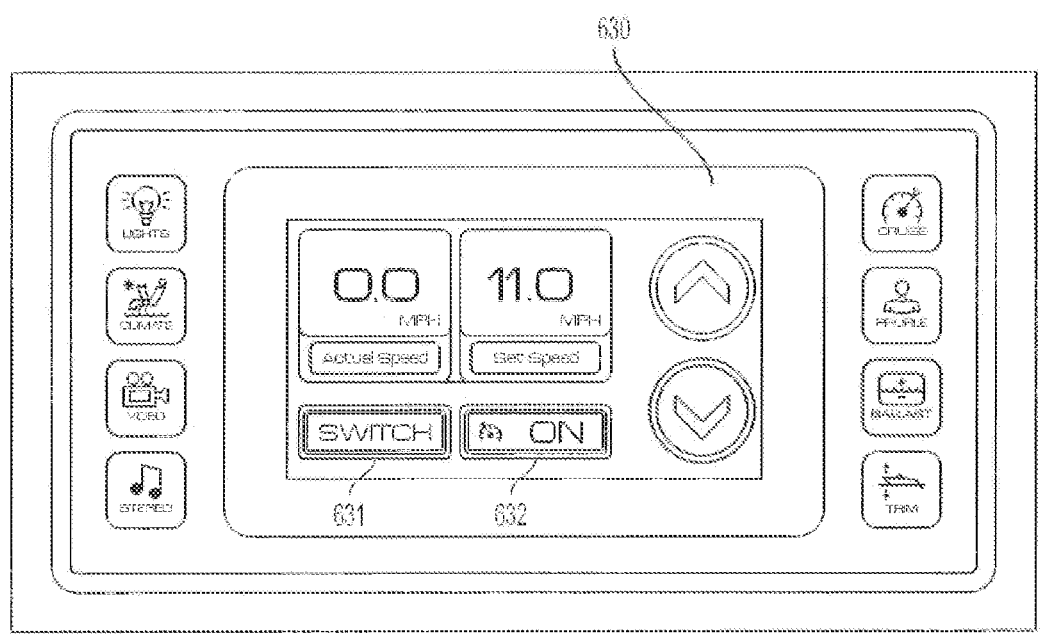
FIG. 87 shows another exemplary control screen for operating the wake-modifying devices shove in the previous figures.
Figure 88:
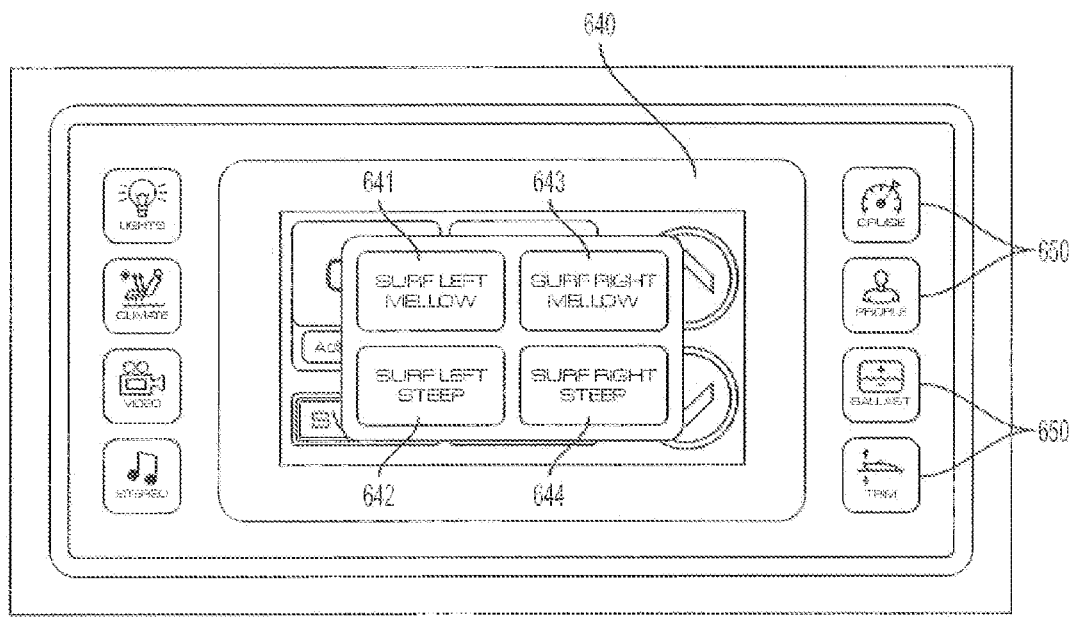
FIG. 88 shows a selection screen accessed from the control screen shown in FIG. 87.

In addition to or instead of the foregoing, the control system can include preprogrammed settings established by the boat manufacturer. After one of the preprogrammed settings has been selected by a user, a cruise control screen 630 may be displayed, such as shown in FIG. 87. The boat may be set to cruise at a specific speed by selecting the "ON" button 632. If the user desires to switch between preprogrammed settings, the user may select the "SWITCH" button 631. Selecting the "SWITCH" button 631 causes a pop-up window to be displayed within the control screen 640, such as shown in FIG. 88. Using the pop-up window the user may select a different preprogrammed setting. In this embodiment, four preprogrammed settings are shown. The two "mellow" settings ("SURF LEFT MELLOW" 641 and "SURF RIGHT MELLOW" 643) may be programmed such that the controller drives the linear actuator 510 to deploy the wake-modifying device 111, 112 on the non-surf side to a relatively shallow deployed position. The two "steep" settings ("SURF LEFT STEEP" 642 and "SURF RIGHT STEEP" 644) may be programmed to maximize the size of the wake. In these "steep" settings, the controller drives the linear actuator 510 to deploy the wake-modifying device 111, 112 on the non-surf side to the maximum deployed position. In addition to or instead of a touch screen, other known input devices, such as static buttons 650, can be used.

The embodiments described and shown herein are examples of preferred embodiments of the present invention and are provided for illustrative purposes only. They are not intended to limit the scope of the invention. Although specific configurations, structures, materials, etc. have been shown and described, such are not limiting. Modifications and variations are contemplated within the scope of the invention, which is to be limited only by the scope of the claims.

What is claimed is:

1. A recreational sport boat comprising:

a hull including starboard and port sides and a transom; and a pair of wake-modifying devices positioned aft of the transom, one of the wake-modifying devices being positioned on a port side of the boat's centerline and another of the wake-modifying devices being positioned on a starboard side of the boat's centerline, each wake-modifying device being pivotable between a non-deployed position and a deployed position about a pivot axis that is horizontal or inclined no more than about 35° from horizontal, each wake-modifying device including:
a plate-like member; and
at least two downturned surfaces at a trailing portion of the plate-like member, the two downturned surfaces being at an obtuse angle relative to each other,
wherein in the deployed position, the downturned surfaces are lower than they are in the non-deployed position so as to be able to modify the boat's wake.

2. The recreational sport boat of claim 1, wherein the pivot axis of each wake-modifying device is at an oblique angle relative to the transom.

3. The recreational sport boat of claim 1, wherein the plate-like member and the at least two downturned surfaces of each wake-modifying device are an integral piece.

4. The recreational sport boat of claim 1, wherein the plate-like member and the at least two downturned surfaces of each wake-modifying device are separate pieces joined together.

5. The recreational sport boat of claim 1, wherein at least one of the downturned surfaces of each wake-modifying device is at a trailing edge of the plate-like member.

6. The recreational sport boat of claim 1, wherein an angle between each of the downturned surfaces of each wake-modifying device and a lower surface of a central portion of the plate-like member is between about 120° to about 135°.

7. The recreational sport boat of claim 1, wherein each of the downturned surfaces of each wake-modifying device extends between about 1 inch to about 2¼ inches below a lower surface of the plate-like member.

8. The recreational sport boat of claim 1, wherein the obtuse angle is between about 135° to about 150°.

9. The recreational sport boat of claim 1, wherein a first one of the downturned surfaces is outboard of a second one of the downturned surfaces for each wake-modifying device.

10. The recreational sport boat of claim 1, wherein each wake-modifying device further includes at least one upturned surface at an outboard portion of the plate-like member, between one of the downturned surfaces and the pivot axis.

11. The recreational sport boat of claim 10, wherein an angle between the upturned surface of each wake-modifying device and an upper surface of a central portion of the plate-like member is about 90°.

12. The recreational sport boat of claim 10, wherein the upturned surface of each wake-modifying device extends at least about 1 inch above an upper surface of the plate-like member.

13. The recreational sport boat of claim 1, wherein each wake-modifying device is capable of assuming multiple deployed positions, and in each different deployed position the wake-modifying device is pivoted downwardly at a different angle relative to the non-deployed position.

14. The recreational sport boat of claim 1, further comprising a pair of linear actuators, each linear actuator being operable to move a respective one of the wake-modifying devices between its non-deployed position and its deployed position.

15. The recreational sport boat of claim 14, further comprising a controller configured to drive the linear actuators to deploy the starboard wake-modifying device in order to create a port-side surf wake and to deploy the port wake-modifying device in order to create a starboard-side surf wake.

16. A recreational sport boat comprising:
a hull including starboard and port sides and a transom; and
a pair of wake-modifying devices positioned aft of the transom, one of the wake-modifying devices being positioned on a port side of the boat's centerline and another of the wake-modifying devices being positioned on a starboard side of the boat's centerline, each wake-modifying device being pivotable between a non-deployed position and a deployed position about a pivot axis that is horizontal or inclined no more than about 35° from horizontal, each wake-modifying device including:
a plate-like member;
a first downturned surface at an inboard portion of the plate-like member, the first downturned surface lying in a first plane;
a second downturned surface at a trailing portion of the plate-like member, the second downturned surface lying in a second plane which intersects the first plane; and
at least one fin attached to a lower surface of the plate-like member,
wherein in the deployed position, the second downturned surface is lower than it is in the non-deployed position so as to be able to modify the boat's wake.

17. The recreational sport boat of claim 16, wherein the first downturned surface of each wake-modifying device is at an inboard edge of the plate-like member.

18. The recreational sport boat of claim 17, wherein the first downturned surface and the plate-like member of each wake-modifying device are an integral piece.

19. The recreational sport boat of claim 16, wherein the second downturned surface and the plate-like member of each wake-modifying device are separate pieces joined together.

20. The recreational sport boat of claim 16, wherein each wake modifying device includes at least two parallel fins attached to a lower surface of the plate-like member.

21. The recreational sport boat of claim 16, further comprising a pair of linear actuators, each linear actuator being operable to move a respective one of the wake-modifying devices between its non-deployed position and its deployed position.

22. The recreational sport boat of claim 21, further comprising a controller configured to drive the linear actuators to deploy the starboard wake-modifying device in order to create a port-side surf wake and to deploy the port wake-modifying device in order to create a starboard-side surf wake.

23. A recreational sport boat comprising:
a hull including starboard and port sides and a transom; and
a pair of wake-modifying devices positioned aft of the transom, one of the wake-modifying devices being positioned on a port side of the boat's centerline and another of the wake-modifying devices being positioned on a starboard side of the boat's centerline, each wake-modifying device being pivotable between a non-deployed position and a deployed position about a pivot axis that is horizontal or inclined no more than about 35° from horizontal, each wake-modifying device including:
a plate-like member;
at least one downturned surface at an inboard portion of the plate-like member, the at least one downturned surface constituting at least part of an inboard edge of the plate-like member and extending from a leading portion to a trailing portion of the plate-like member; and
at least one upturned surface at an outboard portion of the plate-like member, the at least one upturned surface constituting at least part of an outboard edge of the plate-like member and lying in a plane that intersects the pivot axis,
wherein in the deployed position, the trailing portion of the plate-like member is lower than it is in the non-deployed position so as to be able to modify the boat's wake.

24. The recreational sport boat of claim 23, wherein each wake-modifying device is attached to the transom.

25. The recreational sport boat of claim 23, wherein the pivot axis of each wake-modifying device is spaced a distance aft of the transom.

26. The recreational sport boat of claim 23, wherein the pivot axis of each wake-modifying device is at an oblique angle relative to the transom.

27. The recreational sport boat of claim 23, wherein the plate-like member, the at least one downturned surface, and the at least one upturned surface of each wake-modifying device are an integral piece.

28. The recreational sport boat of claim 23, wherein an angle between the at least one upturned surface of each wake-modifying device and an upper surface of a central portion of the plate-like member is about 90°.

29. The recreational sport boat of claim 23, further comprising a pair of linear actuators, each linear actuator being operable to move a respective one of the wake-modifying devices between its non-deployed position and its deployed position.

30. The recreational sport boat of claim 29, further comprising a controller configured to drive the linear actuators to deploy the starboard wake-modifying device in order to create a port-side surf wake and to deploy the port wake-modifying device in order to create a starboard-side surf wake.

31. The recreational sport boat of claim 23, wherein the at least one upturned surface of the port wake-modifying device is generally parallel to the port side of the hull, and the at least one upturned surface of the starboard wake-modifying device is generally parallel to the starboard side of the hull.

32. A recreational sport boat comprising:
a hull including starboard and port sides and a transom; and
a pair of wake-modifying devices positioned aft of the transom, one of the wake-modifying devices being positioned on a port side of the boat's centerline and another of the wake-modifying devices being positioned on a starboard side of the boat's centerline, each wake-modifying device being pivotable between a non-deployed position and a deployed position about a pivot axis that is horizontal or inclined no more than about 35° from horizontal, each wake-modifying device including:
a plate-like member;
a first downturned surface at an inboard portion of the plate-like member, the first downturned surface lying in a first plane; and
a second downturned surface located entirely within a trailing portion of the plate-like member, the second downturned surface lying in a second plane which intersects the first plane,
wherein in the deployed position, the second downturned surface is lower than it is in the non-deployed position so as to be able to modify the boat's wake.

33. The recreational sport boat of claim 32, wherein the first plane intersects the pivot axis.

34. The recreational sport boat of claim 33, wherein the second plane is substantially parallel to the pivot axis.

35. The recreational sport boat of claim 33, wherein the second plane is substantially perpendicular to the first plane.

36. The recreational sport boat of claim 32, wherein each wake-modifying device is attached to the transom.

37. The recreational sport boat of claim 32, wherein the pivot axis of each wake-modifying device is spaced a distance aft of the transom.

38. The recreational sport boat of claim 32, wherein the pivot axis of each wake-modifying device is at an oblique angle relative to the transom.

39. The recreational sport boat of claim 32, wherein the plate-like member, the first downturned surface, and the second downturned surface of each wake-modifying device are an integral piece.

40. The recreational sport boat of claim 32, wherein an angle between the first downturned surface of each wake-modifying device and a lower surface of a central portion of the plate-like member is about 90°.

41. The recreational sport boat of claim 32, wherein the first downturned surface of each wake-modifying device is at an inboard edge of the plate-like member.

42. The recreational sport boat of claim 32, wherein the second downturned surface of each wake-modifying device is at a trailing edge of the plate-like member.

43. The recreational sport boat of claim 32, further comprising a pair of linear actuators, each linear actuator being operable to move a respective one of the wake-modifying devices between its non-deployed position and its deployed position.

44. The recreational sport boat of claim 43, further comprising a controller configured to drive the linear actuators to deploy the starboard wake-modifying device in order to create a port-side surf wake and to deploy the port wake-modifying device in order to create a starboard-side surf wake.

\* \* \* \* \*